(12) United States Patent
Dagcioglu et al.

(10) Patent No.: US 8,801,101 B2
(45) Date of Patent: Aug. 12, 2014

(54) VEHICLE SEATING SYSTEM

(75) Inventors: M. Omer Dagcioglu, Llanwenog (GB); Ioan Ghergheli, Westland, MI (US); Michael B. Clor, Commerce Township, MI (US); Ram Gopal, Canton, MI (US); Kyle Doxey, Ann Arbor, MI (US); Paul A. Gilmore, Livonia, MI (US); Timothy A. Brademeyer, Shelby Township, MI (US); John Newberry, Belleville, MI (US); Stephen P. Telesco, Dexter, MI (US)

(73) Assignee: Johnson Controls Technology Company, Holland, MI (US)

( * ) Notice: Subject to any disclaimer, the term of this patent is extended or adjusted under 35 U.S.C. 154(b) by 31 days.

(21) Appl. No.: 12/398,834

(22) Filed: Mar. 5, 2009

(65) Prior Publication Data

US 2010/0052390 A1 Mar. 4, 2010

Related U.S. Application Data

(63) Continuation of application No. 11/816,485, filed as application No. PCT/US2006/005779 on Feb. 17, 2006, now abandoned.

(60) Provisional application No. 60/654,482, filed on Feb. 18, 2005.

(51) Int. Cl.
 *B60N 2/00* (2006.01)
(52) U.S. Cl.
 USPC ...... 297/331; 297/341; 296/65.09; 296/65.14

(58) Field of Classification Search
 USPC .......... 297/341, 331, 335, 336, 334; 296/65.09, 65.13, 65.14
 See application file for complete search history.

(56) References Cited

U.S. PATENT DOCUMENTS

| | | | | | |
|---|---|---|---|---|---|
| 4,699,418 | A | * | 10/1987 | Plavetich | 296/65.09 |
| 5,195,802 | A | | 3/1993 | Hayakawa et al. | |
| 5,364,152 | A | * | 11/1994 | Mastrangelo et al. | 296/65.03 |
| 5,482,349 | A | * | 1/1996 | Richter et al. | 297/15 |
| 5,529,378 | A | * | 6/1996 | Chaban et al. | 297/331 |
| 5,695,247 | A | * | 12/1997 | Premji | 297/341 |
| 6,086,018 | A | * | 7/2000 | Gobeil et al. | 244/122 R |
| 6,123,380 | A | * | 9/2000 | Sturt et al. | 296/65.09 |
| 6,155,626 | A | | 12/2000 | Chabanne et al. | |

(Continued)

OTHER PUBLICATIONS

International Search Report dated Jul. 13, 2006 as received in corresponding PCT Application No. PCT/US2006/005779, 3 pages.

*Primary Examiner* — David E Allred
(74) *Attorney, Agent, or Firm* — Foley & Lardner LLP

(57) ABSTRACT

A vehicle seating system including a seat back, a seat bottom, a track arrangement, a first carriage, and a second carriage is for use within a vehicle. The seat bottom is coupled to the seat back. The track arrangement is configured to be coupled to the vehicle. The first carriage is coupled to the seat bottom and is moveable within the track arrangement. The second carriage is coupled to the seat back and is moveable within the track arrangement. The second carriage and the first carriage are releasably coupled to one another so the second carriage is moveable relative to the first carriage when the coupling of the first carriage and the second carriage is released. The position of the second carriage relative to the first carriage is substantially fixed when the coupling of the first carriage and the second carriage is locked.

30 Claims, 38 Drawing Sheets

(56) References Cited

U.S. PATENT DOCUMENTS

| | | | |
|---|---|---|---|
| 6,196,613 B1* | 3/2001 | Arai ............................ | 296/65.13 |
| 6,199,951 B1* | 3/2001 | Zeile et al. .................... | 297/341 |
| 6,382,491 B1* | 5/2002 | Hauser et al. ............... | 296/65.05 |
| 6,648,394 B2* | 11/2003 | Lejeune et al. ............. | 296/65.13 |
| 7,156,460 B2* | 1/2007 | Jeong ........................... | 297/336 |
| 7,300,107 B2* | 11/2007 | Kammerer .................... | 297/336 |
| 7,419,218 B2* | 9/2008 | Holdampf et al. ........ | 297/378.12 |
| 7,712,829 B2* | 5/2010 | Park ............................ | 297/234 |
| 7,819,479 B2* | 10/2010 | Halbig et al. ............. | 297/378.14 |
| 8,047,610 B2* | 11/2011 | Yamagishi .................... | 297/341 |
| 8,313,144 B2* | 11/2012 | Holdampf .................... | 297/340 |
| 8,322,767 B2* | 12/2012 | Morita et al. ............... | 296/24.33 |
| 8,556,323 B2* | 10/2013 | Hoge et al. ................. | 296/65.13 |
| 2002/0125753 A1 | 9/2002 | Kammerer | |
| 2005/0104431 A1* | 5/2005 | Saberan et al. ............... | 297/331 |
| 2006/0061174 A1* | 3/2006 | Saberan ........................ | 297/331 |
| 2007/0063565 A1* | 3/2007 | Habedank et al. ........... | 297/341 |
| 2007/0132266 A1* | 6/2007 | Ghergheli et al. ......... | 296/65.09 |
| 2008/0164740 A1* | 7/2008 | Harper et al. ................. | 297/331 |
| 2010/0052391 A1* | 3/2010 | Hurst et al. .................... | 297/341 |

\* cited by examiner

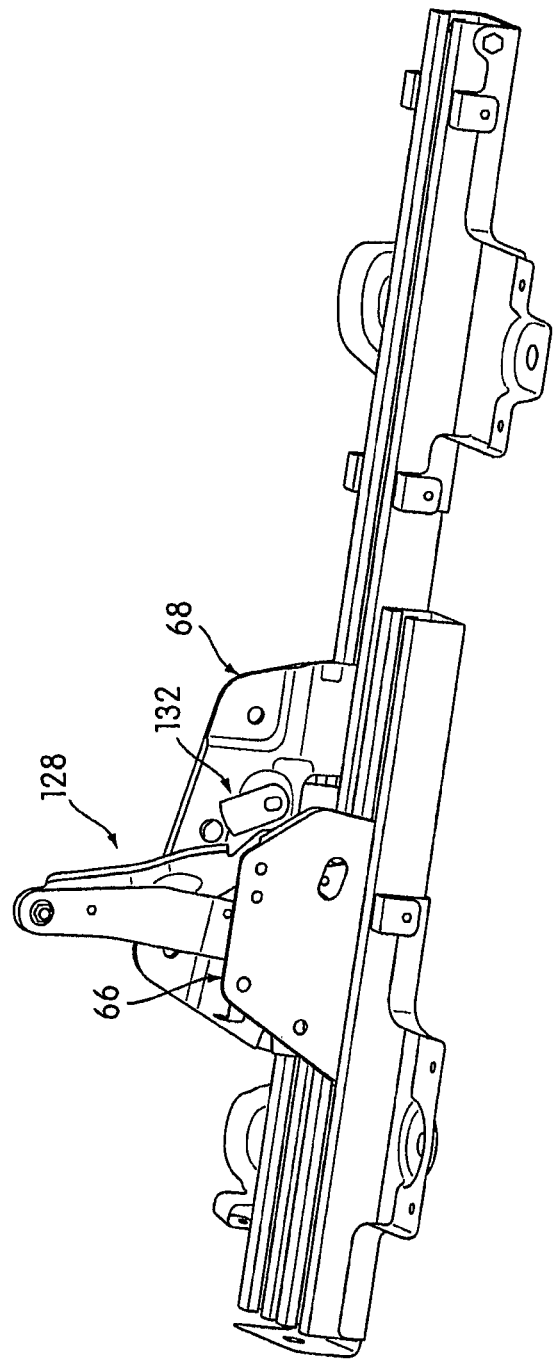

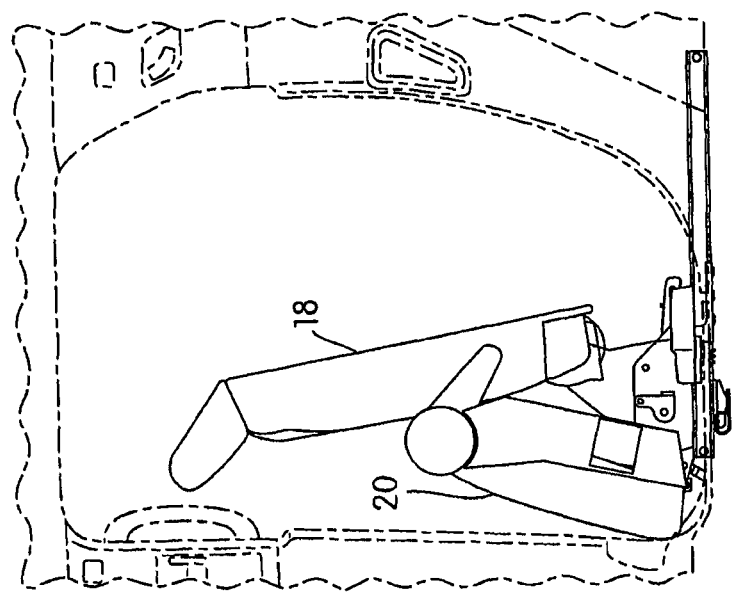
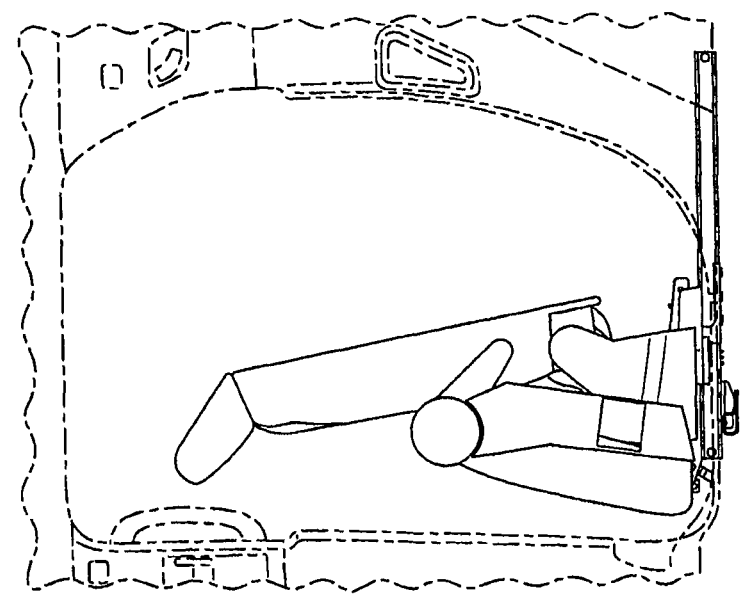

VEHICLE SEATING SYSTEM

CROSS-REFERENCE TO RELATED PATENT APPLICATIONS

This application is a continuation of U.S. application Ser. No. 11/816,485, filed Aug. 16, 2007, which is a National Phase of International Application No. PCT/US2006/005779, filed Feb. 17, 2006 and claims the benefit of, and priority to, U.S. Provisional Patent Application No. 60/654,482, filed Feb. 18, 2005, which are incorporated by reference herein.

BACKGROUND OF THE INVENTION

The present invention relates generally to the field of adjustable seating. More specifically, the present invention relates to the field of seating configured to facilitate storage and access to the interior of the vehicle in which the seating is located.

Many of today's vehicles include at least two rows of seats. Often, these vehicles will include a significant amount of cargo space behind the second row of seats. In some vehicles, such as SUVs and minivans, a third row of seats may be located behind the second row of seats. In order to access the area behind the second row of seats, many vehicles provide a rear liftgate that allows a person to access the cargo area from the back of the vehicle. However, for people wanting to get to the third row of seats, the rear liftgate generally does not provide a convenient means to access those seats. Moreover, access to the third row of seats or cargo space may not be convenient from the rear doors of a four-door vehicle because the second row of seats generally serves as a barrier.

To facilitate entry or access to the area behind the second row of seats, or to expand the cargo space, second row seats have been provided in a variety of different configurations. For example, some seats are configured so that the seat back folds down on top of the seat cushion. Although this configuration allows cargo to be placed on top of the folded down seatback, it generally does not provide convenient access to a third row of seats because such a seat requires the occupant to climb over the folded down seat, which may be burdensome in many cases. Other seats are configured such that the seatback folds down over the seat cushion, and then the rear of the folded unit is rotated upward so that the seat cushion and seatback are in a generally vertical position proximate the back of the seat in front of the folded seat. While such a seat allows an occupant to more easily access the third row of seats, moving the seat from the seating position to the folded or storage position can be burdensome due to the fact that one must lift the weight of the seat to rotate it to the folded or vertical position.

Other seats are configured so that the seat cushion folds forward and then the seatback folds down into the area the seat cushion occupied before it was folded forward. Although the height of the upper surface of the seatback is lower than it otherwise would be if the seat cushion were not folded forward, it is still elevated above the vehicle floor and serves as an obstacle that makes access to the third row of seats inconvenient.

Still other seats are configured so that the seat cushion can be rotated around the forward portion of the seat cushion into a generally vertical position proximate the back of the seat in front, and so that the seat back can be moved forward and upward (either at the same time the seat cushion is rotated forward, or after the seat cushion has been rotated forward) in a generally arc-like path until it rests proximate the seat cushion in a generally upright position. Although this configuration reduces the obstacles an occupant must climb over to reach the third row of seats, it still requires the occupant to lift the seatback while moving it into the forward position. The need to lift the seat or a portion of the seat can be burdensome and inconvenient. Although various devices, such as spring and cable configurations, can be used to assist an occupant as he or she lifts a portion of the seat, these devices can be complicated and add unnecessary weight and cost.

Other seats are configured in such a way that the backrest can be pivoted or rotated forward, and then the seat slid forward to provide access to the area behind the seat. Although the movement of these seats helps to improve access to the area behind the seat, the access is still relatively obstructed due to the limited extent to which the seat can normally be moved forward and out of the way.

Many conventional seats are configured to move between two positions or configurations, a seating or design position and a storage position. Often times, however, the storage position to which the seats are configured to move may be convenient for accommodating additional cargo, but not for providing access to a third row of seats or the cargo area, or vice versa.

To provide a reliable, widely acceptable seating system or arrangement that facilitates access to a rear cargo area or an additional row of seating as well as the effective use of a cargo area, and which avoids one or more of the above-referenced and other problems would represent a significant advance in the art.

SUMMARY OF THE INVENTION

One embodiment of the invention relates to a vehicle seating system for use within a vehicle. The vehicle seating system comprises a seat back, a seat bottom, a track arrangement, a first carriage, and a second carriage. The seat bottom is coupled to the seat back. The track arrangement is configured to be coupled to the vehicle. The first carriage is coupled to the seat bottom and is moveable within the track arrangement. The second carriage is coupled to the seat back and is moveable within the track arrangement. The second carriage and the first carriage are releasably coupled to one another so the second carriage is moveable relative to the first carriage when the coupling of the first carriage and the second carriage is released. The position of the second carriage relative to the first carriage is substantially fixed when the coupling of the first carriage and the second carriage is locked. The seating system is configured to be moved from a design position into a folded position when the coupling of the first carriage and the second carriage is released.

Another embodiment of the invention relates to a track system for coupling a vehicle seat having a seat bottom and a seat back to a vehicle, the vehicle seat being movable between a design position, a folded position, and a storage position. The track system comprises a first track arrangement, a first carriage, a second carriage, and a linkage. The first track arrangement is configured to be coupled to the vehicle. The first carriage is coupled to the first track arrangement, is configured to be coupled to the seat bottom, and is moveable within the first track arrangement. The second carriage is coupled to the first track arrangement, is configured to be coupled to the seat back, and is moveable within the first track arrangement. The linkage releasably couples the first carriage and the second carriage. The linkage is moveable between a locked state in which the position of the second carriage is locked relative to the position of the first carriage and an unlocked state in which the second carriage is moveable within the first track arrangement relative to the first carriage. The track system is configured to allow the vehicle seat to be moved from the design position into the folded position only when the first linkage is in the unlocked state.

Still another embodiment of the invention relates to a vehicle seating system for use within a vehicle and selectively adjustable between at least two different configurations. The vehicle seating system comprises a seat back, a seat bottom, a first track member, a second track member, a first carriage, and a second carriage. The seat bottom is coupled to the seat back. The second track member is located with respect to the first track member. Each track member is configured to be coupled to the vehicle. The first carriage is coupled to the seat bottom and is moveable within the first track member. The second carriage is coupled to the seat back and is moveable within the second track member. The second carriage and the first carriage are releasably coupled to one another to allow the second carriage to move relative to the first carriage. The position of the second carriage relative to the first carriage is substantially fixed when the coupling of the first carriage and the second carriage is locked. The seating system is adjustable between a first configuration and a second configuration when the coupling of the first carriage and the second carriage is released. When the seating system is in the second configuration, each of the seat back and the seat bottom are oriented substantially vertically and are located adjacent one another.

The present inventions further relate to various features and combinations of features shown and described in the disclosed embodiments. Other ways in which the objects and features of the disclosed embodiments are accomplished will be described in the following specification or will become apparent to those skilled in the art after they have read this specification.

BRIEF DESCRIPTION OF THE DRAWINGS

FIG. 11 is a perspective view of the portion of the track system and the actuation system of FIG. 4B shown in a fourth position.

FIGS. 23A through 23E are side elevational views of a seating system according to an exemplary embodiment in a vehicle and illustrating the different positions of the seating system as it moves from the design position to the folded position.

FIG. 24A through 24E are side elevational views of the seating system of FIGS. 23A through 23E illustrating the different positions of the seating system as it moves from the folded position to the design position.

DETAILED DESCRIPTION OF THE EXEMPLARY AND ALTERNATIVE EMBODIMENTS

Before providing the description of the exemplary and alternative embodiments of the seating systems, it should be noted that references to "outer," "inner," "intermediate," "above," "below," "upper," "lower," "left," "right," "front," "rear," "inboard," "outboard," or other similar terms in this description are merely used to identify the various elements as they are oriented in the figures or as they may be oriented in one or more particular embodiments of the track system. These terms are not meant to limit the element which they describe, as the various elements may be oriented or arranged differently in various seating systems.

Unless specifically noted otherwise, for purposes of this disclosure, the term "coupled" is intended to mean the joining of two members directly or indirectly to one another. Such joining may be stationary in nature or moveable in nature.

Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figure 1:
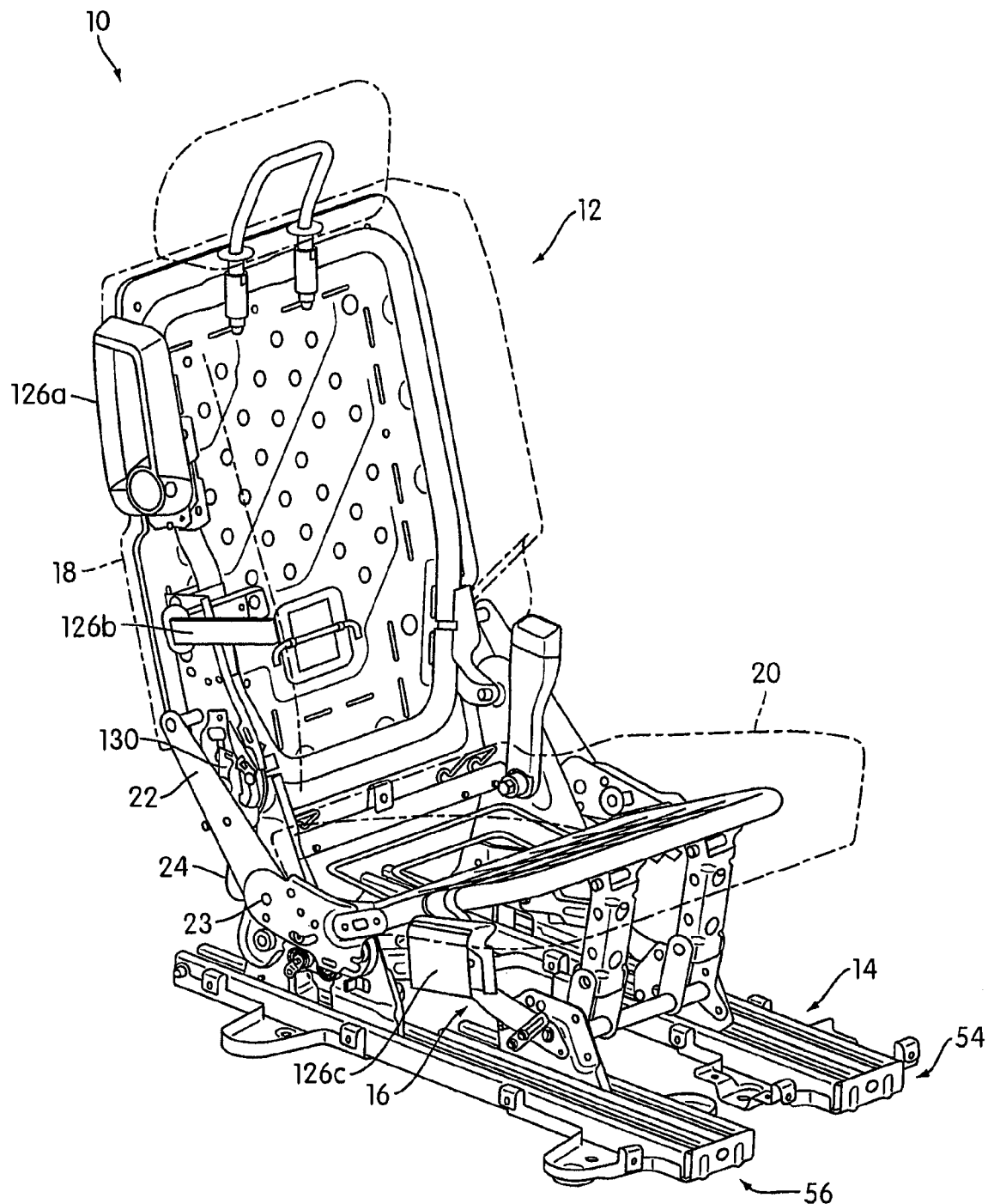
FIG. 1 is a perspective view of a seating system according to an exemplary embodiment.
Figure 2:
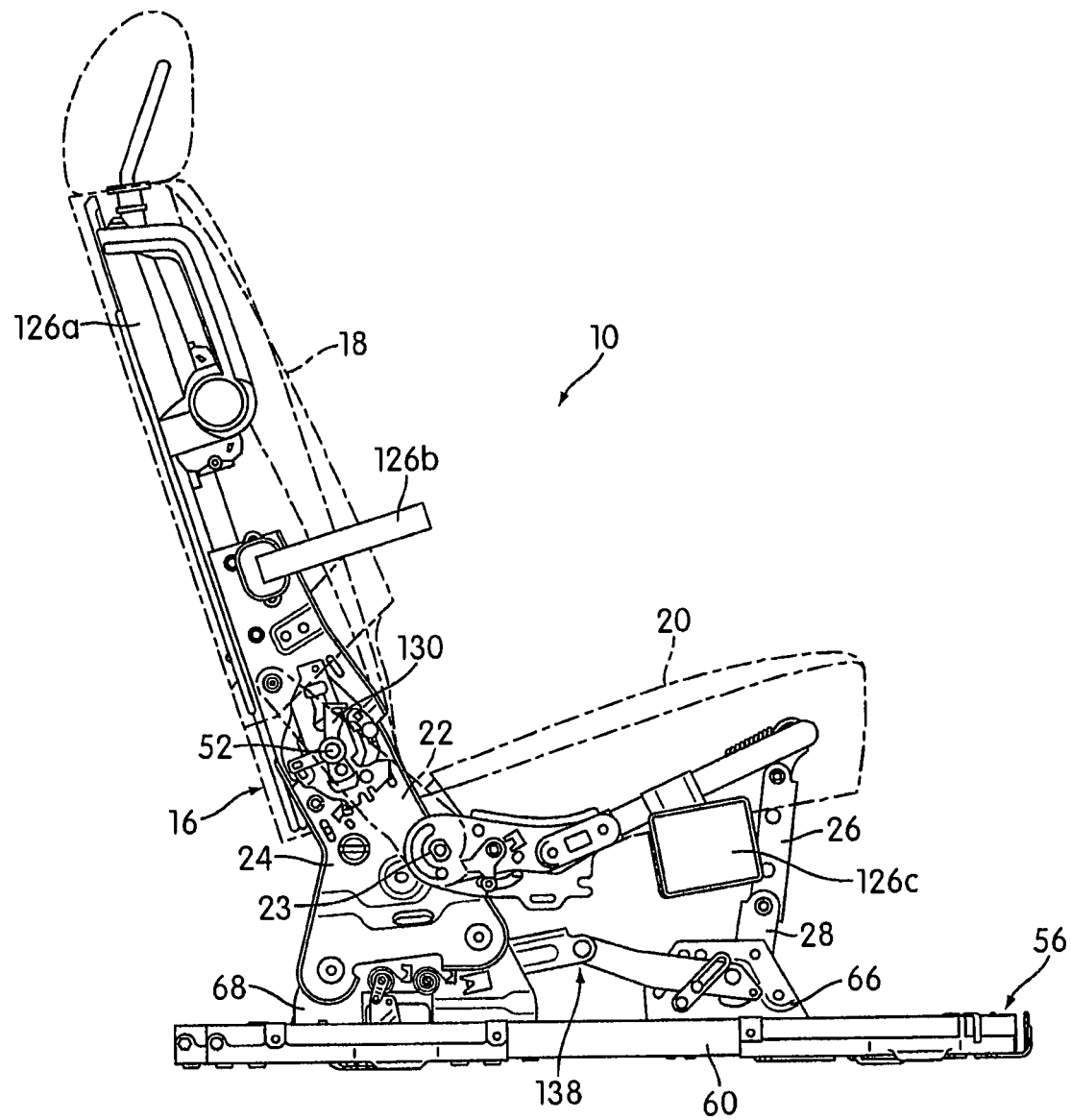
FIG. 2 is a side view of the seating system of FIG. 1.

Referring to FIGS. 1 and 2, a seat system 10 is shown according to one exemplary embodiment. Seat system 10 includes a seat 12, a track system 14, and an actuation system 16.

Figure 3:
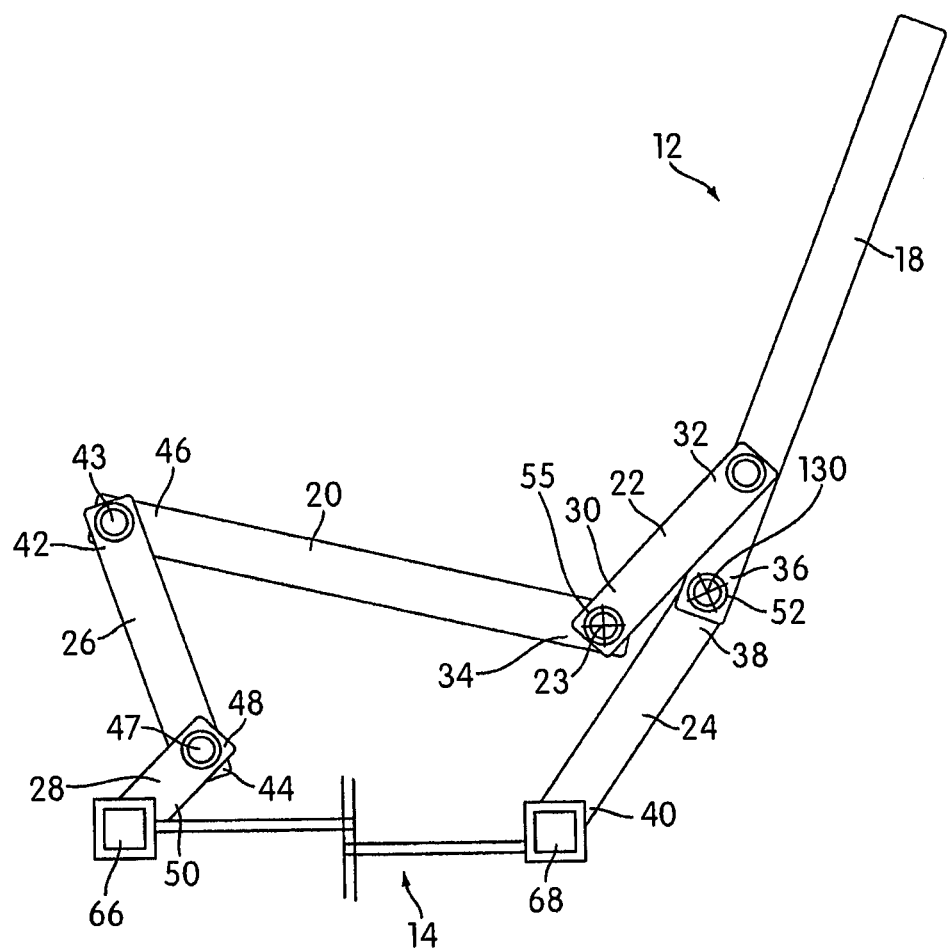
FIG. 3 is a schematic side view of a seat according to an exemplary embodiment.

As best seen in FIGS. 1-3, seat 12 generally includes a backrest 18, a seat cushion 20, a link 22, a seat cushion latch 23, a rear frame 24, a front frame 26, and a front bracket 28. Backrest 18 (e.g., seat back) and seat cushion 20 (e.g., seat bottom) generally form the back and bottom, respectively, of seat 12 and individually may take one of a plurality conventional or novel configurations or arrangements. Generally, each of backrest 18 and seat cushion 20 includes a cushioning material, such as foam, that is covered by a suitable covering material (such as cloth, vinyl, or leather) and supported by a rigid frame, as is well known and understood for vehicle seats.

Link 22 (e.g., linkage, bar, etc.) is a member that generally serves to couple backrest 18 to seat cushion 20 in a manner that not only links backrest 18 and seat cushion 20 but also allows backrest 18 and seat cushion 20 to move and/or rotate relative to one another, such as when seat system 10 is moved to its different positions (described below). Link 22 also generally serves to support a rear portion 34 of seat cushion 20. Link 22 includes a seat cushion end 30 rotatably coupled to rear portion 34 of seat cushion 20 to form a joint 55 that allows seat cushion 20 to pivot or rotate relative to link 22. Link 22 also includes a backrest end 32 that is rotatably coupled to backrest 18 at a location above the point at which backrest 18 is coupled to rear frame 24.

Seat cushion latch 23 (shown schematically in FIG. 3) is coupled to joint 55 and generally serves to control whether seat cushion 20 and link 22 are able to rotate or pivot relative to one another. According to one exemplary embodiment, seat cushion latch 23 is selectively adjustable between a locked state in which joint 55 becomes a fixed joint and seat cushion 20 and link 22 act as a single rigid member, and an unlocked state in which seat cushion 20 and link 22 are free to pivot or rotate relative to one another. Seat cushion latch 23 is operably linked or coupled to a portion of actuation system 16, which controls the actuation of seat cushion latch 23 between the locked and unlocked positions. According to one exemplary embodiment, seat cushion latch 23 includes a biasing device that biases joint 55 in a direction that urges rear portion 34 of seat cushion 20 upward. According to various alternative and exemplary embodiments, the seat cushion latch may take one of a variety of different forms and configurations.

Rear frame or support 24 is a generally rigid member that couples backrest 18 to a portion of track system 14 and that maintains backrest 18 in the appropriate position above the floor of the vehicle in which seat system 10 is located. Rear frame 24 includes an upper end 38 that is rotatably coupled to backrest 18 to form a joint 52 that allows backrest 18 to pivot or rotate relative to rear frame 24. Rear frame 24 also includes a lower end 40 that is rigidly coupled to a portion of track system 14 so that rear frame 24 and backrest 18 move along with the portion of track system 14 to which rear frame 24 is coupled.

Front frame or support 26 is a generally rigid member that couples seat cushion 20 to front bracket 28 (which is itself coupled to a portion of track system 14) and that maintains at least a front portion 46 of seat cushion 20 in the appropriate position above the floor of the vehicle in which seat system 10 is located. Front frame 26 includes an upper end 42 that is rotatably coupled to front portion 46 of seat cushion 20 to form a joint 43 and a lower end 44 that is rotatably coupled to front bracket 28 to form a joint 47.

Front bracket 28 is a generally rigid member that couples front frame 26 to track system 14. Front bracket 28 includes an upper end 48 that is rotatably coupled to lower end 44 of front frame 26 such that front frame 26 may pivot or rotate relative to front bracket 28. Front bracket 28 also includes a lower end 50 that is rigidly coupled to track system 14.

According to various alternative and exemplary embodiments, the different components of the seat may have different sizes, shapes, and configurations depending on the environment in which the seat will be used. According to other various alternative and exemplary embodiments, the seat may take one of a variety of different arrangements that are suited to any particular situation in which the seat will be used. According to still other various alternative and exemplary embodiments, the seat may have a variety of upholstery configurations or materials, and may include one or more of a variety of different appearance enhancing features, such as plastic trim pieces around the bottom of the seat to obscure the view of the various frame pieces, links, and brackets. According to other various alternative and exemplary embodiments, the seat may be actively or passively ventilated and/or heated.

According to one exemplary embodiment, seat 12 is configured to move between at least three different positions. In a first position, hereinafter referred to as the design or seating position, seat 12 is arranged so that seat cushion 20 is generally horizontal and backrest 18 extends generally vertically upwardly from proximate rear portion 34 of seat cushion 20. See FIG. 13A. In the design position, seat 12 is generally configured to allow an occupant of the vehicle to sit on seat 12 in the normal manner. In a second position, hereinafter referred to as the "easy entry" ("EZ-entry"), access, or folded position, both seat cushion 20 and backrest 18 are arranged in a generally vertical orientation, with the front of backrest 18 proximate the bottom of seat cushion 20, and with the upper surface of seat cushion 20 facing forward and being proximate the back side of the backrest of a more forward seat, if there is one. See FIG. 14A. In this configuration, seat 12 is intended to take up a minimum amount of floor space near the rear of a more forward seat (or other structure) to allow an occupant to more easily move through the floor space that would normally be taken up, or covered by, seat 12 when it is in the design position. In a third position, hereinafter referred to as the "stow-flat," cargo, or storage position, both seat cushion 20 and backrest 18 are arranged in a generally horizontal orientation, with the front of backrest 18 being proximate the top of seat cushion 20, and with the back surface of backrest 18 facing upward. See FIG. 15D. In this configuration, seat 12 is intended to facilitate the storage or transport of cargo by providing an additional horizontal surface (which may be parallel to, and/or level with, the vehicle or cargo floor surrounding seat 12) upon which to store cargo. The manner in which seat 12 moves between these three different positions is discussed in more detail below. According to various alternative and exemplary embodiments, the seat may be configured to move between only two of the three different positions described above or between other positions.

Referring now in particular to FIGS. 1-2, 4A-4B, 6-8 and 11-12, track system 14 includes an inboard track arrangement 54 and an outboard track arrangement 56 (see FIG. 1). Inboard track arrangement 54 and outboard track arrangement 56 are generally configured to enable an occupant of seat 12 to adjust the position of seat 12 in a translational (i.e., forward and rearward) direction and to move seat 12 between the design position (e.g., the position in which an occupant may be seated on seat 12, FIG. 13A), the folded or easy entry position (e.g., the position in which both seat cushion portion 20 and back portion 18 are oriented generally vertically and moved forward, FIG. 14A), and the storage or cargo position (e.g., the position in which backrest 18 is pivoted forward into a generally horizontal orientation, FIG. 15D). Inboard track arrangement 54 and outboard track arrangement 56 are coupled to seat 12 in a generally spaced-apart and parallel relationship, with inboard track arrangement 54 being aligned with the inboard side of seat 12 and outboard track arrangement 56 being aligned with the outboard side of seat 12. Outboard track arrangement 56 is generally identical to inboard track arrangement 54, except that outboard track arrangement 56 is a mirror image of inboard track arrangement 54. Accordingly, the same reference numbers will be used to refer to like components of inboard track arrangement 54 and outboard track arrangement 56. For simplicity, only inboard track arrangement 54 will be described below, it being understood that the description applies equally to outboard track arrangement 56 unless expressly stated otherwise. According to one exemplary embodiment, inboard track arrangement 54 includes an inner track 58, an outer track 60, a front support 62, a rear support 64, a front carriage 66, and a rear carriage 68.

Figure 4A:
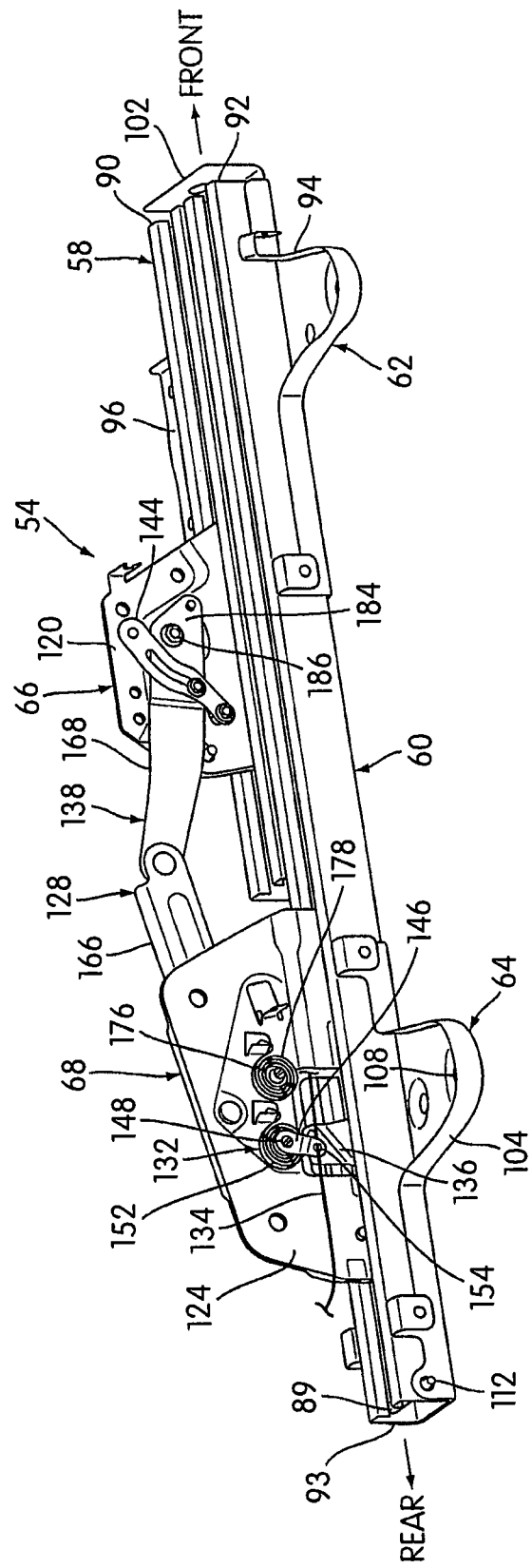
FIGS. 4A and 4B are perspective views, taken from generally opposite directions, of a portion of a track system and an actuation system of a seating system according to an exemplary embodiment, shown in a first position.
Figure 4B:
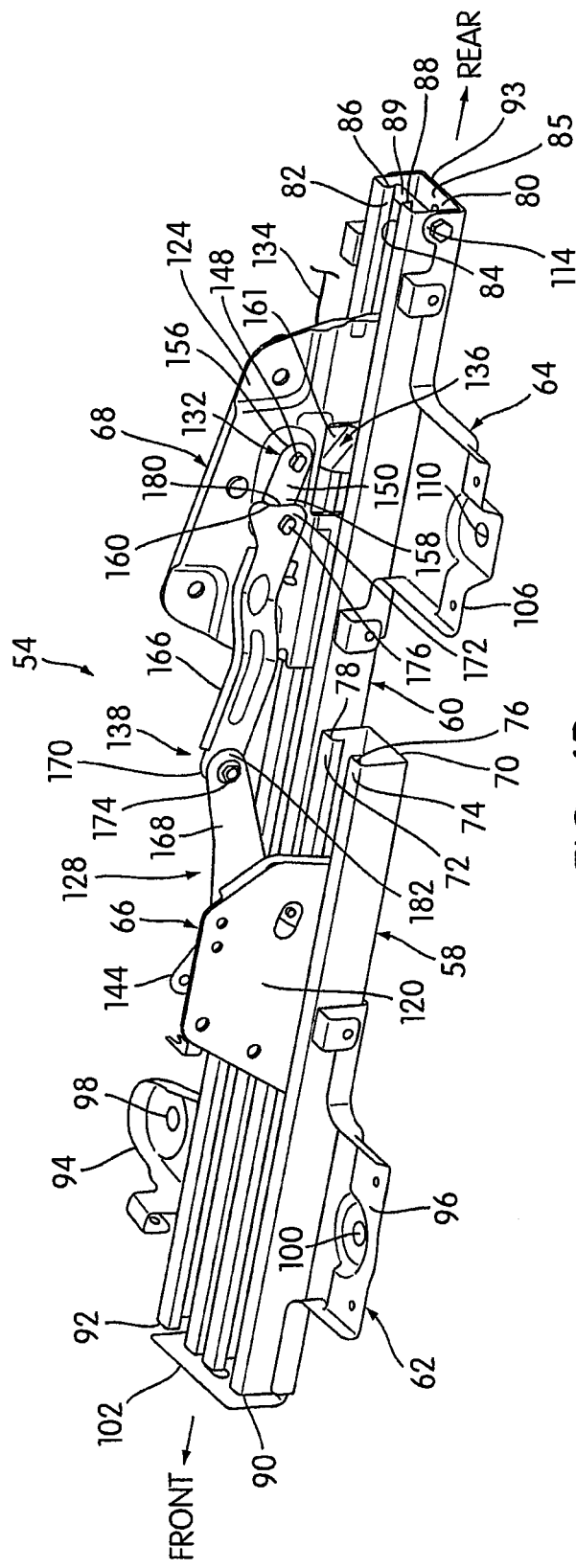
Figure 8:
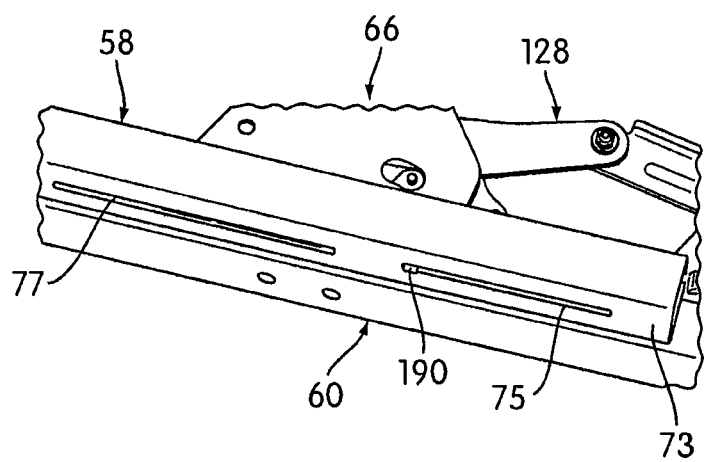
FIG. 8 is a bottom perspective view of a portion of the track system and the actuation system of FIG. 4B shown in the third position.

Referring now to FIGS. 4A and 4B, inner track 58 (e.g., track, rail, slide, guide, etc.) is an elongated and generally rigid member configured to be coupled to a structure, such as the floorboard of a vehicle, and to generally serve as a guide for front carriage 66. According to one exemplary embodiment, inner track 58 is symmetrical and includes a generally U-shaped body or channel portion 70 and two generally L-shaped flanges 72 and 74 that extend from each end of channel portion 70. Each of flanges 72 and 74 extends perpendicularly inwardly from an end (or from the top edge of) channel portion 70 and then downward to form two inverted or downwardly-facing channels 76 and 78. Channel portion 70 and inverted channels 76 and 78 cooperate to receive wheels or rollers (described below) included as part of front carriage 66 and to facilitate, guide, and constrain the movement of front carriage 66 along the length of inner track 58. As best seen in FIG. 8, a base or bottom wall 73 of channel portion 70 includes two elongated slots 75 and 77 that are configured to cooperate with a portion of actuation system 16 (described below). Each of slots 75 and 77 extend along the length of inner track 58, and slot 77 is located in front of slot 75.

Outer track 60 (e.g., track, rail, slide, guide, etc.) is generally identical in cross-section to inner track 58 but is longer than inner track 58. Outer track 60 is an elongated and generally rigid member that is configured to be coupled to a structure, such as the floorboard of a vehicle, and to generally serve as a guide for rear carriage 68. According to one exemplary embodiment, outer track 60 is symmetrical and includes a generally U-shaped body or channel portion 80 and two generally L-shaped flanges 82 and 84 that extend from each end of channel portion 80. Each of flanges 82 and 84 extends perpendicularly inwardly from an end (or from the top edge of) channel portion 80 and then downward to form two inverted or downwardly-facing channels 86 and 88. Channel portion 80 and inverted channels 86 and 88 cooperate to receive wheels or rollers (described below) included as part of rear carriage 68 and to facilitate, guide, and constrain the movement of rear carriage 68 along the length of outer track 60. Outer track 60 also includes a pair of apertures in its side walls that are configured to receive a pin 89 (e.g., post, beam, stop, bolt, stud, rod, etc.) that extends across the width of outer track 60 proximate a rear end 93 of outer track 60. Pin 89 is intended to serve as a hard stop or restraint to stop rear carriage 68 from traveling out of end 93 of outer track 60. Outer track 60 also includes a series of intermittently spaced apertures 87 (see FIG. 20) that are located in a rear portion of a base or bottom wall 85 of outer track 60. The series of apertures 87 extend over a portion of the length of base 85 and are configured to receive a portion of actuation system 16. The series of apertures 87 allow rear carriage 68 to be locked in one of a multitude of possible positions and to be selectively moved between the different positions.

According to various alternative and exemplary embodiments, the inner and the outer tracks may take one of a variety of different shapes, sizes and configurations. For example, one or both of the inner and outer tracks may be similar to the tracks disclosed in U.S. Application No. 60/627,429, entitled "Vehicle Seat Track" and filed on Nov. 12, 2004, which is incorporated herein by reference in its entirety. Moreover, either or both of the inner and outer tracks may be configured so that the channels formed by the track are horizontally oriented rather than vertically oriented. According to other various alternative and exemplary embodiments, either or both of the inner and outer tracks may be asymmetrical or may be specially configured to work with a particular carriage, in a particular setting or environment, or to satisfy other situational requirements. According to still other alternative and exemplary embodiments, the inner and outer tracks may have the same basic shape and configuration, or they may have different shapes and configurations.

Front support 62 (e.g., pad, foot, bracket, anchor, restraint, constraint, hold, brace, etc.) is a generally rigid member that is intended to couple inner track 58 and outer track 60 to the floorboard of a vehicle (or other structure to which track arrangement 54 may be coupled) in a manner that does not allow either inner track 58 or outer track 60 to move significantly during the use of seat 12 and in a manner that maintains the position of inner track 58 relative to outer track 60. According to one exemplary embodiment, front support 62 is configured to retain inner track 58 on the inboard side of outer track 60 (e.g., the side of outer track 60 that faces inward relative to seat 12), with a front edge 90 of inner track 58 generally aligned with a front edge 92 of outer track 60 and with inner track 58 located generally adjacent to outer track 60. To couple inner track 58 and outer track 60 to the vehicle floor or other solid structure of the vehicle, inner track 58 and outer track 60 are coupled to front support 62, which is then coupled to the vehicle floor. To facilitate the coupling of front support 62 to the vehicle floor, front support 62 includes extensions 94 and 96 (e.g., pad or feet) that include apertures 98 and 100, respectively, that are configured to receive a fastener (such as a bolt, for example) or one or more of a variety of other coupling members or devices. Front support 62 facilitates the installation of inner track 58 and outer track 60 within the vehicle by effectively allowing inner track 58 and outer track 60 to be coupled to the vehicle floor as a single unit. Front support 62 also includes a stop or restraint 102, which is a generally rigid plate or structure that extends upwardly in front of both inner track 58 and outer track 60. Stop 102 is intended to block the end of inner track 58 and outer track 60 so that front carriage 66 does not travel (e.g., slide or roll) out of front end 90 of inner track 58 and so that rear carriage 68 does not travel (e.g., slide or roll) out of front end 92 of outer track 60.

Rear support 64 (e.g., pad, foot, bracket, anchor, restraint, constraint, hold, etc.) is a generally rigid member that is intended to couple outer track 60 to the floorboard of a vehicle (or other structure to which track arrangement 54 may be coupled) in a manner that does not allow outer track 60 to move significantly during the use of seat 12. To couple outer track 60 to the vehicle floor or other solid structure of the vehicle, outer track 60 is coupled to rear support 64, which is then coupled to the vehicle floor. To facilitate the coupling of rear support 64 to the vehicle floor, rear support 64 includes arms 104 and 106 that include apertures 108 and 110, respectively, that are configured to receive a fastener (such as a bolt, for example) or one or more of a variety of other coupling members or devices. Rear support 64 also includes a pair of tabs 112 and 114 that extend upward along the sides of outer track 60 proximate a rear edge or end 93 of outer track 60. Tabs 112 and 114 include apertures 116 and 118, respectively, which are configured to receive pin 89 that extends across the width of outer track 60.

According to various alternative and exemplary embodiments, the front support and/or the rear support may take one of a variety of different configurations to accommodate the different types or configurations of vehicle floorboards (or other structures to which of the seat system may be coupled). For example, the extensions of each support may be provided in one of a variety of different shapes, sizes, and configurations in order to fit within, or otherwise accommodate, the contours of a particular floorboard arrangement. According to other various alternative and exemplary embodiments, each support may have any number of arms, flanges, apertures, tabs, projections, and/or other structures that facilitate the coupling of the tracks to the vehicle floorboard.

According to other various alternative and exemplary embodiments, inner and outer tracks 58 and 60 may be located in different positions relative to one another. For example, the inner and outer tracks may be configured such that the front edge of the inner track does not align with the front edge of the outer track, the inner track may be spaced apart from the outer track by different distances, and/or the inner track may be positioned on the outboard side of the outer track.

Referring now to FIGS. 4A, 4B, and 9A-10C, front carriage 66 (e.g., rig, trolley, carrier, cart, etc.) is an assembly that is intended to facilitate the translational movement of front bracket 28 along at least a portion of the length of inner track 58. According to one exemplary embodiment, front carriage 66 includes a body portion 120, two axles 121a and 121b, and four wheels 122. Body portion 120 is a generally rigid structure or member to which wheels 122 are coupled. In addition to providing the supporting structure for wheels 122, body portion 120 is intended to serve as the structure to which other structures, such as front bracket 28 and portions of actuation system 16, are coupled. To facilitate the coupling of such other structures to body portion 120 and to facilitate the appropriate operation of various portions of actuation system 16, body portion 120 includes various apertures, projections, extensions, recesses, slots, grooves, etc., which will generally be described below in connection with actuation system 16. Each axle 121a and 121b is a generally rigid shaft or rod that extends through an aperture in body portion 120 so that a portion of each axle 121a and 121b is provided on each side of body portion 120. Two wheels 122 are coupled to each of axles 121a and 121b on opposite sides of body portion 120. Each wheel 122 is generally configured to fit within one of channels 76 and 78 of inner track 58, depending on which side of body portion 120 wheel 122 is located, and is intended to facilitate the translational movement of body portion 120 along the length of inner track 58. According to one exemplary embodiment, axle 121b and two wheels 122 are provided proximate the front of front carriage 66 and axle 121a and two wheels 122 are provided proximate the rear of front carriage 66.

Referring now to FIGS. 4A-5C, rear carriage 68 (e.g., rig, trolley, carrier, cart, etc.) is generally similar to front carriage 66. Rear carriage 68 is an assembly that is intended to facilitate the translational movement of rear frame 24 along at least a portion of the length of outer track 60. According to one exemplary embodiment, rear carriage 68 includes a body portion 124, two axles 123a and 123b, and four wheels 125. Body portion 124 is a generally rigid structure or member to which wheels 125 are coupled. In addition to providing the supporting structure wheels 125, body portion 124 is intended to serve as the structure to which other structures, such as rear frame 24 and portions of actuation system 16, are coupled. To facilitate the coupling of such other structures to body portion 124 and to facilitate the appropriate operation of various portions of actuation system 16, body portion 124 includes various apertures, projections, extensions, recesses, slots, grooves, etc., which will generally be described below in connection with actuation system 16. Wheels 125 and axles 123 of rear carriage 68 are substantially similar to axles 121 and wheels 122 and are coupled to body portion 124 in the same general manner that axles 121 and wheels 122 are coupled to body portion 120 of front carriage 66. Wheels 125 of rear carriage 68 are configured to be received within outer track 60 (e.g., within one of channels 86 and 88) in the same general manner that wheels 122 of front carriage 66 are configured to be received within inner track 58. According to one exemplary embodiment, axle 123b and two wheels 125 are provided proximate the front of rear carriage 68 and axle 123a and two wheels 125 are provided proximate the rear of rear carriage 68.

According to various alternative and exemplary embodiments, the size, shape, and configurations of the body portions of the front and rear carriages may vary depending on a variety of factors, including the environment in which the seat system is used, the precise configuration of the components coupled to the body portions, space constraints, weight constraints, manufacturing constraints, and a variety of other factors. According to other various alternative and exemplary embodiments, the front and rear carriages may include any number of wheels and/or axles. According to other various alternative and exemplary embodiments, a different number of wheels may be coupled to one side of the body portion of the front or rear carriage than to the other side. According to still other various alternative and exemplary embodiments, each of the wheels may be coupled to the body portion of the front or rear carriage in one of a variety of different ways or manners. According to other various alternative and exemplary embodiments, the wheels of the front or rear carriage may be replaced by a series or set of bearings (e.g., ball bearings, roller bearings, bushings, or other similar structures) that facilitate the movement of the body portion along the inner or outer track. According to still other various alternative and exemplary embodiments, the size, shape, and configuration of the wheels may vary depending on the precise configuration of the front or rear carriages and the tracks. According to still other alternative and exemplary embodiments, the front carriage and/or the rear carriage may include various structures, such as plates or panels that cover a portion of the carriage or that help to rigidify the carriage. According to other various alternative and exemplary embodiments, the carriages may include various apertures, projections, extensions, recesses, slots, grooves, etc., that are appropriate for a particular application.

According to various alternative and exemplary embodiments, the track system may take one of a variety of different configurations. According to one exemplary embodiment, each track arrangement of the track system may include a lower track and an upper track that is coupled to and provided on top of the lower track. A carriage coupled to the seat cushion may be configured to slide along the length of the lower track, while a carriage coupled to the backrest may be configured to slide along the length of the upper track. To allow the seat to be moved from the design position to the folded position and then back to the design position, the upper track may be configured to slide along the length of the lower track. According to another exemplary embodiment, each track arrangement may include a single track that is configured to receive a carriage coupled to the seat cushion and a carriage coupled to the backrest. The carriages may be configured in such a way as to allow the rear carriage to move forward toward the front carriage far enough to allow the seat to be moved into the folded position. According to still other alternative and exemplary embodiments, each of the track arrangements may take any one of a variety of other arrangements that allow a carriage coupled to the backrest and a carriage coupled to the seat cushion to move relative to one another to permit the folding of the seat.

Referring now to FIGS. 1-2 and 4A-12, actuation or control system 16 is operatively coupled to inboard track arrangement 54, outboard track arrangement 56, and seat 12 and generally serves to link or coordinate the movement or operation of inboard track arrangement 54, outboard track arrangement 56, and seat 12. According to one exemplary embodiment, actuation system 16 includes handles or occupant actuation devices 126a, 126b, and 126c, a linkage system 128, and a reclining mechanism or assembly 130.

As shown in FIGS. 1 and 2, handles or occupant actuation devices 126a, 126b, and 126c (e.g., levers, releases, switches, slides, etc.) are structures that are provided on seat 12 to allow an occupant to adjust the position or configuration of seat 12. Each handle is generally configured to control or to initiate different movements of seat 12. Handle 126a is generally configured to control the movement of seat 12 into the folded position as well as the angle of recline of backrest 18. Accordingly, when an occupant or passenger of the vehicle desires to move seat 12 into the folded position or to adjust the recline angle of seat 12, he or she actuates handle 126a. Handle 126a is operatively coupled to reclining mechanism 130 so that the actuation of handle 126a causes portions of reclining mechanism 130 to actuate, which in turn allows the occupant to move seat 12 into the folded position or to adjust the recline angle of backrest 18. Handle 126b is generally configured to control the movement of seat 12 into the storage position as well as the angle of recline of backrest 18. Accordingly, when an occupant or passenger of the vehicle desires to move seat 12 into the storage position or adjust the recline angle of seat 12, he or she actuates handle 126b. Handle 126b is operatively coupled to reclining mechanism 130 so that the actuation of handle 126b causes portions of reclining mechanism 130 to actuate, which in turn allows the occupant to move seat 12 into the storage position or to adjust the recline angle of backrest 18. Handle 126c is generally configured to control the adjustment of the fore/aft position of seat 12. Accordingly, when an occupant or passenger of the vehicle desires to adjust the fore/aft position of seat 12 he or she actuates handle 126c. Handle 126c is operatively coupled to linkage system 128 so that the actuation of handle 126c causes portions of linkage system 128 to actuate, which in turn allows the fore/aft position of seat 12 to be adjusted.

Each of handles 126a, 126b, and 126c is generally located in a position that makes it easy for an occupant to reach and to actuate the handle to perform the function associated with each handle. According to one exemplary embodiment, handle 126a is provided on the outboard side of backrest 18 of seat 12 so that someone standing outside the vehicle and desiring to enter the vehicle may easily reach and actuate handle 126a. According to one exemplary embodiment, handle 126b is also provided on the outboard side of backrest 18 of seat 12 so that someone standing outside the vehicle and desiring to increase the storage space within the vehicle may easily reach and actuate handle 126b. According to one exemplary embodiment, handle 126c is provided on the outboard side of cushion 20 of seat 12 so that someone sitting on seat 12 and desiring to adjust the fore/aft position of seat 12 may easily reach down and actuate handle 126c.

According to various alternative and exemplary embodiments, each of the handles or occupant actuation devices may take one of a variety of different shapes, sizes, and configurations. For example, the handle may be ergonomically designed to fit within an occupant's fingers, it may be designed to correspond to or follow the contours of a portion of seat 12, it may be rigid, it may be flexible (e.g., a strap or cord), and it may be made from one or more of a variety of different materials. According to other alternative and exemplary embodiments, each handle may be positioned in various locations on or around the seat. For example, one or more of the handles may be located below the seat cushion, on the back of the backrest, below the backrest and behind the seat cushion, on the side of the seat cushion, or at a variety of other locations. According to other alternative and exemplary embodiments, each handle may be mechanically coupled to the relevant components, may be electrically coupled to the relevant components, or may be operatively coupled to the relevant components in another manner (e.g., wirelessly, etc.). According to still other various alternative and exemplary embodiments, one or more of the handles may be configured to perform multiple functions and may replace one or more of the other handles.

Referring now to FIGS. 4A-12, linkage system 128 is intended to serve as the system of components that link handles 126a, 126b, and 126c, reclining mechanism 130, seat 12, inboard track arrangement 54, and outboard track arrangement 56 together and that coordinate the movements of these components relative to one another. Linkage system 128 includes a cam assembly 132, a cam linkage 134, a track latch 136, a carriage link assembly 138, a first stop 140, a second stop 142, and a bracket 144.

As shown in FIGS. 4A-5C, cam assembly 132 is an assembly of components that release track latch 136 and that unlock carriage link assembly 138 when acted upon by cam linkage 134. Cam assembly 132 includes an arm 146, a shaft 148, a cam 150, a biasing device 152, and an engagement member 153.

Arm 146 is a generally rigid and elongated member that is coupled to shaft 148 proximate one end and that includes an aperture 154 proximate the other end. Aperture 154 is configured to receive cam linkage 134. Arm 146 is configured so that the movement of cam linkage 134 causes arm 146 to pivot around the axis of shaft 148. Arm 146 is coupled to shaft 148 in such a way (e.g., through the use of a keyed aperture and shaft) that movement of arm 146 is transferred to shaft 148 so that shaft 148 pivots or rotates along with arm 146.

Shaft 148 (e.g., pin, axle, rod, beam, etc.) is a generally rigid member that extends through body portion 124 of rear carriage 68 and that is intended to transfer the movement of arm 146 to cam 150, which is coupled to shaft 148 on the side of body portion 124 that is opposite the side on which arm 146 is coupled. According to one exemplary embodiment, shaft 148 has the general shape of a cylindrical rod and includes two opposing flat surfaces on each end that, when coupled to similarly shaped apertures in arm 146 and cam 150, prevent arm 146 and cam 150 from pivoting or rotating relative to shaft 148. According to various alternative and exemplary embodiments, a variety of other conventional techniques or methods may be used or employed to couple the shaft to the arm and to the cam, and to prevent the arm and the cam from rotating relative to the shaft. According to other various alternative and exemplary embodiments, the shaft may be integrally formed as part of either the arm or the cam. According to still other alternative and exemplary embodiments, the shaft may take one of a variety of different shapes, sizes, and configurations.

Cam 150 (e.g. tab, arm, restraint, latch, etc.) is a generally rigid member that is intended to serve as a device that locks and unlocks carriage link assembly 138. Cam 150 is coupled to the end of shaft 148 that is opposite the end to which arm 146 is coupled and is configured to pivot around the axis of shaft 148 when arm 146 is actuated by cam linkage 134. Cam 150 includes a first end 156, which is proximate the point at which shaft 148 is coupled to cam 150, and a second end 158, which is opposite first end 156 and which is spaced apart from shaft 148. Cam 150 includes an aperture proximate first end 156 that is configured to receive shaft 148 in a manner that does not generally permit cam 150 to pivot or rotate relative to shaft 148. As discussed above, the aperture in cam 150 may include two flat surfaces that correspond to the two flat surfaces on the end of shaft 148, which together help to ensure that cam 150 and shaft 148 pivot or rotate together. Second end 158 includes a curved surface or edge 160 that is intended to releasably engage a corresponding curved surface on carriage link assembly 138 to lock carriage link assembly 138 in place.

According to various alternative and exemplary embodiments, the cam may be configured to engage and disengage the corresponding portion of the carriage link assembly in one of a variety of different ways and may include various projections, grooves, slots, recesses, etc. that engage or interface with corresponding structures that may be provided on the corresponding portion of the carriage link assembly.

Biasing device 152 (e.g., spring, elastic member, resilient member, etc.), which is shown as a spiral torsion spring, is coupled to shaft 148 and biases shaft 148 toward the position in which cam 150 locks carriage link assembly 138 in place. Biasing device 152 includes a first end coupled to shaft 148 and a second end coupled to a projection or extension of body portion 124 of rear carriage 68. As a result of the bias applied by biasing device 152, any force applied by cam linkage 134 to arm 146 in order to move cam 150 from the position in which it locks carriage link assembly 138 in place to the position where carriage link assembly 138 is no longer locked in place must be sufficient to overcome the bias applied by biasing device 152. According to various alternative and exemplary embodiments, the biasing device may be any one of a variety of different springs or other biasing devices.

Engagement member 153 is a generally rigid member that is coupled to shaft 148 and that rotates along with shaft 148. Engagement member 153 is configured to engage or contact a portion of track latch 136 as shaft 148 rotates to move track latch 136 from an engaged position to a disengaged position.

According to various alternative and exemplary embodiments, the cam assembly may take any one of a wide variety of different configurations that are suitable to selectively lock and unlock the carriage link assembly. For example, the cam assembly may include a pin configured to engage and disengage an aperture in the carriage link assembly to selectively lock the carriage link assembly. The cam assembly could also be configured to engage or interface with the side rather than the end of the carriage link assembly.

Cam linkage 134, shown in FIG. 4A, is a device or series of devices that couple cam assembly 132 to reclining mechanism 130 in such a way that movement of backrest 18 (which is at least partially transferred to reclining mechanism 130) actuates cam assembly 132. Cam linkage 134 may be made from one or more of a variety of different materials and devices, including cables, rods, wires, etc. According to one exemplary embodiment, cam linkage 134 links cam assembly 132 and reclining mechanism 130 in such a way that cam assembly 132 is actuated when backrest 18 is pivoted or rotated forward around joint 52 beyond the normal range of adjustment of backrest 18. According to various alternative and exemplary embodiments, cam linkage 134, cam 150, reclining mechanism 130, and backrest 18 are configured such that cam assembly 132 is actuated when backrest 18 is pivoted or rotated forward by a certain amount or beyond a certain point such as the point at which backrest 18 is nearly perfectly vertical, the point where backrest 18 has been pivoted or rotated forward by at least 22 degrees, the point where backrest 18 has been pivoted or rotated forward approximately 5 degrees beyond the point at which backrest 18 assumes a nearly perfectly vertical position, or some other point.

Figure 5A:
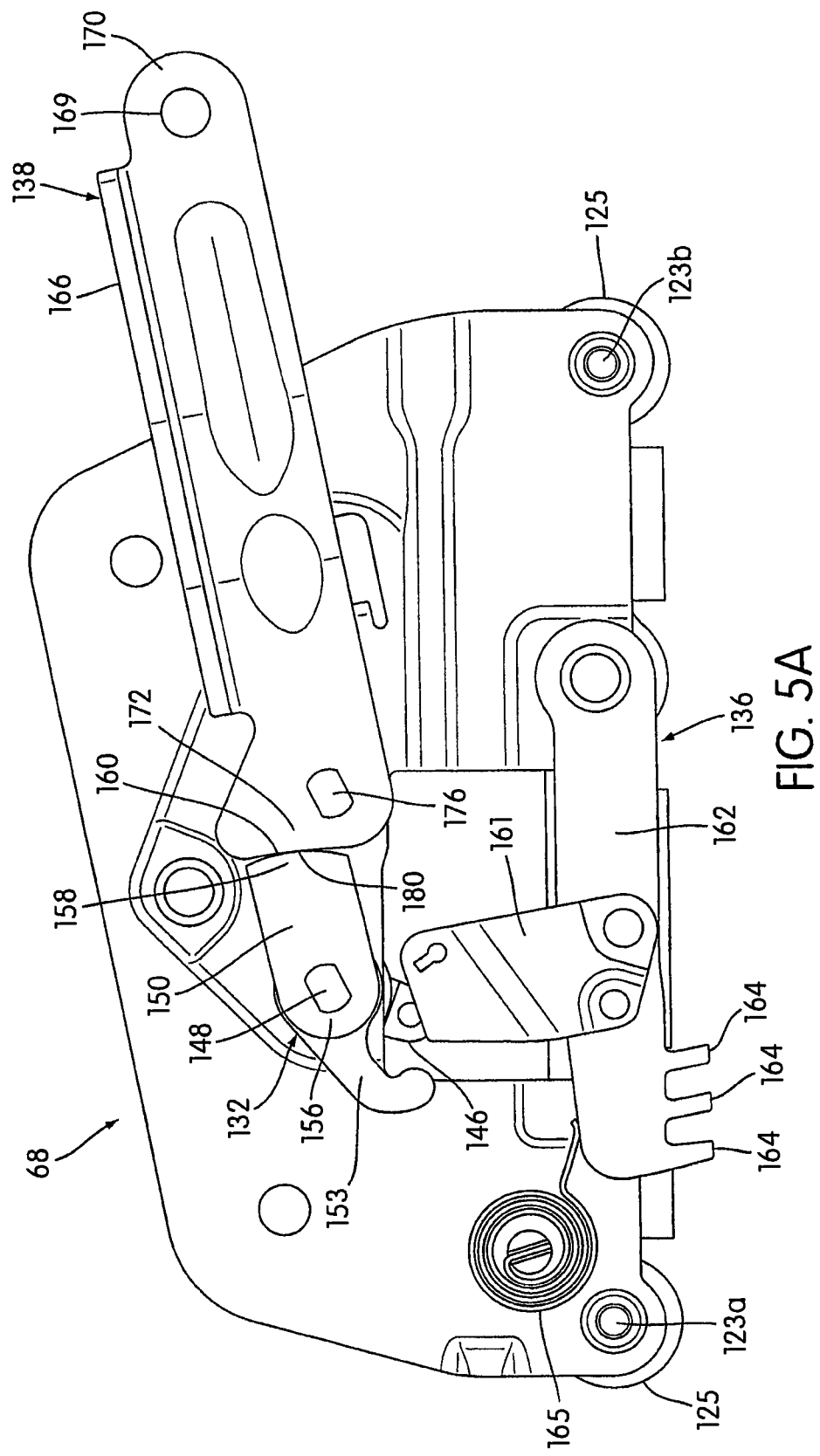
FIGS. 5A, 5B, and 5C are side elevational views of a rear carriage and a track latch according to an exemplary embodiment showing the track latch in different positions.
Figure 5B:
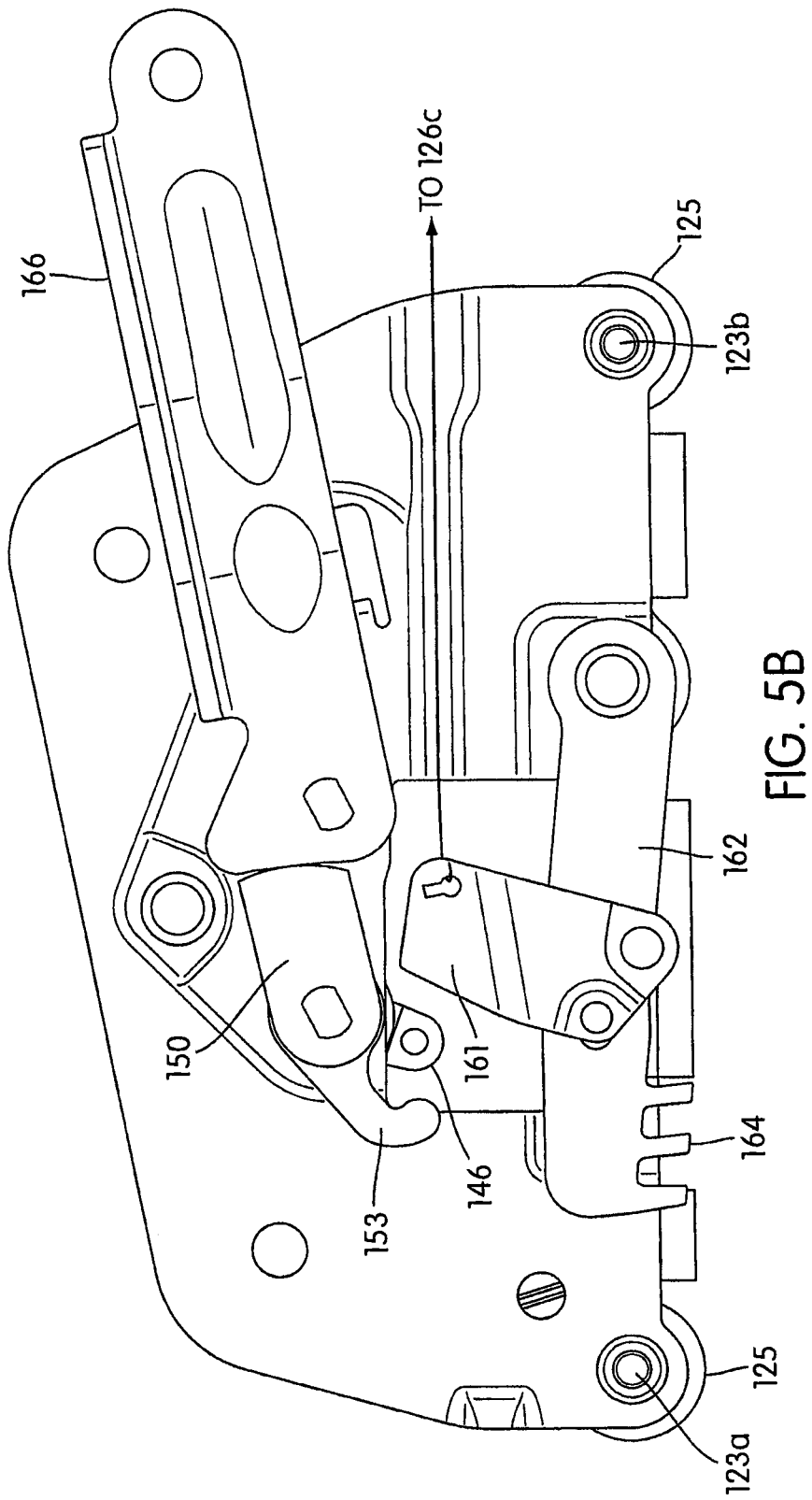
Figure 5C:
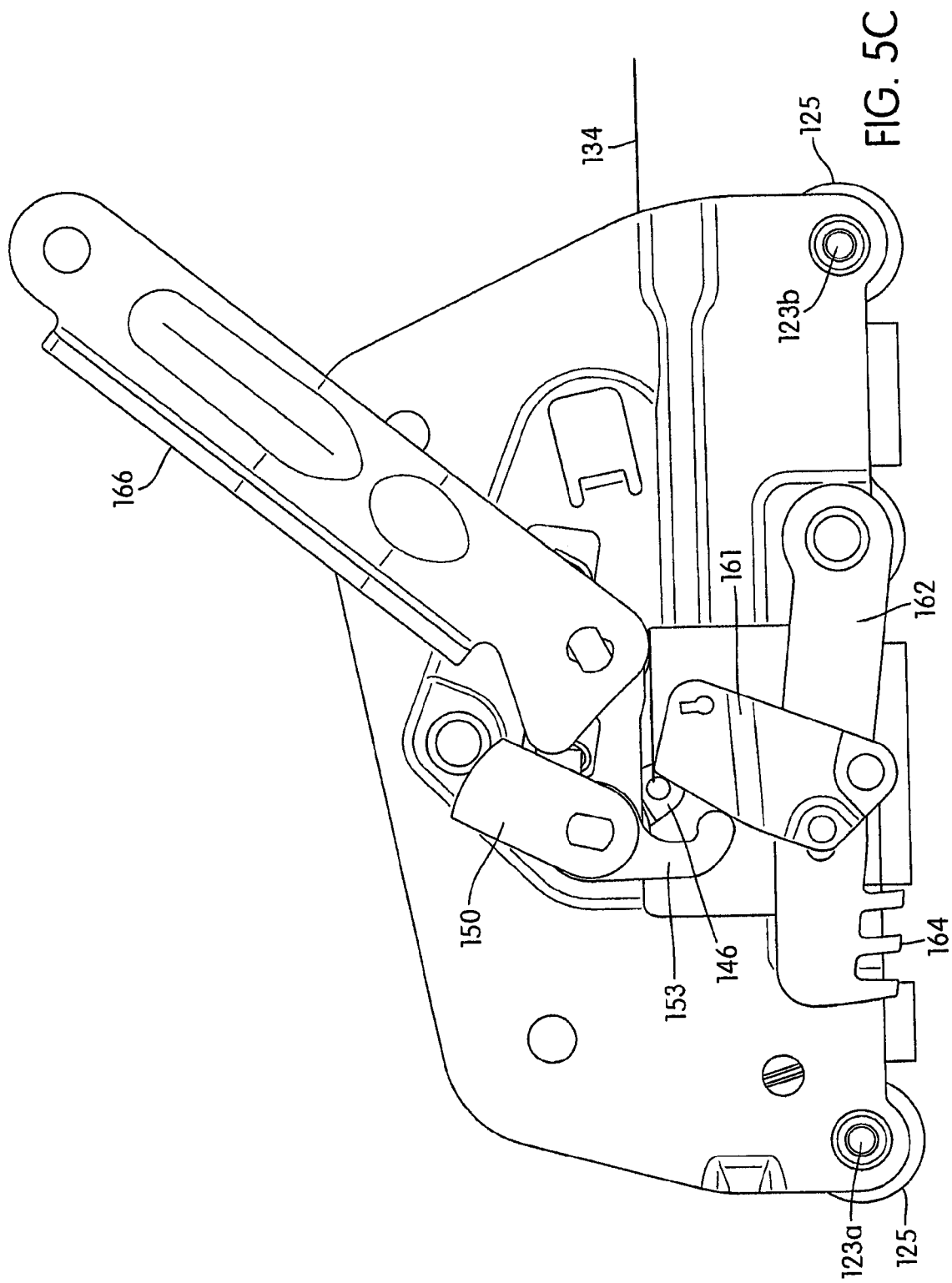

As best shown in FIGS. 5A-5C, track latch 136 (e.g., engagement member, finger, claw, pawl, etc.) is an assembly of components that is coupled to rear carriage 68 and configured to engage one or more of the series of apertures 87 in outer track 60 proximate its rear portion to releasably retain rear carriage 68 in a particular position along outer track 60 and to allow for the selective adjustment of the position of rear carriage 68 within outer track 60. According to one exemplary embodiment, track latch 136 includes a member 161, a body portion 162, three fingers or projections 164 that extend downwardly from body portion 162, and a biasing device 165. Member 161 is a structure coupled to body portion 162 that is configured to be operatively coupled to handle 126c (e.g., via one or more linkages such as wires, cords, cables, etc.) and to be engaged by engagement member 153. Body portion 162 is a generally rigid, elongated member that is pivotably coupled to rear carriage 68 on one end and that includes fingers 164 on the other end. Fingers 164 extend downwardly from body portion 162 and are configured to engage apertures 87 in outer track 60. Biasing device 165 (shown as a torsion spring) biases track latch 136 toward the engaged position.

Track latch 136 is generally configured to move between an engaged position in which fingers 164 are engaged with, or received within, apertures 87, and a disengaged position in which fingers 164 are not received within or otherwise engaged with apertures 87. Member 161 is coupled to body portion 162 in a manner that causes body portion 162 and fingers 164 to rotate upward into the disengaged position when handle 126c is actuated (such as when a vehicle occupant wants to adjust the fore/aft position of seat 12) and that allows body portion 162 and fingers 164 to return to the engaged position when handle 126c is released. See FIG. 5B. Member 161 is also coupled to body portion 162 in a manner that causes body portion 162 and fingers 164 to rotate upward into the disengaged position when engagement member 153 contacts member 161. See FIG. 5C. Engagement member 153 is configured to contact member 161 after a vehicle occupant initiates the movement of seat 12 into the folded position by actuating handle 126a and pivoting backrest 18 forward.

According to various alternative and exemplary embodiments, the track latch may take one of a variety of different shapes, sizes, and configurations. According to one exemplary embodiment, the track latch may be similar to the latches described in U.S. Application No. 60/627,429. According to other various alternative and exemplary embodiments, the track latch may include any number of fingers. According to still other various alternative and exemplary embodiments, the size and shape of the fingers may vary depending on the size and shape of the corresponding apertures in the track and on the particular situation or environment in which the seating system will be used.

Carriage link assembly 138 (e.g., coupler, interface, interlock, linkage, etc.) is an assembly of structures that link rear carriage 68 to front carriage 66. Carriage link assembly 138 includes a rear portion or segment 166 and a front portion or segment 168.

Referring now in particular to FIGS. 4B and 5A, rear portion or segment 166 (e.g., arm, link, member, etc.) is an elongated, rigid member having a front end 170 rotatably coupled to front portion 168 and a rear end 172 rotatably coupled to rear carriage 68. According to one exemplary embodiment, rear portion 166 includes an aperture 169 proximate front end 170 that is configured to receive a fastener shown as pin 174 (e.g., shaft, screw, bolt, stud, rod, beam, axle, etc.) to couple rear portion 166 to front portion 168 in a manner that allows rear portion 166 and front portion 168 to rotate around pin 174 independently of one another. Rear portion 166 is coupled to rear carriage 68 in the same general manner that cam 150 is coupled to rear carriage 68. Rear end 172 of rear portion 166 includes an aperture coupled to a shaft 176 that is rotatably coupled to body portion 124 of rear carriage 68 generally near where shaft 148 is coupled to rear carriage 68. Like shaft 148, shaft 176 is a generally cylindrical rod that includes two opposing flat surfaces on the end to which rear portion 166 is coupled. The aperture in rear end 172 of rear portion 166 has a general shape that corresponds to the shape of the end of shaft 176 and is configured to receive shaft 176 in a manner that does not generally permit rear portion 166 to rotate or pivot relative to shaft 176. Rear end 172 of rear portion 166 also includes an edge or surface 180 configured to engage or interface with surface 160 of cam 150. Generally, the shape or curvature of surface 180 corresponds to that of surface 160 of cam 150. On the side of body portion 124 of rear carriage 68 that is opposite the side to which rear portion 166 is coupled, a biasing device 178 (e.g., spring, elastic member, resilient member, etc.), shown as a spiral torsion spring, is coupled to shaft 176 in the same general manner that biasing device 152 is coupled to shaft 148. Biasing device 178 is intended to bias shaft 176 such that shaft 176 biases carriage link assembly 138 toward the locked position (described below). According to various alternative and exemplary embodiments, the biasing device may be any one of a variety of different springs or other biasing devices.

As best shown in FIGS. 4A, 4B, and 10A-10C, front portion or segment 168 (e.g., arm, link, member, etc.) is an elongated, rigid member having a rear end 182 that is rotatably coupled to front end 170 of rear portion 166 and a front end 184 that is rotatably coupled to front carriage 66. According to one exemplary embodiment, front portion 168 includes an aperture proximate rear end 182 that is configured to receive the fastener shown as pin 174, which extends through aperture 169 in rear portion 166 so as to couple rear portion 166 to front portion 168 in a manner that allows rear portion 166 and front portion 168 to rotate around pin 174 independently of one another. Front portion 168 also includes an aperture proximate front end 184 that is configured to receive a fastener 186 that serves to rotatably couple front portion 168 to front carriage 66 in a manner that allows front portion 168 to pivot or rotate around the axis of fastener 186 relative to front carriage 66. According to various alternative and exemplary embodiments, one or more of a variety of different fasteners may be used to rotatably couple the front portion to the front carriage, including various combinations of nuts, bolts, rivets, screws, pins, snaps, snap rings, and one or more of a variety of other types of fasteners or coupling devices.

To link or coordinate the movement of front portion 168 with other portions of linkage system 128, a pin 187 and a pin 189 are coupled to front portion 168. Pin 187 is coupled to front portion 168 at a position rearward of fastener 186 (when carriage link assembly 138 is in the locked position) and is configured to be received by bracket 144. Pin 189 is coupled to front portion 168 at a position forward of fastener 186 (when carriage link assembly 138 is in the locked position) and is configured to extend through a curved slot 191 in body portion 120. The portion of pin 189 that extends through curved slot 191 is configured to engage, or interface with, a portion of stop 142.

According to various alternative and exemplary embodiments, the rear portion and the front portion of the carriage link assembly may be rotatably coupled to one another in one of a variety of different ways using one of a variety of conventional or novel methods or techniques. For example, a pin may be integrally formed as a single unitary body with either the rear portion or the front portion and may be received within an aperture provided on the other of the rear portion or the front portion. According to other various alternative and exemplary embodiments, the rear portion and/or the front portion of the carriage link assembly may include one or more of a variety of different structures, projections, channels, extensions, recesses, etc. that are intended to facilitate the coupling of the rear portion and the front portion, that are configured to allow the front portion and the rear portion to pivot or rotate relative to one another, or that are intended to engage other components of the actuation system, the track system, or the seat. According to other exemplary and alternative embodiments, each of the front portion and the rear portion may take one of a variety of different shapes, sizes, and configurations depending on the environment in which the carriage link assembly is used, the application in which the seating system is used, the configuration of the other components of the seating system, manufacturing costs, and a variety of other possible factors.

Figure 9A:
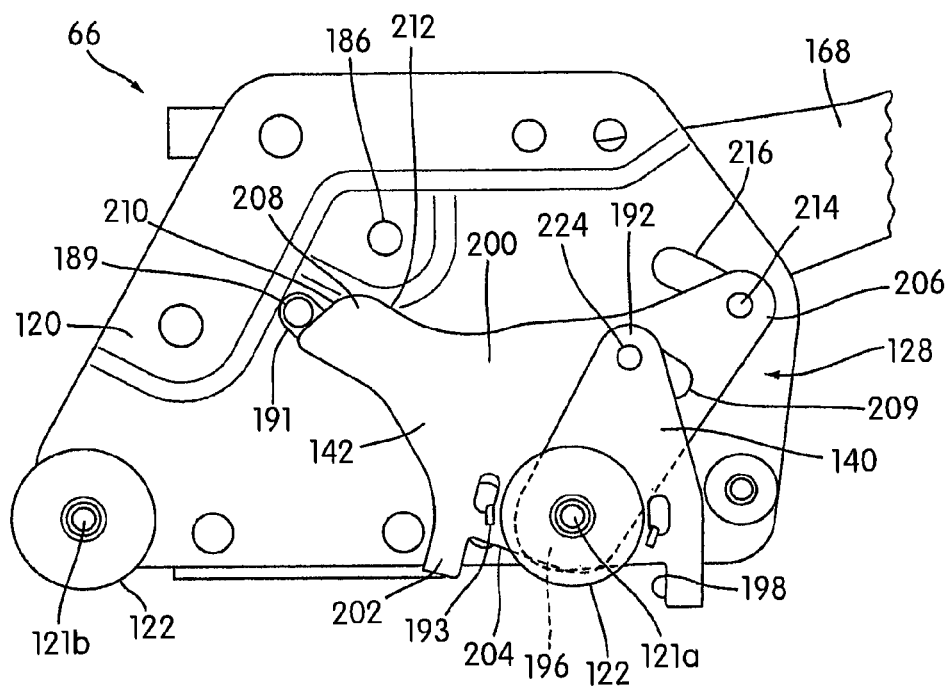
FIGS. 9A, 9B, and 9C are partial side elevational views of a carriage and a portion of an actuation system according to an exemplary embodiment, shown in three different positions.
Figure 9B:
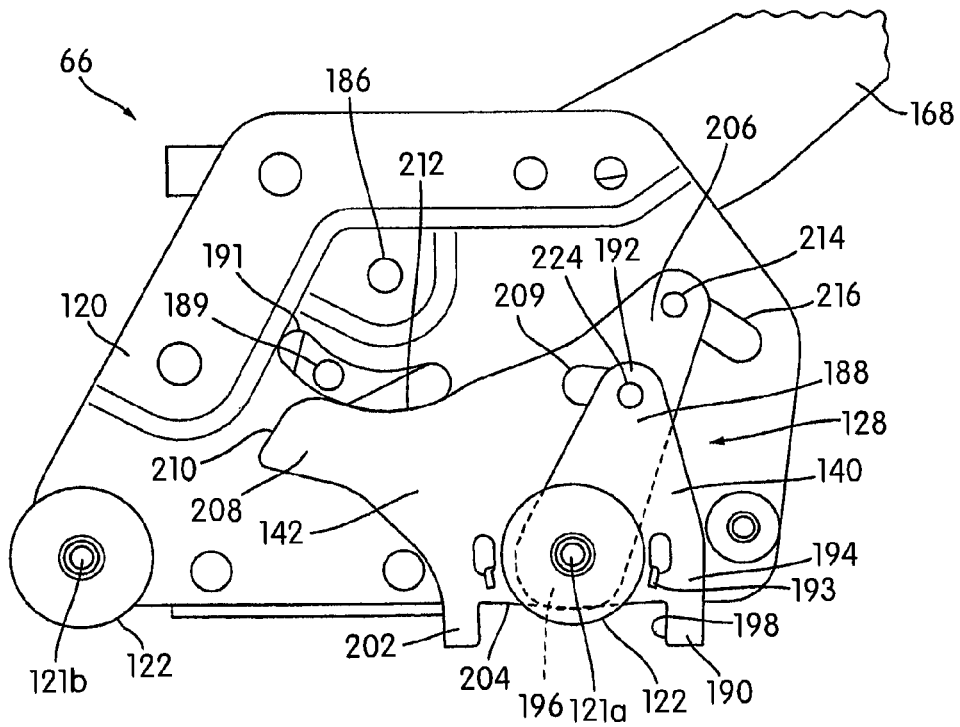
Figure 9C:
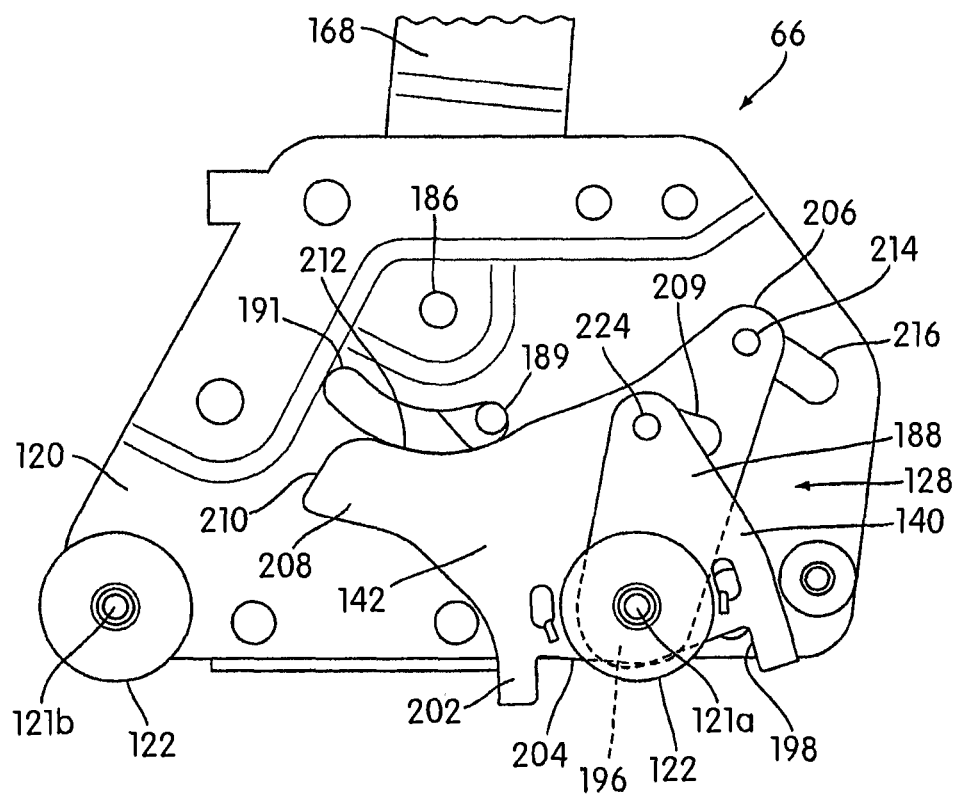

As best shown in FIGS. 9A-9C, stop 140 (e.g., toggle, latch, switch, release, etc.) is a generally rigid member that is coupled to front carriage 66 in a manner that allows stop 140 to move (e.g., rotate or pivot) between an engaged position, in which a portion of stop 140 extends into rear slot 75 of inner track 58, and a disengaged position, in which stop 140 no longer extends into rear slot 75. According to one exemplary embodiment, stop 140 is coupled to front carriage 66 on the side that is opposite the side to which front portion 168 of carriage link assembly 138 is coupled and includes a body portion 188 and an extension 190. Body portion 188 has a generally triangular shape and includes an upper portion 192, a lower rear portion 194, and a lower front portion 196. Proximate lower front portion 196, body portion 188 includes an aperture configured to receive axle 121a of front carriage 66, which serves to rotatably couple stop 140 to front carriage 66. A biasing device 193, shown as a torsion spring, is coupled to axle 121a and stop 140 (as well as stop 142) and biases stop 140 toward the engaged position. Extension 190 extends downwardly from proximate lower rear portion 194 and is configured to enter into, and slide within, rear slot 75 of inner track 58. A front edge 198 of extension 190 is angled (e.g., includes a back driveable angle) so that stop 140 will resist rotating (and thereby disengaging extension 190 from slot 75) when front carriage 66 is moved forward and front edge 198 of extension 190 contacts the end of rear slot 75. As described more fully below, body portion 188 also includes an aperture proximate upper portion 192 that is configured to receive a pin extending from bracket 144.

Stop 142 (e.g., toggle, latch, switch, release, etc.) is a generally rigid member that is coupled to front carriage 66 in manner that allows stop 142 to move (e.g., rotate or pivot) between an engaged position, in which a portion of stop 142 extends into front slot 77 of inner track 58, and a disengaged position, in which stop 142 no longer extends into front slot 77. According to one exemplary embodiment, stop 142 is coupled to front carriage 66 on the side that is opposite the side to which front portion 168 of carriage link assembly 138 is coupled and includes a body portion 200 and an extension 202. Body portion 200 includes a base 204, an arm 206 that extends upwardly and rearwardly from base 204, an arm 208 that extends upwardly and forwardly from base 204, and a slot 209 configured to receive a pin (described below) that is coupled to bracket 144 and stop 140. Proximate the rear portion of base 204, body portion 200 includes an aperture that is configured to receive axle 121*a* of front carriage 66, which serves to rotatably couple stop 142 to front carriage 66. As discussed above in connection with stop 140, biasing device 193 is coupled to axle 121*a* and stop 142 (as well as stop 140) and biases stop 142 toward the engaged position. A pin 214 is coupled to arm 206 proximate its distal end. Pin 214 extends through a slot 216 in body portion 120 of front carriage 66 and is configured to interact with the lower edge of front portion 168 of carriage link assembly 138. Arm 208 is defined by a generally vertical surface 210 that gradually transitions into a generally horizontal, curved surface 212 that extends toward arm 206. As will be described in more detail below, surfaces 210 and 212 are configured to cooperate or interface with pin 189 of front portion 168 of carriage link assembly 138 to coordinate the movement of stop 142 and carriage link assembly 138. Extension 202 extends downwardly from proximate the front portion of base 204 and is configured to enter into, and slide within, front slot 77 of inner track 58.

According to various alternative and exemplary embodiments, each of the stops, may take one of a variety of different shapes, sizes, and configurations and may interact with one another or with other components of the seating systems in one or more of a variety of different ways.

Figure 10A:
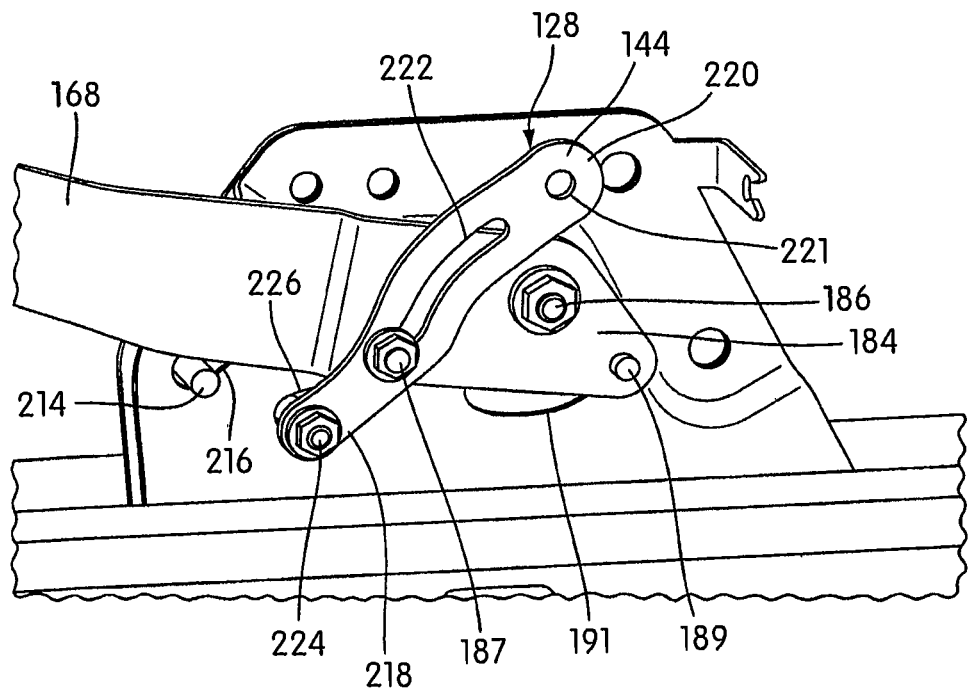
FIGS. 10A, 10B, and 10C are partial side elevational views of the opposite side of the carriage and the portion of the actuation system of FIGS. 9A, 9B, and 9C, shown in the three different positions.
Figure 10B:
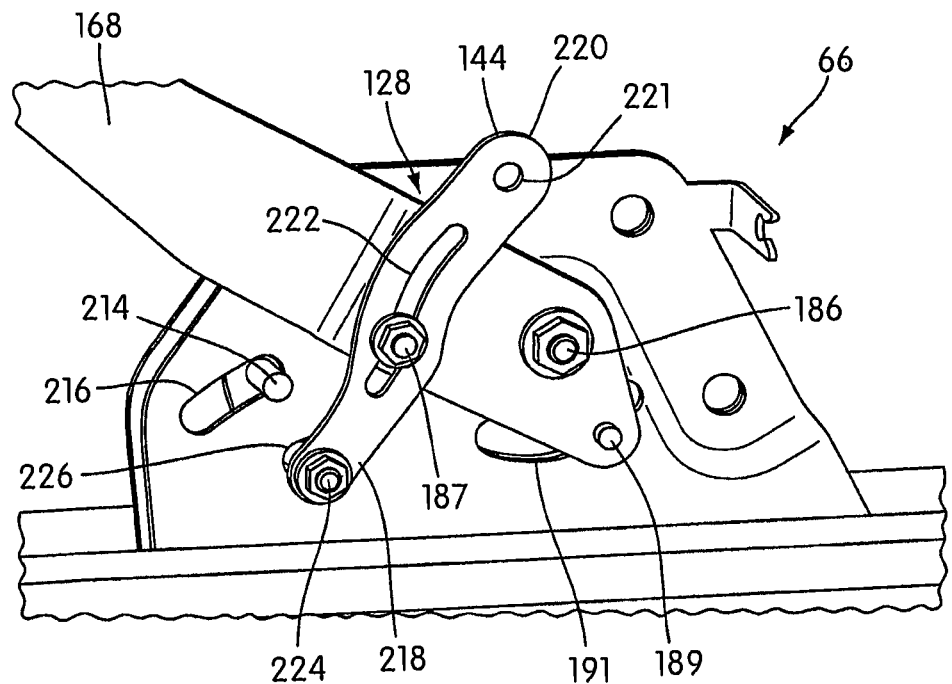
Figure 10C:
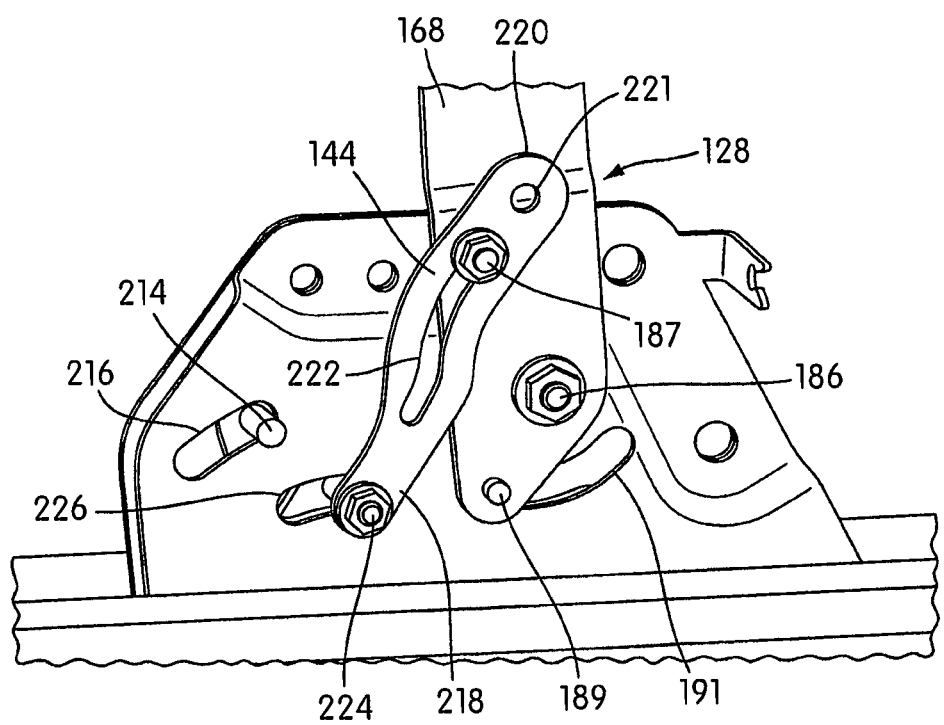
Figure 12:
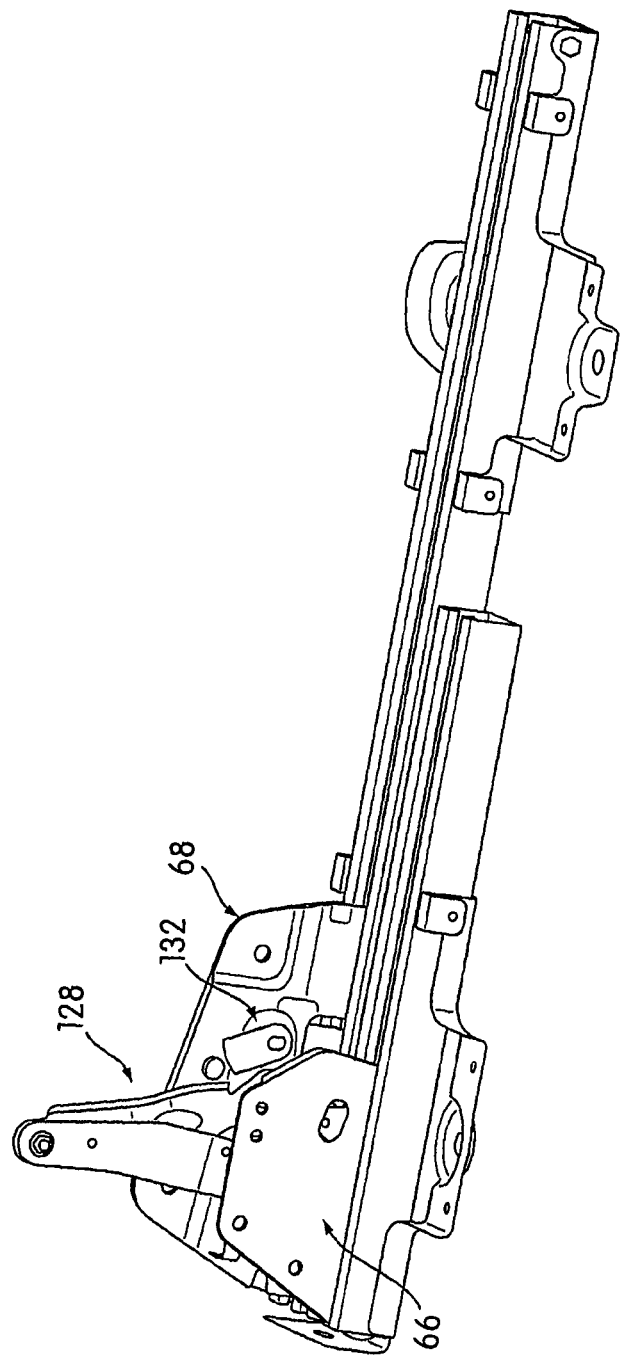
FIG. 12 is a perspective view of the portion of the track system and the actuation system of FIG. 4B shown in a fifth position.

As best shown in FIGS. 10A-10C, bracket 144 (e.g., brace, linkage, guide, etc.) is an elongated, rigid member that is configured to link or coordinate the movement of carriage link assembly 138 (or front portion 168) and stop 140. Bracket 144 includes a first end 218, a second opposite end 220, and a curved slot 222 that extends along the length of a middle portion of bracket 144. A pin 224 is coupled to bracket 144 proximate first end 218. Pin 224 extends through a slot 226 provided in body portion 120 of front carriage 66, and through slot 209 in stop 142, and is coupled to stop 140 proximate its upper portion 192. End 220 is operatively coupled or linked (such as through wires, cables, or other suitable structure) to seat cushion latch 23 so that the appropriate movement of bracket 144 unlocks seat cushion latch 23 or allows seat cushion latch 23 to return to the locked position. To receive the structure (e.g., wire, cable, etc.) that couples bracket 144 to seat cushion latch 23, bracket 144 includes an aperture 221 proximate end 220. Slot 222 of bracket 144 is configured to receive pin 187 (which is coupled to front portion 168 of carriage link assembly 138) and to allow pin 187 to move freely within slot 222.

Referring now to FIGS. 1 and 2, reclining mechanism or assembly 130 (e.g., latch, lock, etc.) is coupled to joint 52 and to backrest 18 in such a way that reclining mechanism 130 substantially controls the pivotal or rotational movement of backrest 18 around joint 52. Reclining mechanism 130 is also operatively coupled (e.g., such as through one or more cables, wires, or other linking structure) to handles 126*a* and 126*b* and to linkage system 128. According to one exemplary embodiment, reclining mechanism 130 is configured to allow an occupant of the vehicle to selectively adjust the reclining angle of backrest 18 by actuating either handle 126*a* or 126*b*, to allow an occupant to move seat 12 into the folded position by actuating handle 126*a*, and to allow an occupant to move seat 12 into the storage position by actuating handle 126*b*. In particular, reclining mechanism 130 is configured so that when the occupant actuates handle 126*a*, reclining mechanism 130 allows seatback 18 to pivot forward, but only until it reaches the angle it will assume when seat 12 is in the folded position. In this situation, reclining mechanism 130 also transfers at least a portion of the movement of backrest 18 to cam assembly 132 (e.g., through cam linkage 134) so that the movement of backrest 18 into its folded position actuates cam assembly 132. Reclining mechanism 130 is also configured so that when the occupant actuates handle 126*b*, reclining mechanism 130 allows seatback 18 to pivot all the way forward until it is generally horizontal (without the movement of seatback 18 actuating cam assembly 132).

Seat 12, track system 14, and actuation system 16 cooperate to allow seat system 10 to be adjusted in the design position and to be moved between the design position, the folded position, and the storage position.

When seat system 10 is in the design or seating position, seat 12 can be adjusted to be more suitable for particular situations or particular people. According to one exemplary embodiment, the occupant may adjust both the forward or rearward position of seat 12 as well as the reclining angle of backrest 18.

To adjust the forward or rearward position of seat 12, the occupant simply actuates a handle 126*c*, which is operatively coupled to track latch 136. The actuation of handle 126*c* causes track latch 136 to move to the disengaged position (e.g., the position in which fingers 164 are released from engagement with the corresponding apertures 87 in outer track 60), which then allows front carriage 66 and rear carriage 68 to move freely within inner track 58 and outer track 60, respectively. Seat 12 can then be moved to the desired location, at which point the occupant releases handle 126*c* to lock seat 12 in the new position. By releasing handle 126*c*, track latch 136 (which is biased toward the engaged position) is permitted to engage the corresponding apertures 87 in outer track 60 to hold rear carriage 68, and thus seat 12, in position.

Although actuating handle 126*c* allows rear carriage 68 and front carriage 66 to move freely along outer track 60 and inner track 58, respectively, the range of movement of rear carriage 68 and front carriage 66 is limited. When seat system 10 is in the design position, stop 140 is retained in the engaged position and extension 190 of stop 140 is received within slot 75 of inner track 58. See FIGS. 8, 9A, and 10A. Accordingly, front carriage 66 can only be moved forward or rearward until extension 190 of stop 140 contacts the end of slot 75. The distance between the two points where extension 190 contacts the ends of slot 75 (e.g., the length of slot 75) generally defines the range of permitted forward and rearward adjustment of seat 12. To permit seat 12 to be locked in incremental positions over the entire range of permissible movement, apertures 87 are provided intermittently over the corresponding range of movement of rear carriage 68.

To adjust the reclining angle of backrest 18, the occupant may actuate either handle 126a or 126b, move backrest 18 to the desired location, and then release handle 126a or 126b to lock backrest 18 in the new position. The actuation of handles 126a and 126b actuates reclining mechanism 130, which releases the rotational lock on backrest 18 and allows its rotational position to be adjusted.

Figure 6:
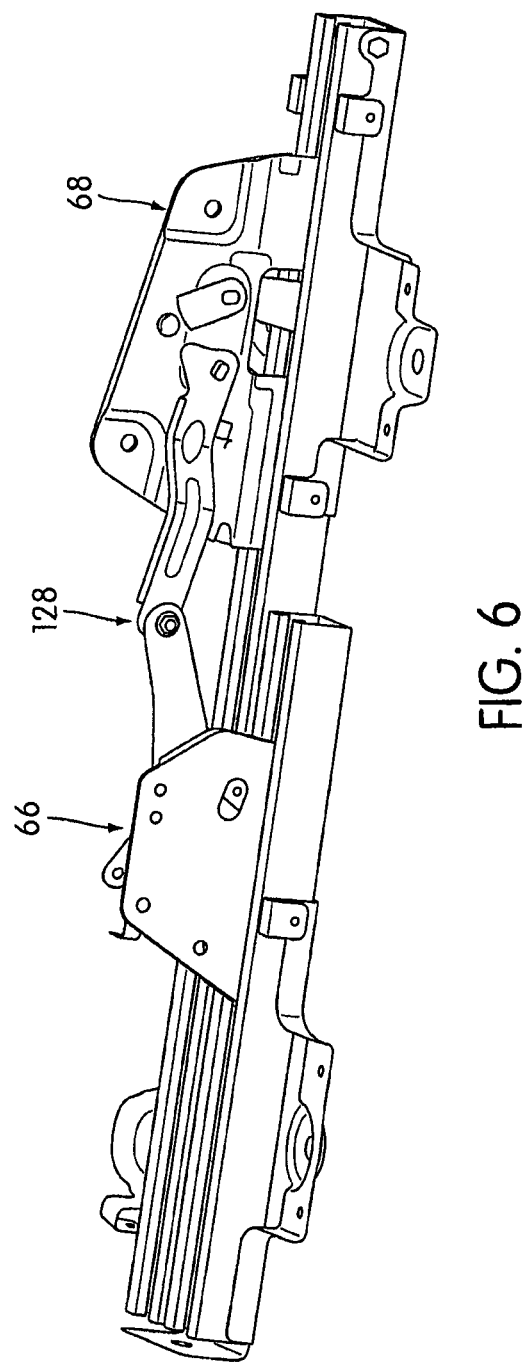
FIG. 6 is a perspective view of the portion of the track system and the actuation system of FIG. 4B shown in a second position.
Figure 7:
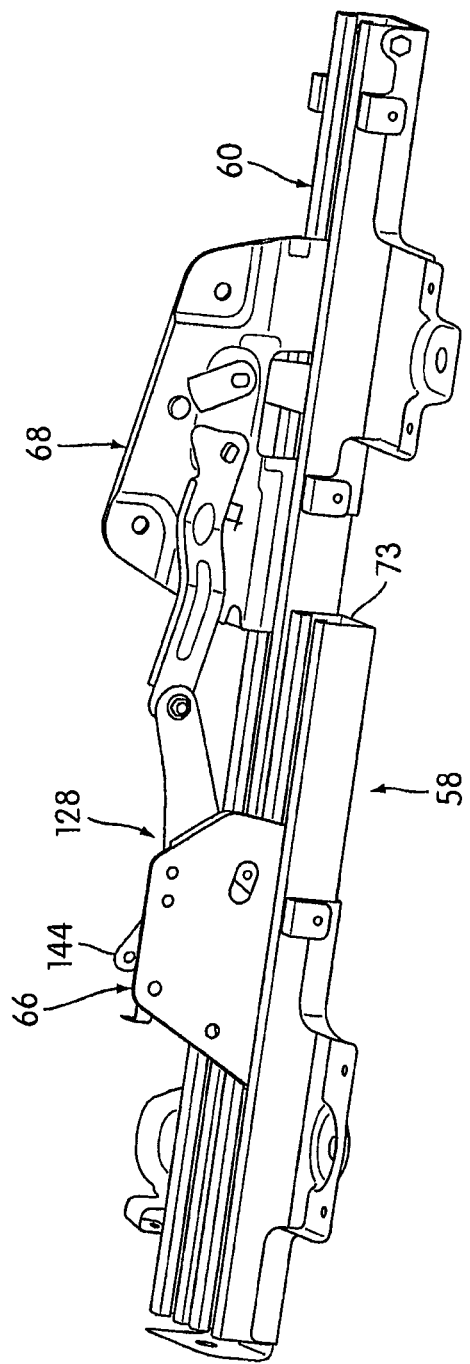
FIG. 7 is a perspective view of the portion of the track system and the actuation system of FIG. 4B shown in a third position.
Figure 13B:
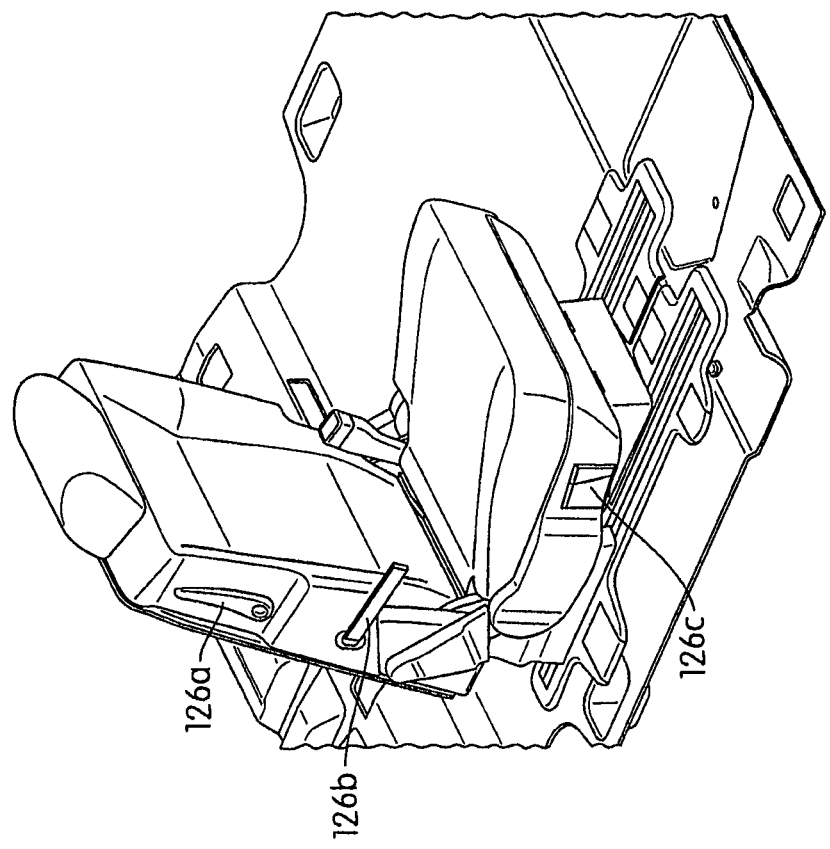
FIGS. 13A through 13G are perspective views of a seating system according to an exemplary embodiment showing the different positions of the seating system as it moves from the design position to the folded position.
Figure 13A:
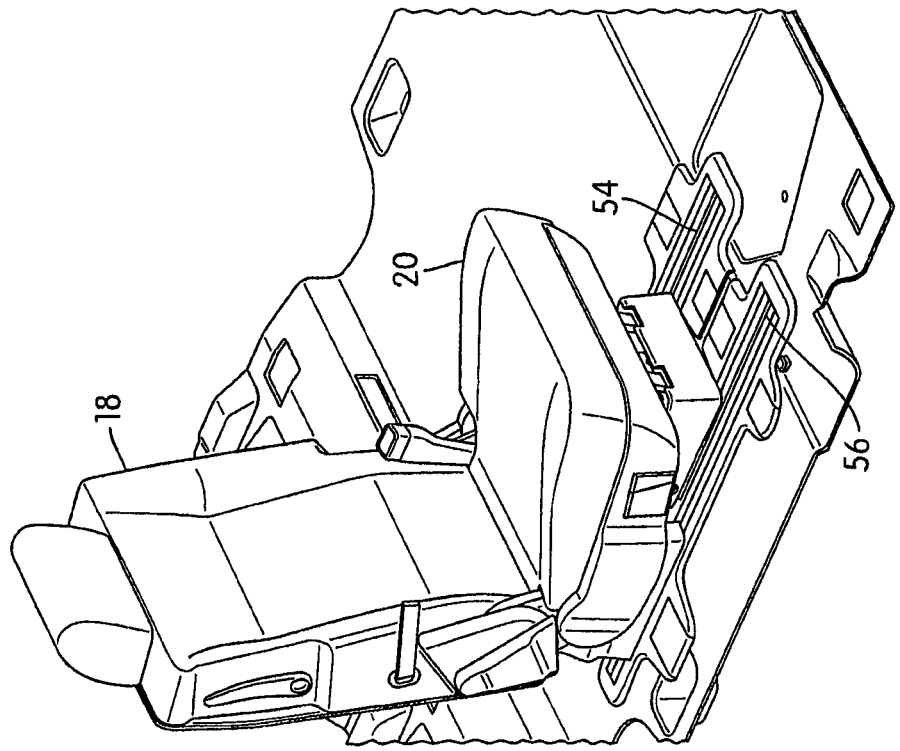

The movement of seat system 10 from the design position to the folded position is illustrated in FIGS. 4A-5B and 5C-13G. As seen in FIGS. 4A, 4B, 5A, and 13A, the seat starts in the design position. To initiate the movement of seat system 10 toward the folded position, the occupant actuates handle 126a. The actuation of handle 126a unlocks reclining mechanism 130. The unlocking of reclining mechanism 130, in turn, unlocks joint 52. As shown in FIG. 13B, when joint 52 is unlocked, the bias in joint 52 causes backrest 18 to pivot forward until backrest 18 reaches the point at which reclining mechanism 130 restricts any further movement of backrest 18 (e.g., at or near the point at which backrest 18 is perfectly vertical, the point where backrest 18 has pivoted or rotated forward by at least 22 degrees, the point where backrest 18 has pivoted or rotated forward approximately 5 degrees beyond the point at which backrest 18 assumes a nearly perfectly vertical position, or some other point). The forward pivoting of backrest 18 actuates a portion of reclining mechanism 130, which in turn, actuates cam linkage 134. The actuation of cam linkage 134 causes engagement member 153 to move track latch 136 into a position in which fingers or projections 164 no longer engage apertures 87 in outer track 60. As shown in FIG. 6, the actuation of cam linkage 134 also causes cam 150 to rotate until surface 160 of cam 150 no longer engages surface 180 of rear portion 166 of carriage link assembly 138. With track latch 136 unlocked, rear carriage 68 is now free to move forward within outer track 60.

Although cam 150 is no longer locking carriage link assembly 138, front and rear portions 168 and 166 of carriage link assembly 138 are still not free to rotate or pivot relative to one another and relative to front carriage 66 and rear carriage 68 due to stop 142. As illustrated in FIG. 9A, at this point, stop 142 is held in the disengaged position because extension 202 is not able to engage slot 77. When stop 142 is held in the disengaged position, arm 208 of stop 142 blocks the movement of pin 189 within slot 191 of body portion 120. Because pin 189 is coupled to front portion 168 of carriage link assembly 138, stop 142 serves to maintain carriage link assembly 138 in the locked condition.

Figure 13D:
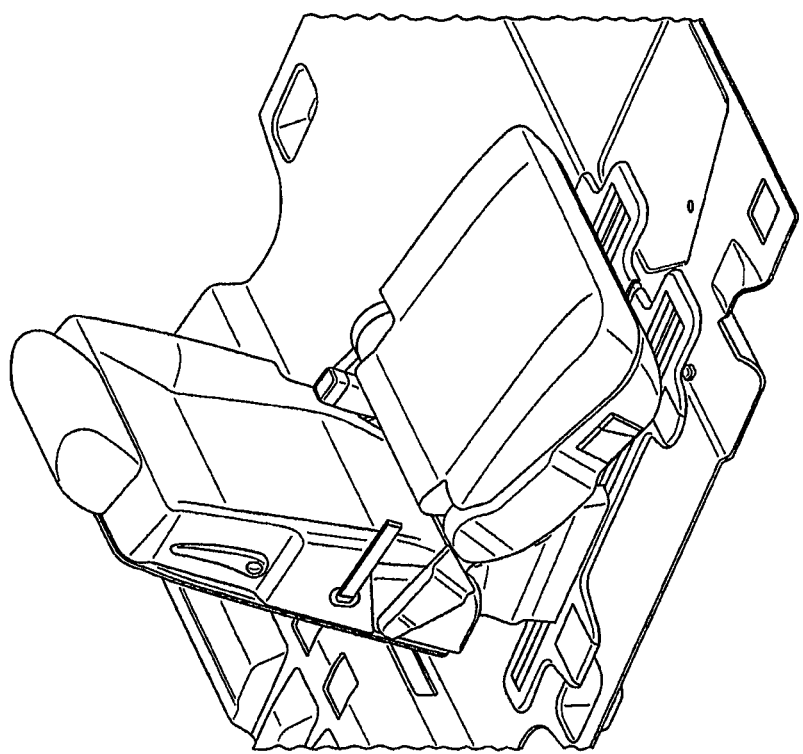
Figure 13C:
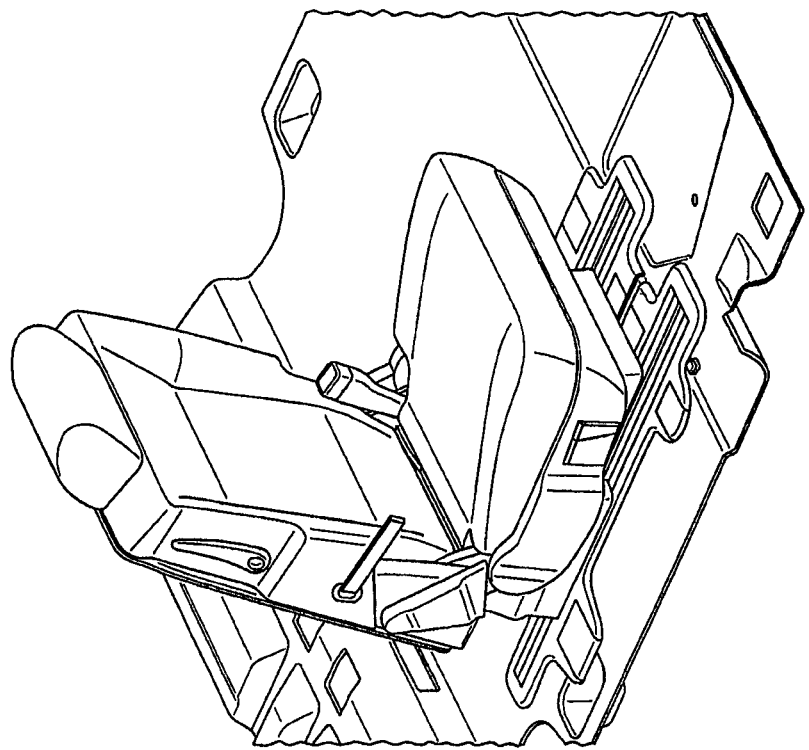
Figure 13F:
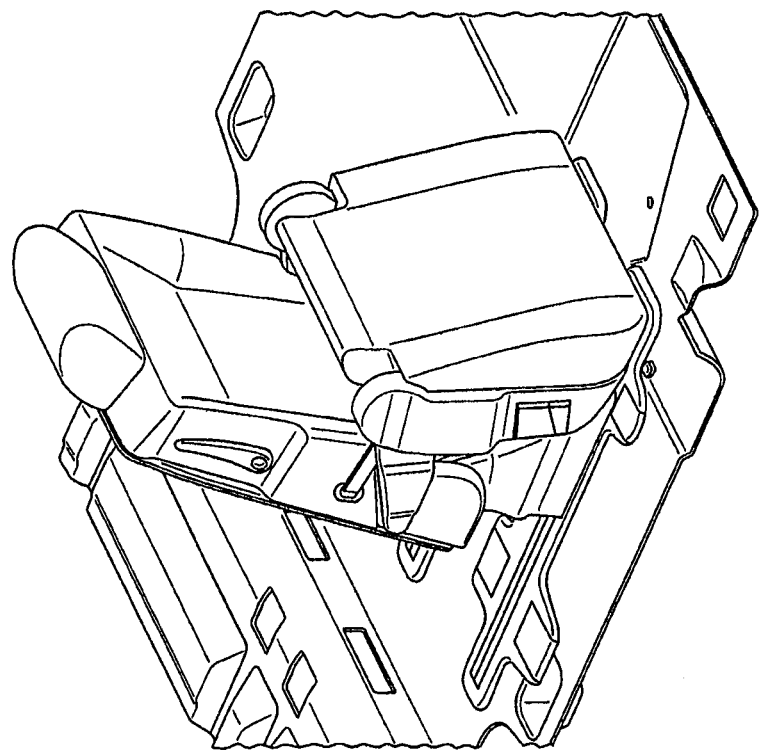

As seen in FIG. 13C, the disengagement of track latch 136 allows backrest 18 and rear carriage 68 to be pushed forward. Since front carriage 66 is free to move within inner track 58 and carriage link assembly 138 is still locked in the position it assumes when seat system 10 is in the design position (e.g., the locked position), pushing backrest 18 and rear carriage 68 forward also causes seat cushion 20 and front carriage 66 to move forward. Seat cushion 20 and front carriage 66 will continue to move forward with rear carriage 68 and backrest 18 until extension 190 of stop 140 contacts the end of slot 75 in the bottom of inner track 58. (See FIG. 8). The contact of extension 190 with the end of slot 75 stops front carriage 66 from moving any farther forward. Once front carriage 66 is moved forward to the point where extension 190 of stop 140 contacts the end of slot 75, extension 202 of stop 142 will be aligned with slot 77 of inner track 58 and stop 142 will no longer serve as an impediment to the folding of carriage link assembly 138. However, extension 202 of stop 142 will not engage slot 77 (e.g., move to the engaged position) until carriage link assembly 138 begins to fold, as the interface between the bottom surface of front portion 168 and pin 214 will not allow stop 142 to rotate into the engaged position until carriage link assembly 138 begins to fold. (See FIGS. 9A and 9B).

With carriage link assembly 138 unlocked, backrest 18 and rear carriage 68 can continue to move forward. By applying a force to backrest 18 and rear carriage 68 sufficient to overcome the bias of carriage link assembly 138, carriage link assembly 138 will begin to fold, which then allows rear carriage 68 (and backrest 18) to continue to move forward and become closer to front carriage 66. Once carriage link assembly 138 begins to fold, stop 142 will move into the engaged position and extension 202 will extend into slot 77.

When rear carriage 68 begins to approach front carriage 66 and carriage link assembly 138 begins to fold, front portion 168 of carriage link assembly 138 begins to rotate upward. As illustrated in FIGS. 10A and 10B, the upward rotation of front portion 168 causes pin 187 of front portion 168 to slide along slot 222 of bracket 144, which in turn, causes bracket 144 to rotate around pin 224. Bracket 144 is coupled to seat cushion latch 23 in such a way that the rotation of bracket 144 around pin 224 releases seat cushion latch 23, which unlocks joint 55. Due to the bias provided at Joint 55, rear portion 34 of seat cushion 20 is forced upward (e.g., seat cushion 20 rotates upwardly) when cushion latch 23 is released, as is illustrated in FIG. 13D. Even though rear carriage 68 moves closer to front carriage 66 before seat cushion latch 23 is released, seat cushion 20 is still able to rotate upwardly without binding with backrest 18 because joint 43 between seat cushion 20 and front frame 26 and joint 47 between front frame 26 and front bracket 28 allow seat cushion 20 to move forward as rear carriage 68 and backrest 18 move forward.

Figure 13E:
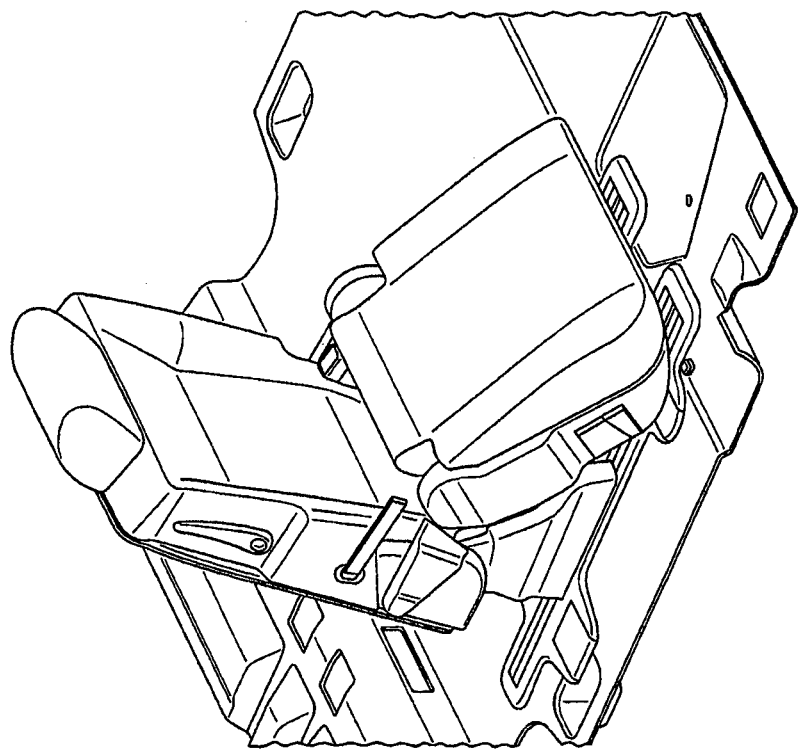
Figure 13G:
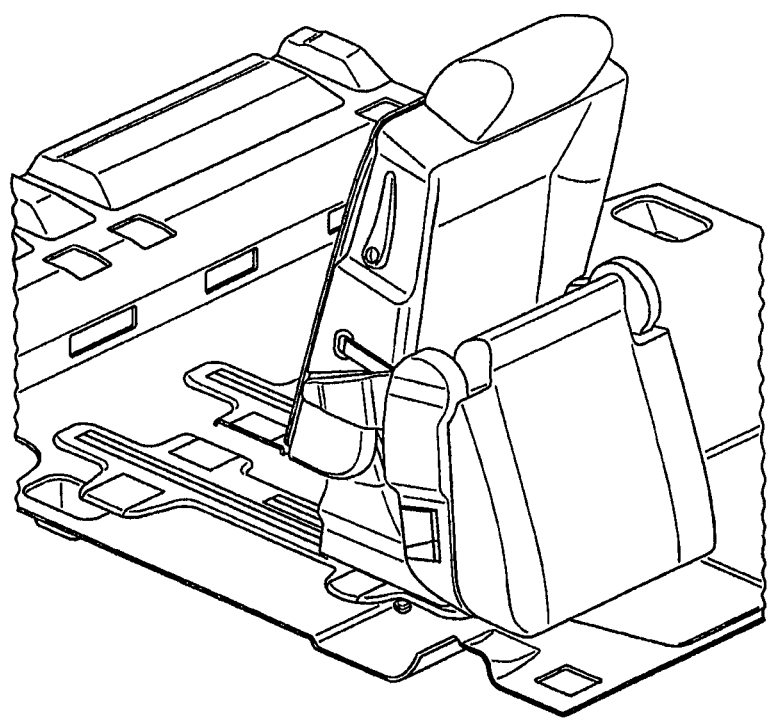

As shown in FIG. 13E, further movement of rear carriage 68 toward front carriage 66 causes seat cushion 20 to pivot further forward and approach a generally vertical position. As best shown in FIGS. 9C, 10C, 11, and 13F, rear carriage 68 and backrest 18 continue to approach front carriage 66 until the front of rear carriage 68 is generally aligned with the front of front carriage 66, at which point carriage link assembly 138 reaches its fully folded position. In this fully folded position, front portion 168 of carriage link assembly 138 assumes a generally vertical orientation. Through most of the movement of front portion 168 toward the generally vertical orientation, pin 187 slides along slot 222 of bracket 144. Just prior to front portion 168 reaching its fully folded position, pin 187 reaches the end of slot 222. Thus, as front portion 168 moves the final increment into its fully folded position, pin 187 pulls on bracket 144. The pulling of bracket 144 causes pin 224 to move within slot 226 of body portion 120 of front carriage 66 and slot 209 of stop 142, which in turn causes stop 140 to move into the disengaged position. With stop 140 in the disengaged position, the folded unit, including seat 12, front carriage 66, and rear carriage 68, is then free to move forward until front and rear carriages 66 and 68 reach the end of their respective tracks (e.g., front and rear carriages 66 and 68 contact stop 102 of support 62) or until seat system 10 hits some other obstacle that prevents it from moving any further forward. (See FIGS. 12 and 13G).

Figure 14B:
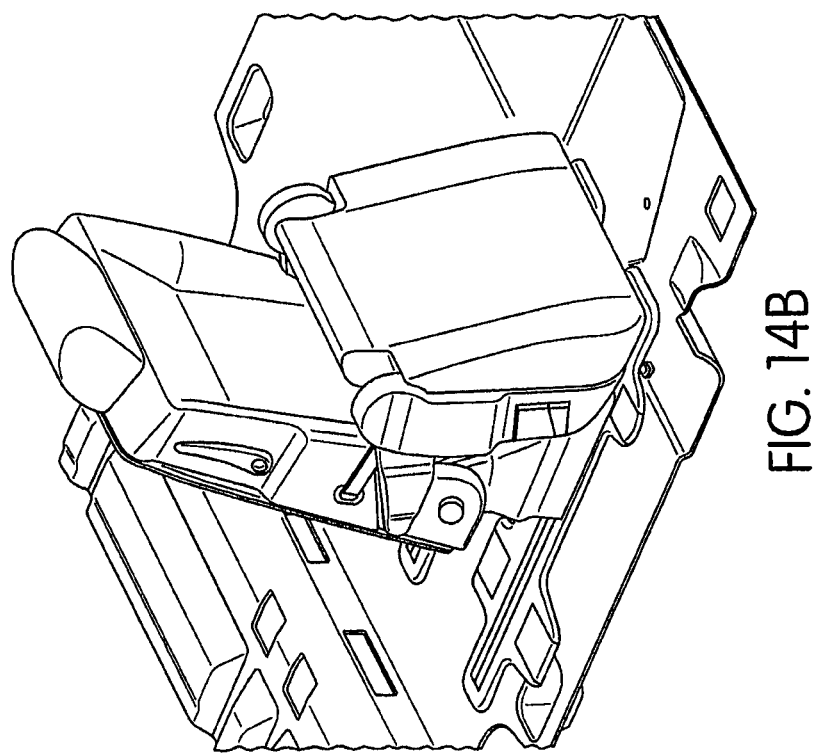
FIGS. 14A through 14F are perspective views of the seating system of FIGS. 13A through 13G showing the different positions of the seating system as it moves from the folded position to the design position.
Figure 14A:
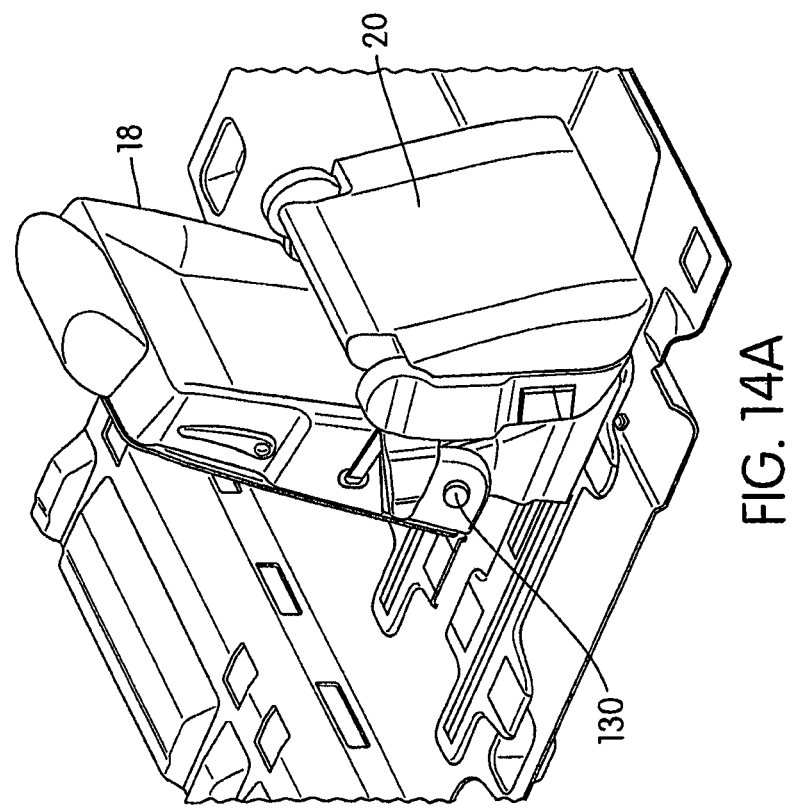
Figure 14D:
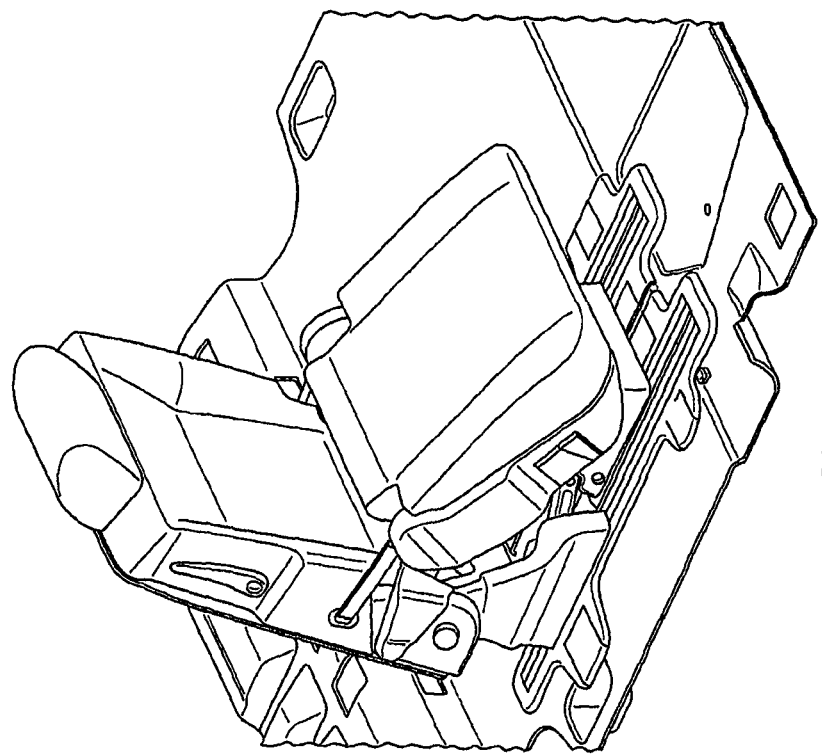
Figure 14C:
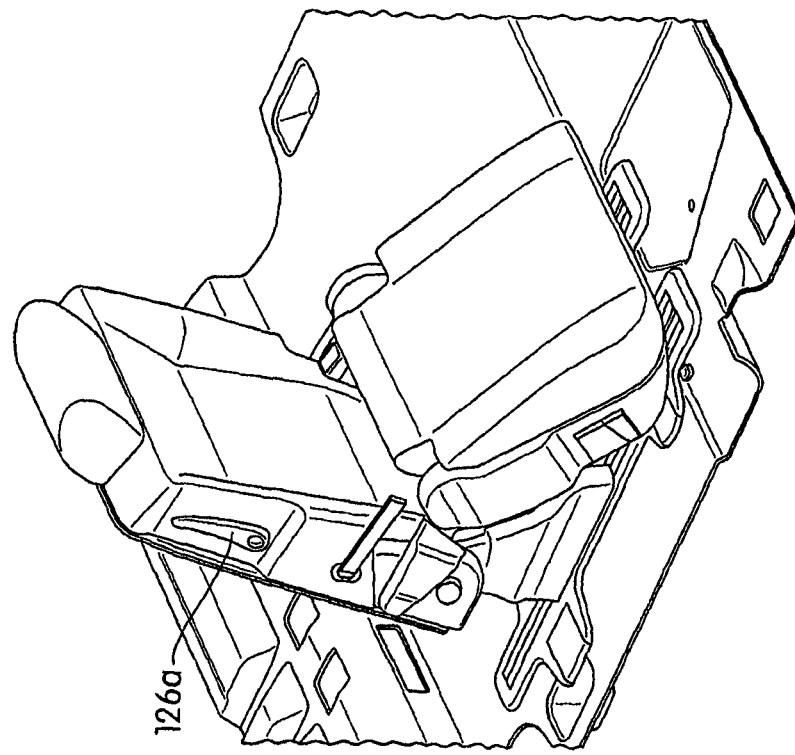
Figure 14F:
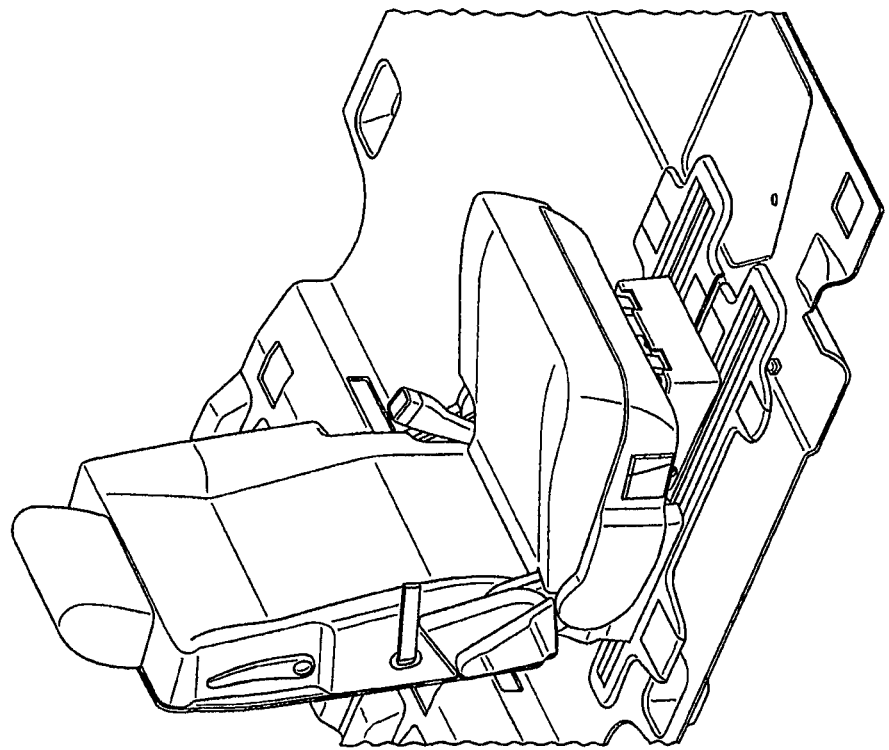
Figure 14E:
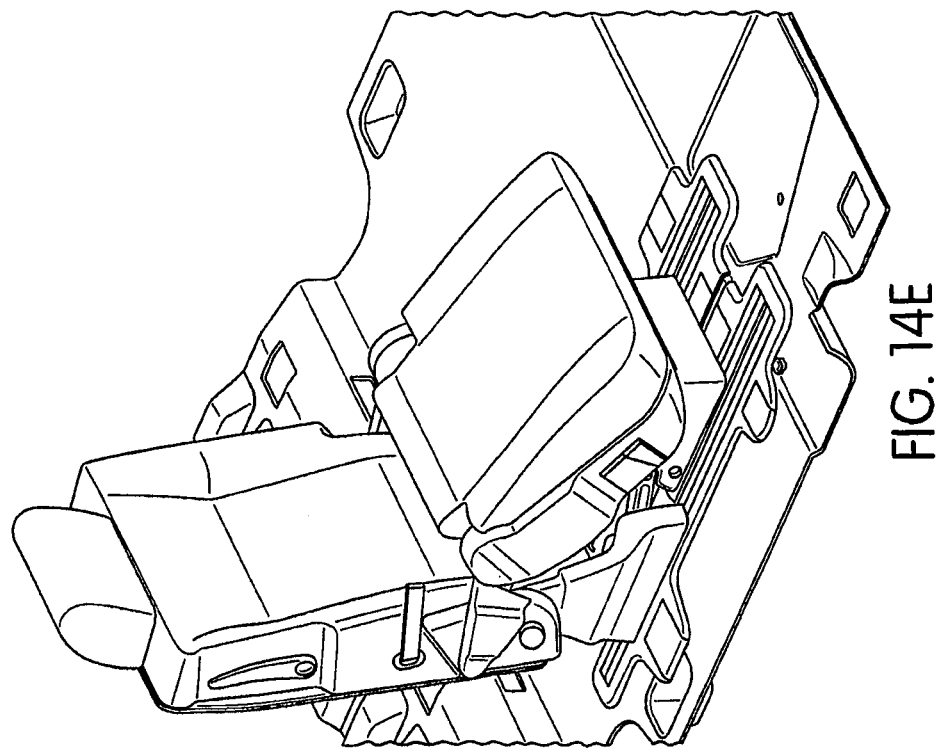

The movement of seat system 10 from the folded position to the design position is illustrated in FIGS. 14A-F. As seen in FIG. 14A, seat system 10 starts in the folded position. To initiate the movement of seat system 10 toward the design position, the occupant moves backrest 18 rearward. This will cause the folded unit, which includes seat 12, front carriage 66, and rear carriage 68, to move rearward until extension 202 of stop 142 contacts the end of slot 77 in inner track 58. At this point, illustrated in FIG. 14B, front carriage 66 is prevented from moving any further rearward (by the contact between extension 202 and the end of slot 77), but rear carriage 68 is free to continue moving rearward. As illustrated in FIG. 9C, stop 142 is restricted from moving to the disengaged position by pin 189, which due to the folded position of carriage link assembly 138 is located above and generally contacts surface 212 of stop 142, and which prevents stop 142 from rotating around axle 121a and disengaging slot 77. As illustrated in FIG. 14C, further movement of backrest 18 and rear carriage 68 toward the rear causes carriage link assembly 138 to unfold and causes seat cushion 20 begin to rotate back toward a generally horizontal position. As carriage link assembly 138 begins to unfold, pin 187 of front portion 168 no longer pulls on bracket 144, which no longer pulls on pin 224, which allows stop 140 (which is biased toward the engaged position) to move back into the engaged position in which extension 190 engages slot 75 of inner track 58. (See FIGS. 9B-9C and 10B-10C). Due to the bias applied to stop 142 as well as the placement of pin 189 above stop 142, stop 142 also remains in the engaged position until rear carriage 68 has moved far enough rearward to cause carriage link assembly 138 to completely unfold. Once the occupant has moved rear carriage 68 and backrest 18 far enough rearward to completely unfold carriage link assembly 138, illustrated in FIGS. 9A and 14D, front portion 168 of carriage link assembly 138 will have contacted pin 214 (coupled to arm 206 of stop 142) and caused it to move within slot 216, which has the effect of rotating or pivoting stop 142 around axle 121a (against the bias of stop 142 toward the engaged position) and moving it into the disengaged position. Also, as shown in FIG. 14E, by the time backrest 18 and rear carriage 68 have reached the point where carriage link assembly 138 has completely unfolded, backrest 18 will have pivoted rearward into the reclined position that it will initially assume when seat system 10 is returned to the design position. The pivoting of backrest 18 into the reclined position actuates reclining mechanism 130, which releases cam linkage 134. The release of cam linkage 134 allows cam assembly 132 to return to the engaged position in which it locks carriage link assembly 138 (due to the bias on cam 150) and allows track latch 136 to return to the engaged position, both occurring after carriage link assembly 138 has completely unfolded. As illustrated in FIG. 14F, the final step in returning seat system 10 to the design position is pushing rear portion 34 of seat cushion 20 downward to lock seat cushion latch 23. Once this is done, seat system 10 is completely returned to the design position. At this point, the occupant may then adjust the forward and rearward position of seat 12 as well as the reclining angle of backrest 18 as described above to obtain the desired seating or design position.

Figure 15B:
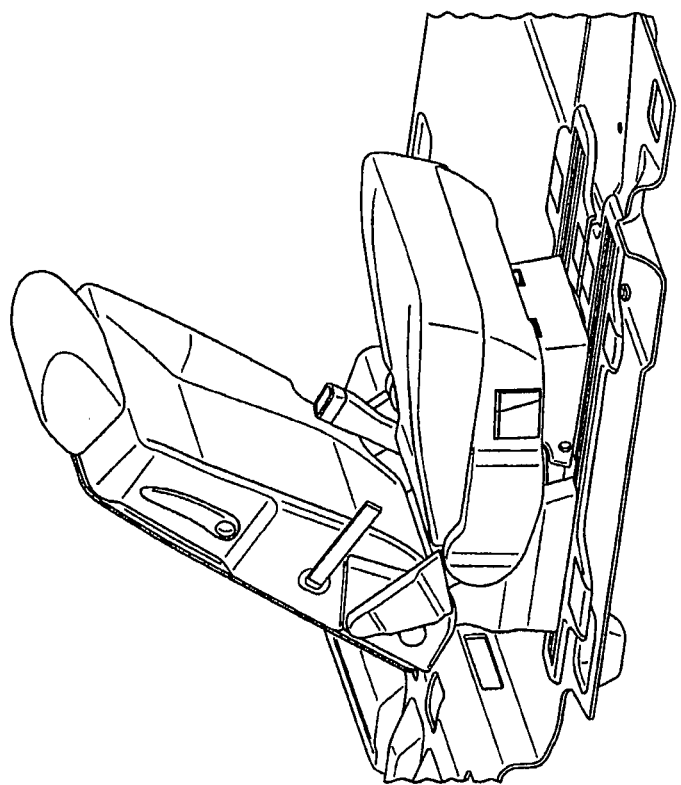
FIGS. 15A through 15D are perspective views of the seating system of FIGS. 13A through 13G showing the different positions of the seating system as it moves from the design position to the storage position.
Figure 15A:
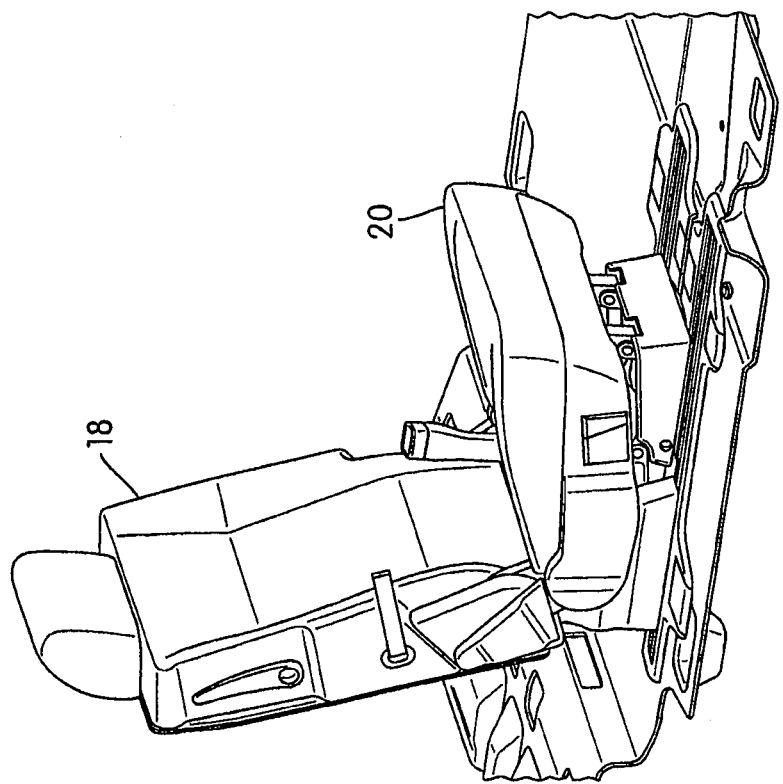
Figure 15D:
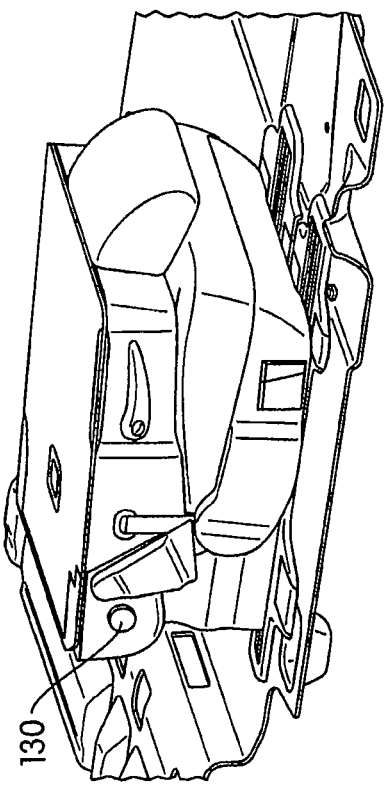
Figure 15C:
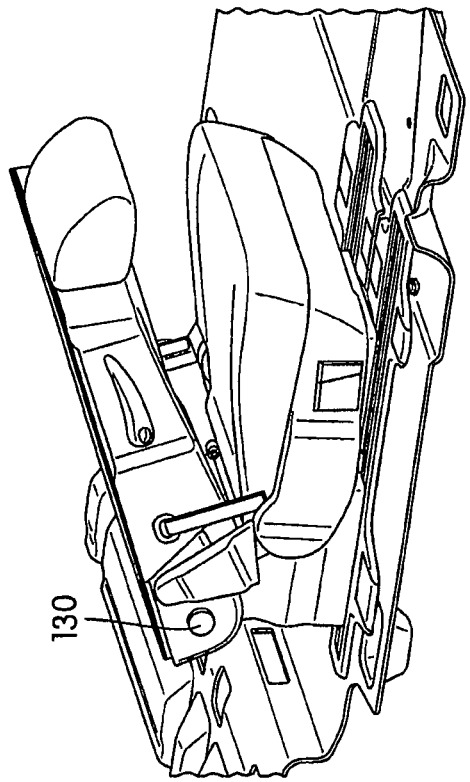

The movement of seat system 10 from the design position to the storage position is illustrated in FIGS. 15A-D. As seen in FIG. 15A, the seat starts in the design position. To move seat system 10 to the storage position, the occupant actuates handle 126b and simply rotates or pivots backrest 18 forward until the back surface of backrest 18 is substantially horizontal, as illustrated in FIG. 15D. When moving seat 12 from the design position to the storage position, joint 55 (e.g., seat cushion latch 23) is locked to prevent link 22 from moving relative to seat cushion 20. Thus, when joint 55 is locked, seat cushion 20 and link 22 generally form a substantially rigid body. Consequently, as backrest 18 is pivoted forward, link 22 and rear portion 34 of seat cushion 20 move forward and downward. (See FIG. 3). As link 22 and rear portion 34 of seat cushion 20 move forward and downward, front frame 26, which is rotatably coupled to front portion 46 of seat cushion 20 on one end and to front bracket 28 on the other end, forces front portion 46 of seat cushion 20 to move forward and downward as well. Accordingly, as backrest 18 is pivoted forward, seat cushion 20 moves forward and downward. The forward and downward movement of seat cushion 20 allows backrest 18 to pivot or rotate far enough so that the back surface of backrest 18 is generally horizontal.

The movement of seat system 10 from the storage position to the design position is the same as its movement from the design position to the storage position, just in the opposite direction. To move seat system 10 to the design position from the storage position, the occupant simply rotates or pivots backrest 18 rearward until the back surface of backrest 18 is upright. As backrest 18 is pivoted rearward, the manner in which link 22 is coupled to backrest 18 forces link 22 and rear portion 34 of seat cushion 20 to move rearward and upward. As link 22 and rear portion 34 of seat cushion 20 move rearward and upward, front frame 26 forces front portion 46 of seat cushion 20 to move rearward and upward as well. Accordingly, as backrest 18 is pivoted rearward into is upright position, seat cushion 20 moves rearward and upward into its design position.

Referring now to FIGS. 16-24, another embodiment of the linkage system is illustrated as linkage system 300. Like linkage system 128, linkage system 300 is intended to serve as the system of components that link handles 126a, 126b, and 126c, reclining mechanism 130, seat 12, inboard track arrangement 54, and outboard track arrangement 56 together and to coordinate the movements of these components relative to one another. Linkage system 300 includes a track latch 302, a carriage interface 304, a carriage interface bracket 306, a track bracket 308, a toggle lock 310, a first catch 312, a second catch 314, and a hard stop 315.

Figure 16:
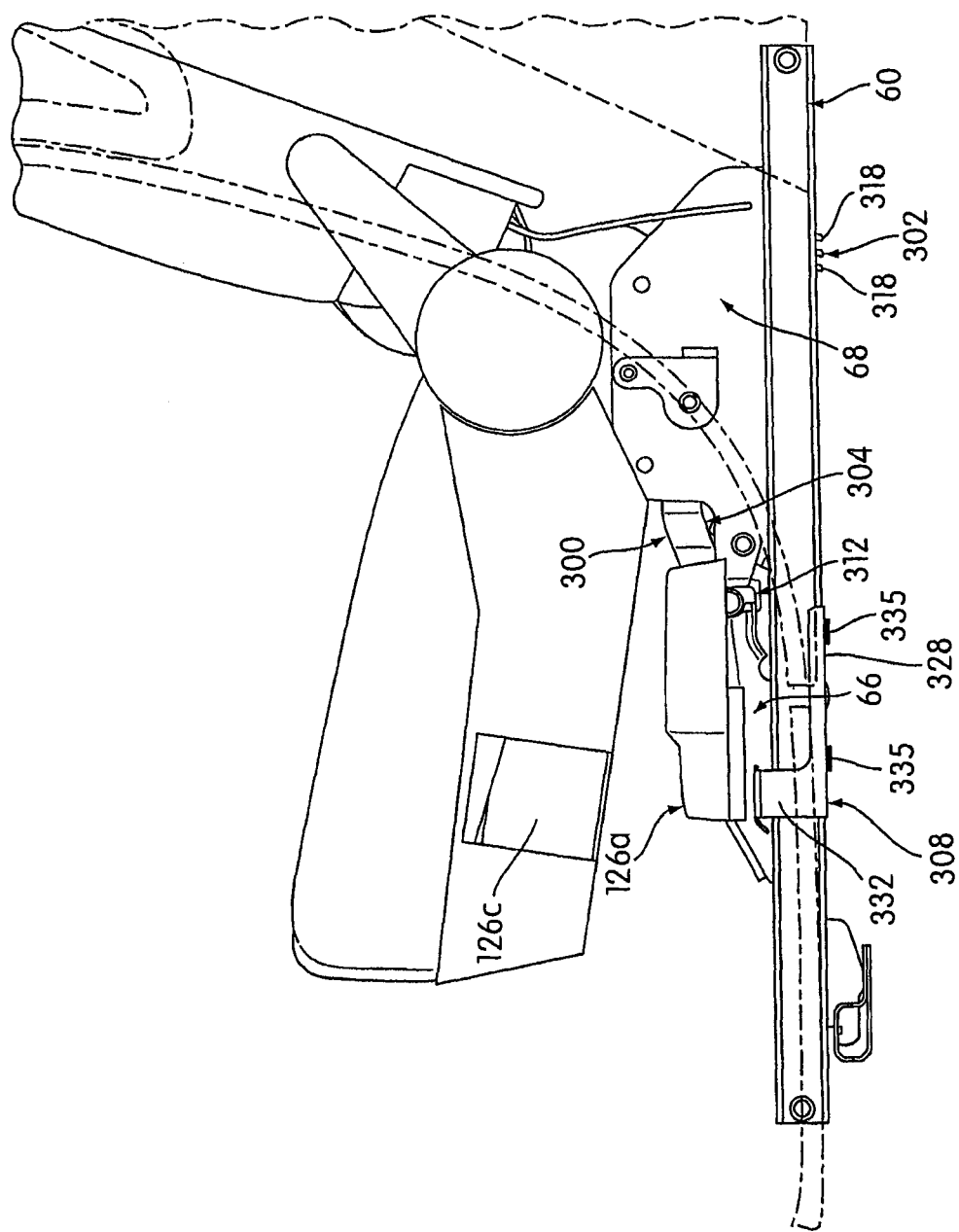
FIG. 16 is a partial side view of a seating system according to another exemplary embodiment.
Figure 17:
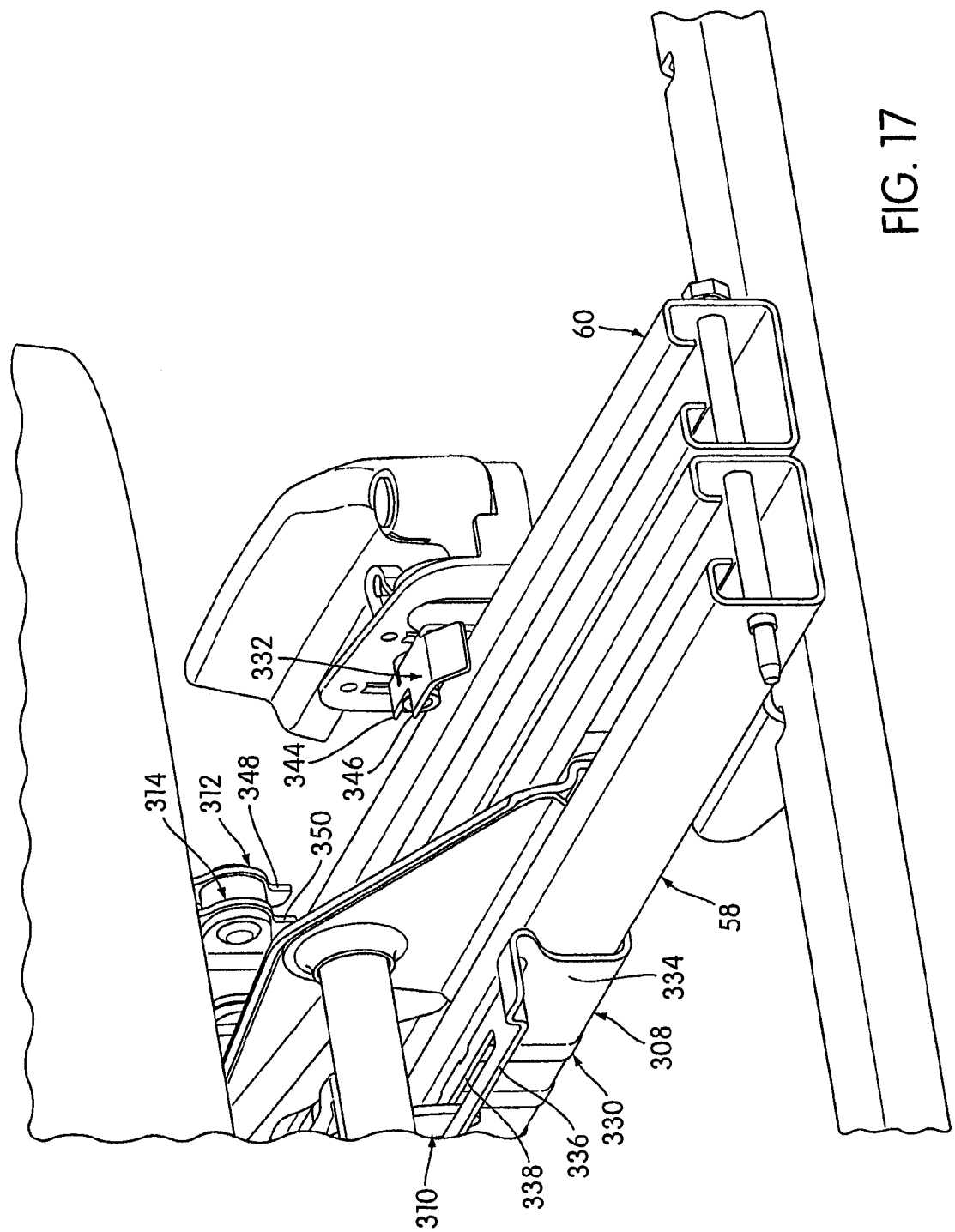
FIG. 17 is a partial perspective view of a front portion of the seating system of FIG. 16 showing the linkage system when the seating system is in a first configuration.
Figure 18:
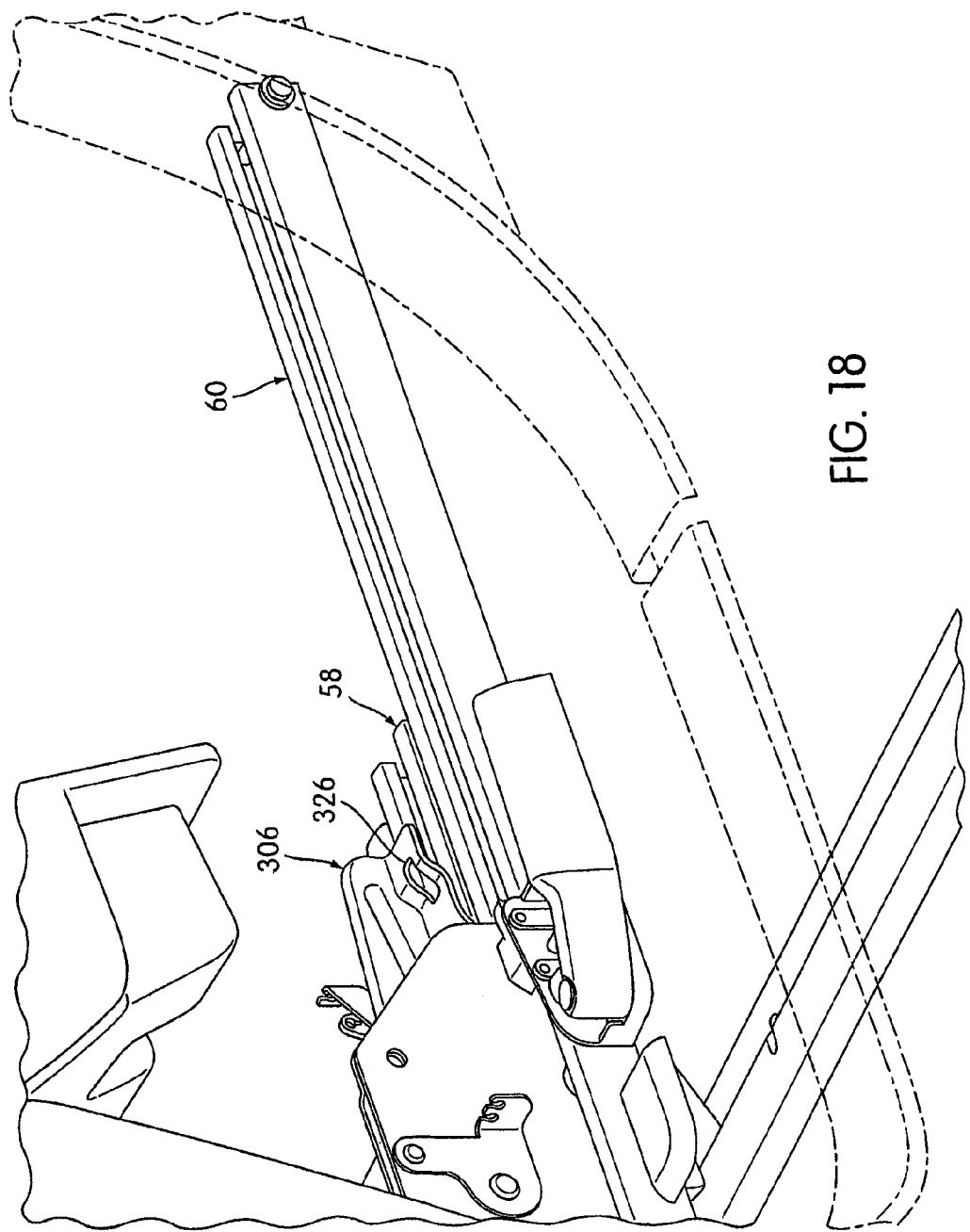
FIG. 18 is a partial perspective view of a rear portion of the seating system of FIG. 16 showing the linkage system when the seating system is in a second configuration.
Figure 20:
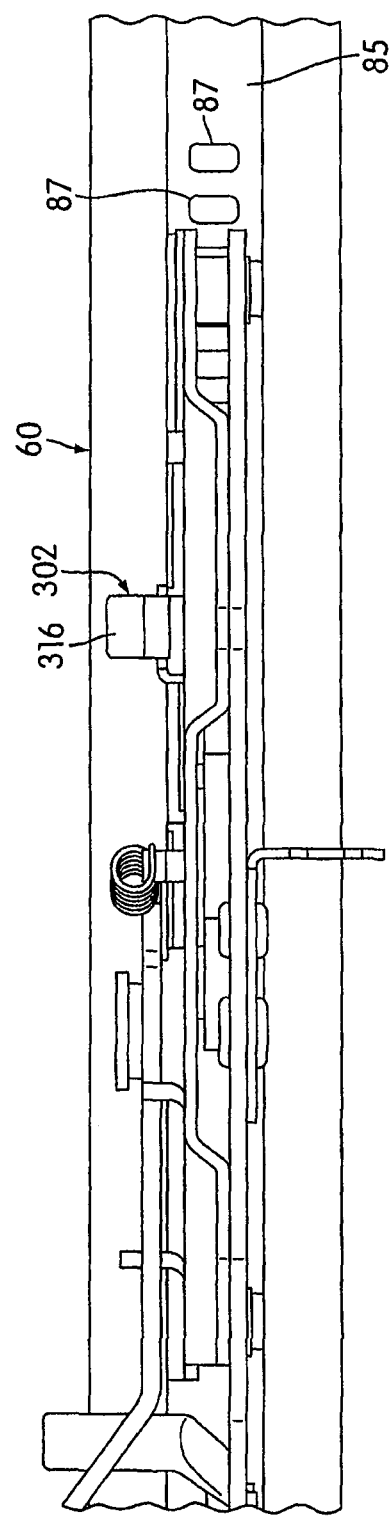
FIG. 20 is a top plan view of a rear portion of the seating system of FIG. 16 showing the linkage system when the seating system is in the first configuration.
Figure 22:
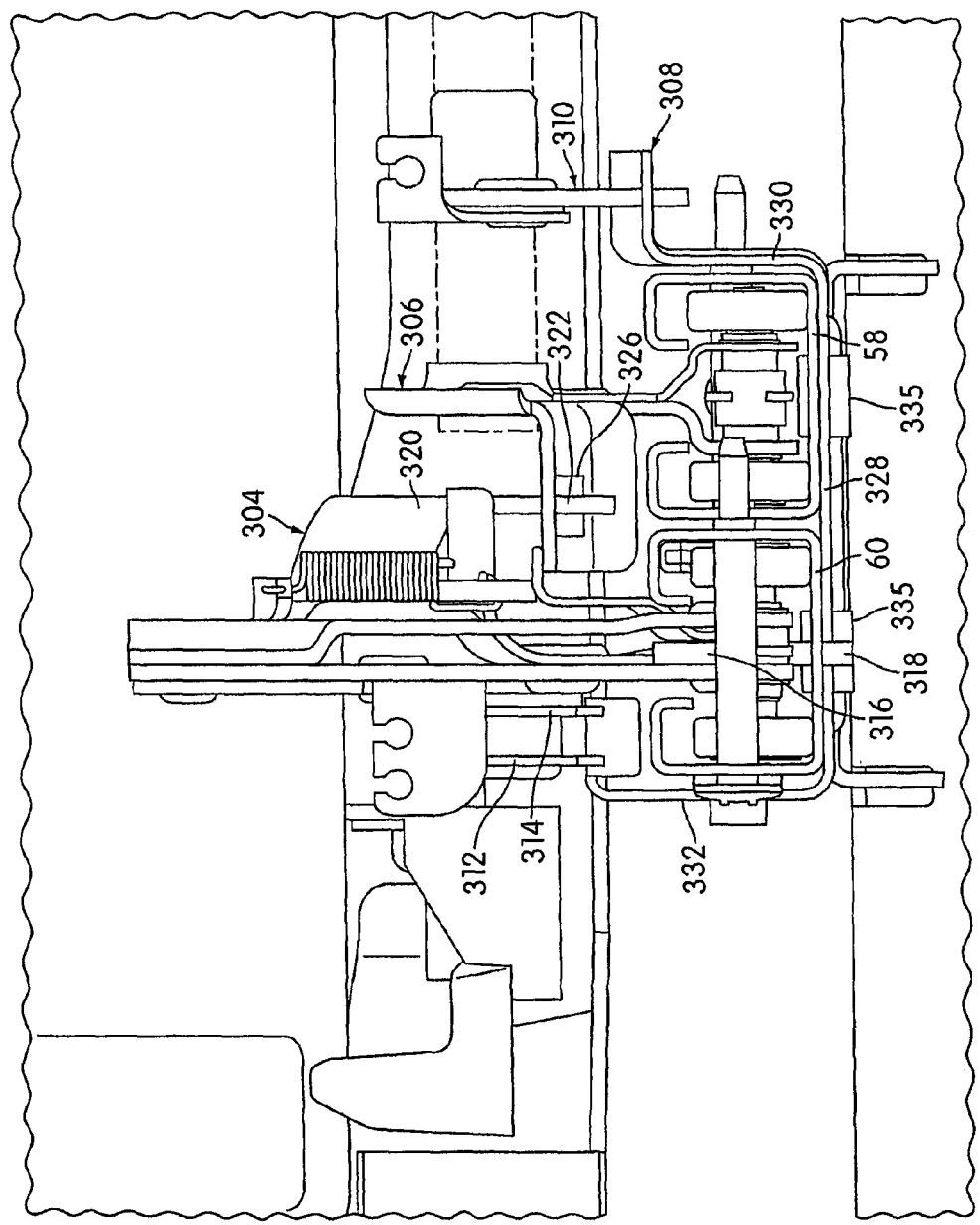
FIG. 22 is a partial rear elevational view of a portion of the seating system of FIG. 16 showing the linkage system when the seating system is in the first configuration.

As best shown in FIGS. 16, 20, and 22, track latch 302 (e.g., engagement member, finger, claw, pawl, etc.) is substantially similar to track latch 136 of linkage system 128. Track latch 302 is a generally rigid device coupled to rear carriage 68 and configured to engage one or more of the series of apertures 87 in outer track 60 located proximate its rear portion to releasably retain rear carriage 68 in a particular position along outer track 60 and to allow for the selective adjustment of the position of rear carriage 68 within outer track 60. According to one exemplary embodiment, track latch 302 includes a body portion 316 and fingers or projections 318. Track latch 302 is configured to move between an engaged position in which fingers 318 are engaged with, or received within, apertures 87, and a disengaged position in which fingers 318 are not received within or otherwise engaged with apertures 87. Track latch 302 includes a spring or other biasing device that biases track latch 136 toward the engaged position.

Body portion 316 is coupled to handle 126c so that the actuation of handle 126c by the occupant moves track latch 302 into the disengaged position and the release of handle 126c allows track latch 302 to return to the engaged position. Body portion 316 is also coupled or linked to reclining mechanism 130 so that the actuation of reclining mechanism 130 (such as that which occurs when backrest 18 pivots forward by a certain amount or beyond a certain point) moves track latch 302 from the engaged position to the disengaged position or allows track latch 302 to move from the disengaged position to the engaged position.

According to various alternative and exemplary embodiments, the track latch may take one of a variety of different shapes, sizes, and configurations. According to one exemplary embodiment, the track latch may be similar to one of the latches described in U.S. Application No. 60/627,429. According to other various alternative and exemplary embodiments, the track latch may include one finger, two fingers, or any other number of fingers. According to still other various alternative and exemplary embodiments, the size and shape of the fingers may vary depending on the size and shape of the corresponding apertures in the track and on the particular situation or environment in which the seating system will be used.

As best seen in FIGS. 16, 19,21, and 22, carriage interface 304 (e.g., interlock, coupler, male coupler, linkage, arm, hook, etc.) is a generally rigid member pivotably coupled to rear carriage 68 and configured to releasably engage carriage interface bracket 306, which is coupled to front carriage 66, to maintain the spatial relationship between rear carriage 68 and front carriage 66. According to one exemplary embodiment, carriage interface 304 includes a generally rectangular body portion 320 and an extended portion 322 (see FIG. 22) that projects downwardly from body portion 320 to provide a projection that releasably engages carriage interface bracket 306. The engagement of extended portion 322 and carriage interface bracket 306 links rear carriage 68 and front carriage 66 and causes rear carriage 68 and front carriage 66 to maintain a substantially constant spatial relationship. Body portion 320 also includes an aperture or other appropriate structure that allows a cable, wire, or other linking member extending from, or connected to, catch 312 to be coupled to carriage interface 304 so that the actuation of catch 312 actuates carriage interface 304 between an engaged position, in which extended portion 322 engages carriage interface bracket 306, and a disengaged position, in which carriage interface 304, pivoted upward, no longer engages carriage interface bracket 306. When carriage interface 304 is in the disengaged position, rear carriage 68 and front carriage 66 are able to move relative to one another. According to one exemplary embodiment, carriage interface 304 is biased toward the engaged position.

As best shown in FIGS. 18, 19, 21, and 22, carriage interface bracket 306 (e.g., receiving member, female coupler, fixture, etc.) is a rigid member that is fixedly coupled to front carriage 66 and that is configured to engage, mate, interface or interlock with carriage interface 304. According to one exemplary embodiment, carriage interface bracket 306 includes a body portion or flange 324, which includes a portion that extends generally horizontally from the side of front carriage 66 and faces rear carriage 68, and an aperture 326 that is provided within body portion 324 and that is configured to releasably receive extended portion 322 of carriage interface 304.

According to various alternative and exemplary embodiments, the carriage interface and the carriage interface bracket may take one of a variety of different shapes, sizes, and configurations. For example, the carriage interface may include an aperture that is configured to receive a projection provided on the carriage interface bracket. According to other various alternative and exemplary embodiments, the carriage interface and the carriage interface bracket may be configured to include one or more of a variety of different mating structures that allow the carriage interface and the carriage interface bracket to be releasably coupled to one another.

As best shown in FIGS. 16, 17, 19, 21, and 22, track bracket 308 (e.g., brace, fixture, support, etc.) is a generally rigid member that is intended to couple inner track 58 and outer track 60 together and to provide interfaces for engaging or cooperating with other components of linkage system 300. According to one exemplary embodiment, track bracket 308 includes a base 328 that extends below and across the width of inner track 58 and outer track 60, an inside arm 330 that extends upwardly from base 328 along the inside (relative to seat 12) of inner track 58, and an outside arm 332 that extends upwardly from base 328 along the outside (relative to seat 12) of outer track 60.

Base 328 is a generally rigid panel fixedly coupled to inner track 58 and outer track 60 with any appropriate fastener or coupler such as rivet structure 335 (see FIGS. 16 and 22).

Inside arm 330 (e.g., projection, extension, side member, stop, etc.) is a generally "L" shaped member having a first leg 334 that is coupled to base 328 and that extends upwardly along the inside wall of inner track 58, and a second leg 336 that extends inwardly (toward the middle of seat 12) from the top of first leg 334. Second leg 336 includes an elongated slot 338 configured to receive toggle lock 310.

Outside arm 332 (e.g., projection, extension, side member, trigger, etc.) is a generally "L" shaped member having a first leg 340 coupled to base 328 and extending upwardly along the outside wall of outer track 60, and a second leg 342 extending inwardly (generally over outer track 60) from the top of first leg 340. The rear edge of second leg 342 includes staggered edges 344 and 346. Edge 344 is configured to engage or actuate catch 312 as rear carriage 68 moves forward during the movement of seat system 10 into the folded position. Edge 346 is configured to engage or actuate catch 314 as rear carriage 68 moves forward during the movement of seat system 10 into the folded position.

According to various alternative and exemplary embodiments, each of the arms of the track bracket may be configured in one of a variety of different ways, may be made of one or more pieces, may take one of a variety of different shapes and sizes, and may be positioned in different locations along the inner and outer tracks to accommodate different embodiments of the two catches, the toggle lock, and/or other components of the seating system.

Referring in particular to FIGS. 17, 19, 21, and 22, toggle lock 310 (e.g., switch, stop, restraint, etc.) is a generally rigid member pivotably coupled to front carriage 66. According to one exemplary embodiment, toggle lock 310 is configured to pivot between an engaged position and a disengaged position. In the engaged position, a portion of toggle lock 310 is received within slot 338 of inside arm 330 of track bracket 308 and serves to limit the range of movement of front carriage 66 to that which corresponds to the movement of toggle lock 310 between the ends of slot 338. In the disengaged position, toggle lock 310 does not engage slot 338 and does not generally limit the range of motion of front carriage 66. Toggle lock 310 is operatively coupled (such as through structure, wires, cables, etc.) to reclining mechanism 130 so that the actuation of reclining mechanism 130 that occurs when backrest 18 pivots forward beyond a certain point (after the actuation of handle 126*a*) causes toggle lock 310 to move from the engaged position to the disengaged position.

Catch 312 (e.g., toggle, switch, contact, pick-up, etc.) is a generally rigid member pivotably or rotatably coupled to rear carriage 68 and configured to engage edge 344 of outside arm 332 of track bracket 308 when rear carriage 68 moves forward along outer track 60. According to one exemplary embodiment, catch 312 includes a generally radially extending edge or surface 348 that causes catch 312 to pivot or rotate when surface 348 comes into contact with edge 344 of track bracket 308. Catch 312 is operatively coupled or linked to carriage interface 304, such as by wires or cables, so that the rotation or pivoting of catch 312 actuates carriage interface 304.

Catch 314 (e.g., toggle, switch, contact, pick-up, etc.) is a generally rigid member pivotably or rotatably coupled to rear carriage 68 and configured to engage edge 346 of outside arm 332 of track bracket 308 when rear carriage 68 moves forward along outer track 60. According to one exemplary embodiment, catch 314 includes a generally radially extending edge or surface 350 that causes catch 314 to pivot or rotate when surface 350 comes into contact with edge 346 of track bracket 308. Catch 314 is operatively coupled or linked to seat cushion latch 23, such as by wires or cables, so that the rotation or pivoting of catch 314 actuates seat cushion latch 23.

Figure 19:
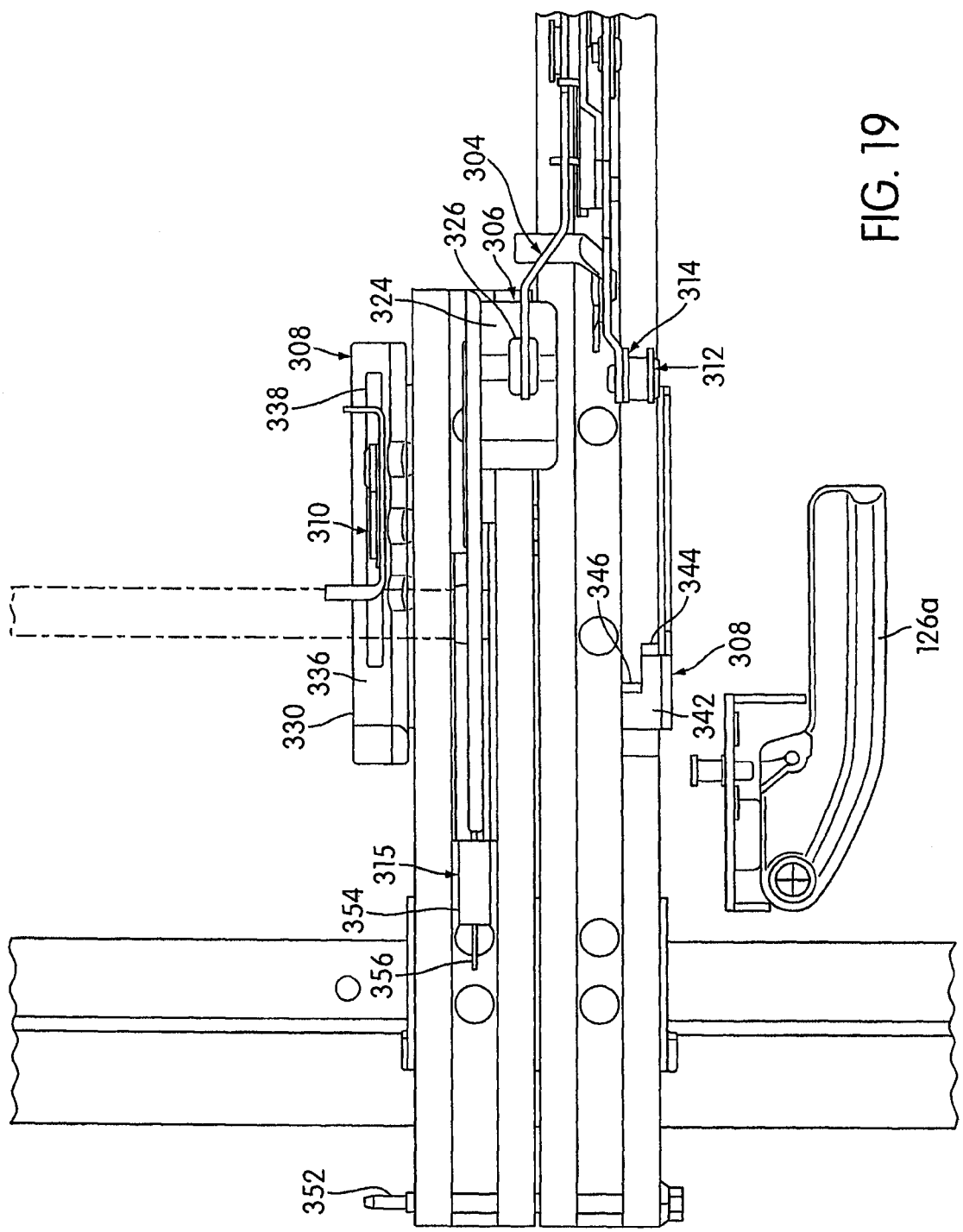
FIG. 19 is a partial top plan view of a front portion of the seating system of FIG. 16 showing the linkage system when the seating system is in the first configuration.
Figure 21:
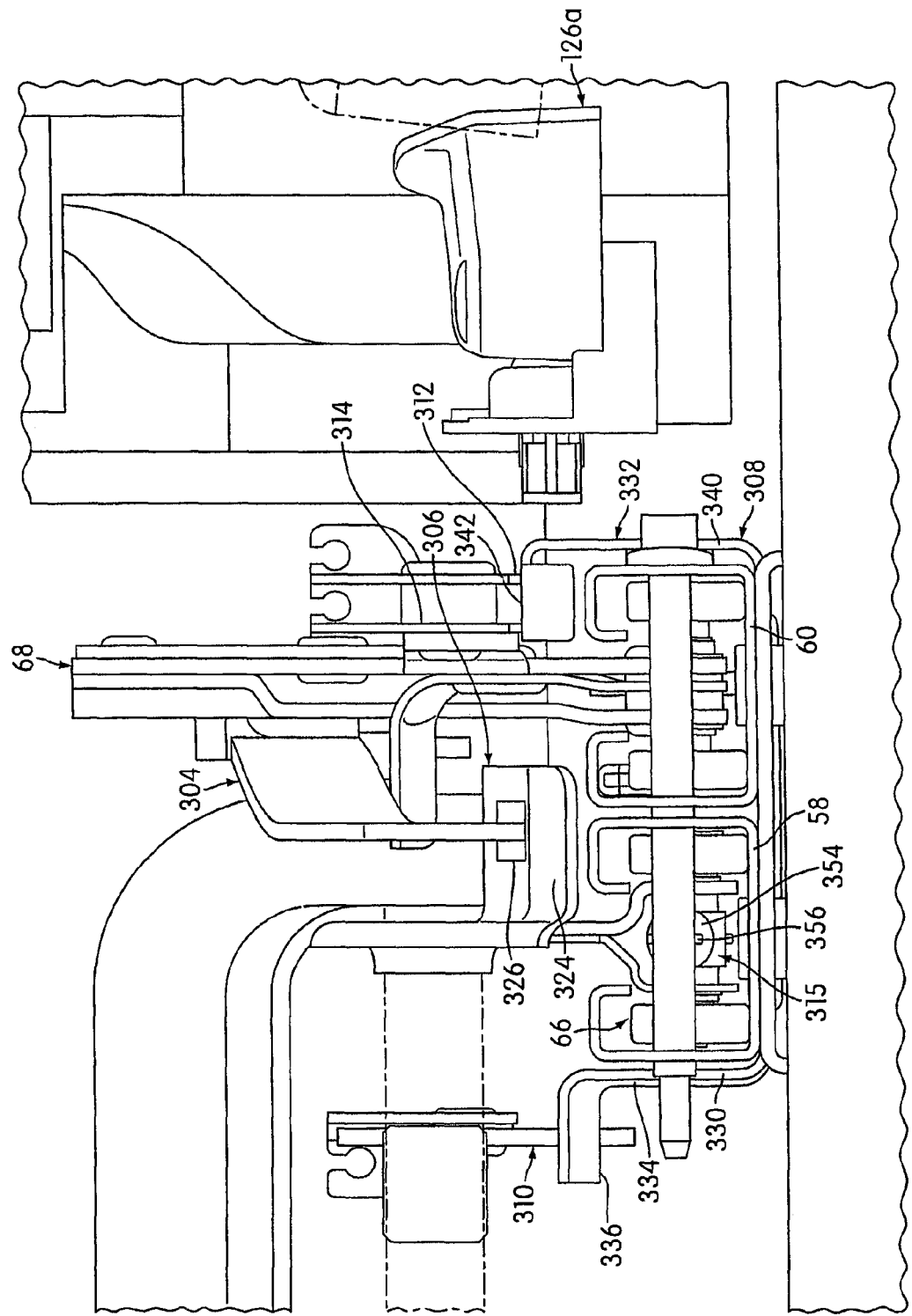
FIG. 21 is a partial front elevational view of a portion of the seating system of FIG. 16 showing the linkage system when the seating system is in the first configuration.

As best shown in FIGS. 19 and 21, hard stop 315 (e.g., stopper, beam, rod, engagement member, etc.) is a member configured to contact a structure (pin 352) rigidly coupled to inner track 58 when front carriage 66 reaches a certain point within inner track 58 to stop front carriage 66 from moving any further forward in inner track 58. According to one exemplary embodiment, hard stop 315 includes a body portion 354 and an extension 356. Body portion 354 is a rigid or resilient rod or structure that is coupled to front carriage 66 in such a way that it extends beyond the front edge of front carriage 66. The distance that body portion 354 extends beyond the front edge of front carriage 66 determines how far forward front carriage 66 may travel in the forward direction within inner track 58. A pin 352 (e.g., peg, stud, bar, beam, etc.) is coupled to the front ends of inner track 58 and outer track 60 in such a way that it extends across the width of each track and provides a structure at the end of inner track 58 that hard stop 315 engages. Extension 356 is a spring-loaded, retractable member that is coupled to the end of body portion 354. Extension 356 engages pin 352 prior to body portion 354 and is configured to absorb some of the energy of body portion 354 as it approaches pin 352 to reduce any impact forces.

According to an alternative embodiment, a panel (such as stop 102 of front support 62) may be provided on, or coupled to, inner track 58 rather than pin 352 and serve as the structure hard stop 315 engages. According to other various alternative and exemplary embodiments, the hard stop may not include the extension portion, or the extension may be coupled to the inner track rather than to the body portion. According to still other various alternative and exemplary embodiments, the hard stop may be a separate member that is coupled to the front carriage, or it may be integrally formed as a single unitary body with at least a portion of the front carriage.

The adjustment of seat system 10 using linkage system 300 is generally the same as when using linkage system 128. To adjust the forward or rearward position of seat 12, the occupant simply actuates a handle or lever 126c, which is operatively coupled to track latch 302. The actuation of handle 126c releases fingers 318 from engagement with the corresponding apertures 87 in outer track 60, which then allows front carriage 66 and rear carriage 68 to move freely within inner track 58 and outer track 60, respectively. Seat 12 can then be moved to the desired location, at which point the occupant releases handle 126c to lock seat 12 in the new position. By releasing handle 126c, track latch 302 (which is biased toward its engaged position) is permitted to engage the corresponding apertures 87 in outer track 60 to hold rear carriage 68, and thus seat 12, in position.

Although actuating handle 126c allows rear carriage 68 and front carriage 66 to move freely along outer track 60 and inner track 58, respectively, the range of movement of rear carriage 68 and front carriage 66 is limited. When seat system 10 is in the design position, toggle lock 310 is retained in the engaged position and a portion of toggle lock 310 is received within slot 338 of inside arm 330 of track bracket 308. (See FIG. 19). Accordingly, front carriage 66 can only be moved forward or rearward until the portion of toggle lock 310 within slot 338 contacts the end of slot 338. The distance between the two points where toggle lock 310 contacts the end of slot 338 (e.g., the length of slot 338) generally defines the range of permitted forward and rearward adjustment of seat 12. To permit seat 12 to be locked in incremental positions over the entire range of permissible movement, apertures 87, which are configured to receive fingers 318 of track latch 302, are provided intermittently within outer track 60 over the corresponding range of movement of rear carriage 68.

To adjust the reclining angle of backrest 18, the occupant actuates either handle 126a or 126b, moves backrest 18 to the desired location, and then releases handle 126a or 126b to lock backrest 18 in the new position. The actuation of handle 126a or 126b actuates reclining mechanism 130, which releases the rotational lock on backrest 18 and allows its rotational position to be adjusted.

The movement of seat system 10 between the design position and the storage position when it includes linkage system 300 is generally the same as when it includes linkage system 128. Accordingly, no further discussion is needed.

Figure 23B:
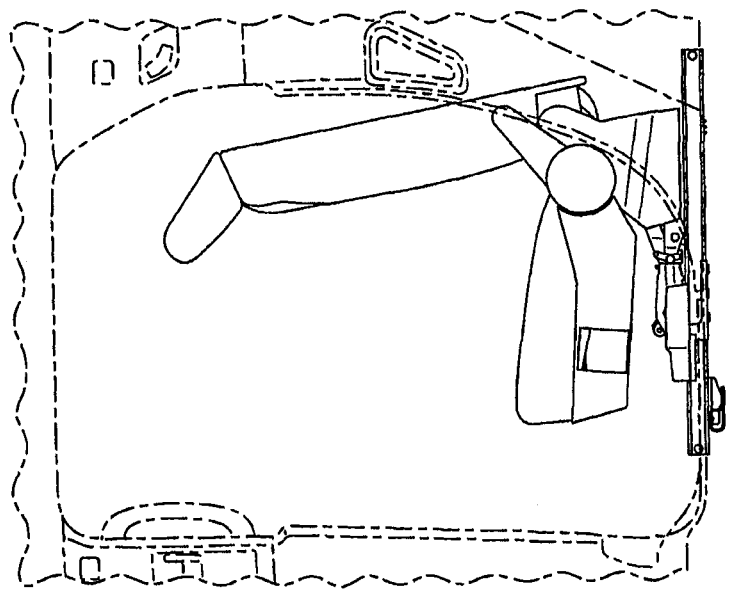
Figure 23A:
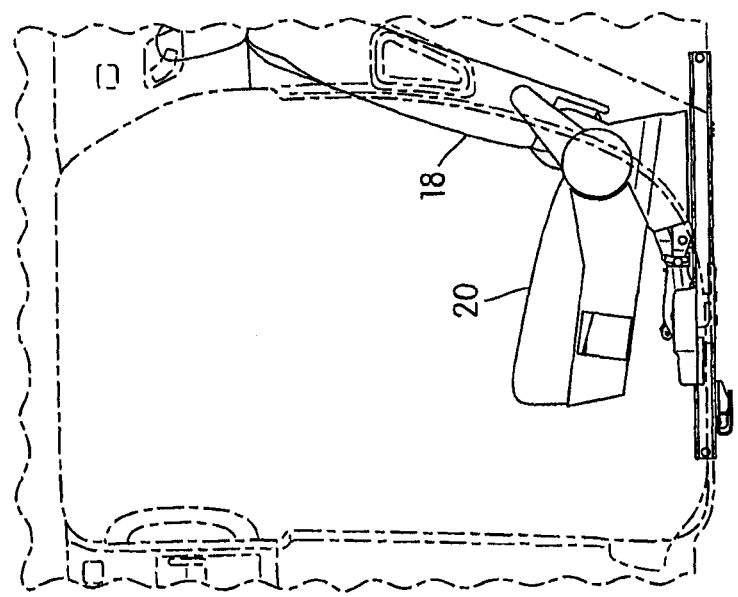

The movement of seat system 10 from the design position to the folded position when it includes linkage system 300 is generally similar to the movement of seat system 10 when it includes linkage system 128. The various phases of movement of seat system 10 as it moves from the seated position to the folded position are illustrated in FIGS. 23A-23E. As seen in FIG. 23A, seat system 10 starts in the design position. To initiate the movement of seat system 10 toward the folded position, the occupant actuates handle 126a. The actuation of handle 126a actuates reclining mechanism 130. The actuation of reclining mechanism 130, in turn, unlocks joint 52. As seen in FIG. 23B, when joint 52 is unlocked, the bias in joint 52 causes backrest 18 to pivot forward until backrest 18 reaches a certain point (e.g., the point at which backrest 18 is nearly perfectly vertical, the point where backrest 18 has been pivoted or rotated forward by at least 22 degrees, the point where backrest 18 has been pivoted or rotated forward approximately 5 degrees beyond the point at which backrest 18 assumes a nearly perfectly vertical position, or some other point.) The actuation of reclining mechanism 130 in response to the forward pivoting movement of backrest 18 causes track latch 302 to move into a position in which fingers or projections 318 no longer engage apertures 87 in outer track 60. The actuation of reclining mechanism 130 also causes toggle lock 310 to move into the disengaged position (where toggle lock 310 is no longer received within slot 338).

Figure 23D:
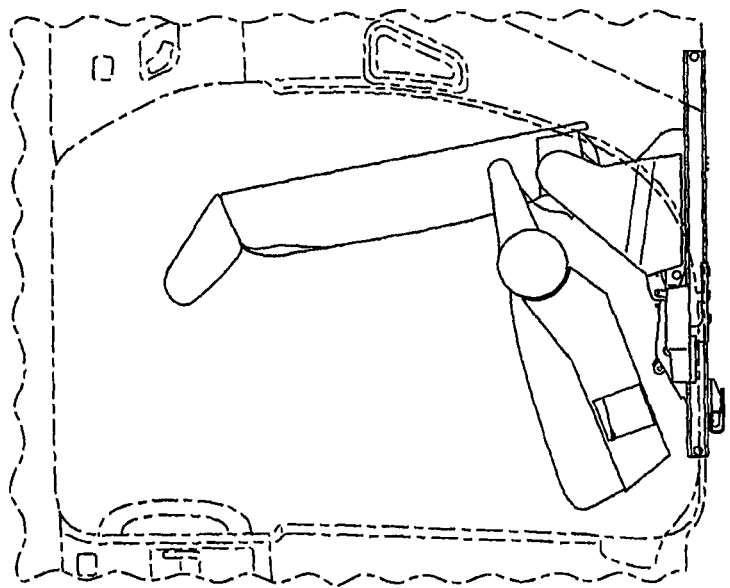
Figure 23C:
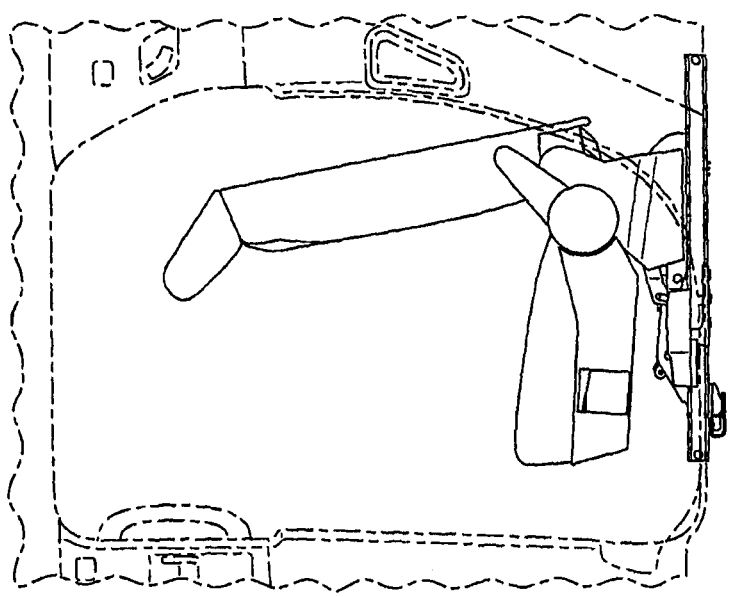

With track latch 302 unlocked and toggle lock 310 in the disengaged position, rear carriage 68 and front carriage 66 (which are linked by carriage interface 304) are now free to move forward within outer track 60 and inner track 58, respectively, as illustrated in FIG. 23C. During the forward movement of front carriage 66 and rear carriage 68 (and seat 12), radial edge 348 of catch 312 will contact edge 344 of outside arm 332 of track bracket 308. As rear carriage 68 continues to move forward, the contact between radial edge 348 and edge 344 causes catch 312 to rotate, which causes carriage interface 304 to move to the disengaged position. The movement of carriage interface 304 into the disengaged position releases the direct link between front carriage 66 and rear carriage 68 (which are still indirectly linked by seat 12), thereby permitting rear carriage 68 to move relative to front carriage 66. At about the same time that carriage interface 304 is disengaged, hard stop 315 of front carriage 66 engages pin 352 and stops front carriage 66 from moving any further forward. But, because carriage interface 304 has been disengaged, rear carriage 68 is still free to move forward. As rear carriage 68 continues to move forward, radial edge 350 of catch 314 will contact edge 346 of outside arm 332 of track bracket 308. As rear carriage 68 continues to move further forward, the contact between radial edge 350 and edge 346 causes catch 314 to rotate, which releases seat cushion latch 23, which unlocks joint 55. Due to the bias provided at joint 55, rear portion 34 of seat cushion 20 is forced upward (e.g., seat cushion 20 rotates upwardly) when cushion latch 23 is released, as is illustrated in FIG. 23D. Even though rear carriage 68 moves closer to front carriage 66 before seat cushion latch 23 is released, seat cushion 20 is still able to rotate upwardly without binding with backrest 18 because joint 43 between seat cushion 20 and front frame 26 and joint 47 between front frame 26 and front bracket 28 allow seat cushion 20 to move forward as rear carriage 68 and backrest 18 move forward.

Further movement of rear carriage 68 toward front carriage 66 causes seat cushion 20 to pivot further forward and approach a generally vertical position. Rear carriage 68 is then moved further forward until seat system 10 assumes the folded position. Once in the folded position, seat system 10 may be configured to lock so that it will remain in the folded position until an occupant of the vehicle unlocks it.

Figure 24C:
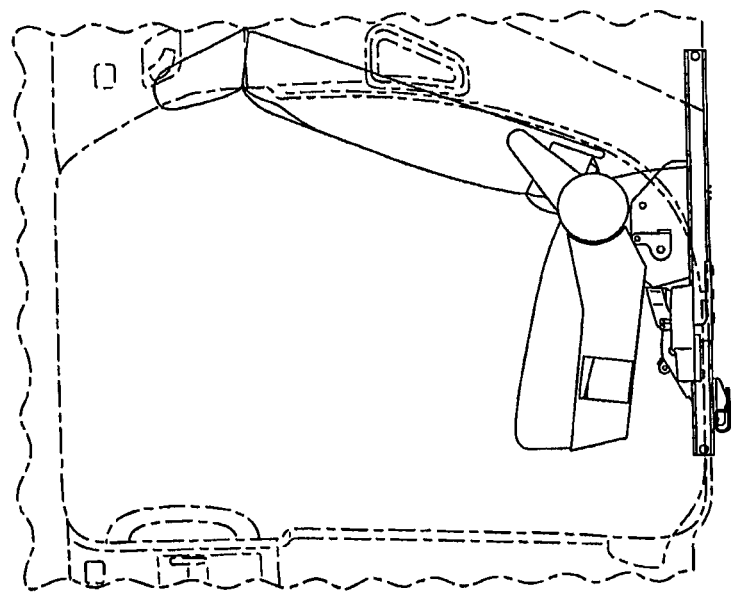
Figure 24B:
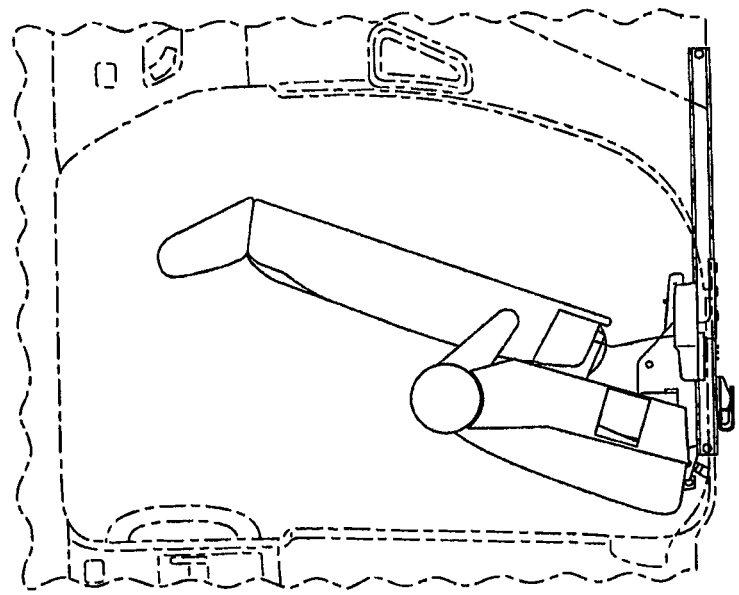
Figure 24E:
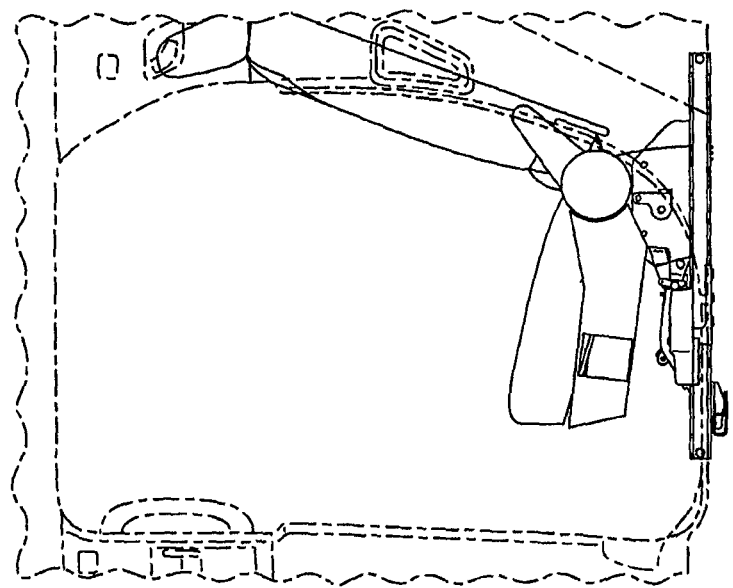
Figure 24D:
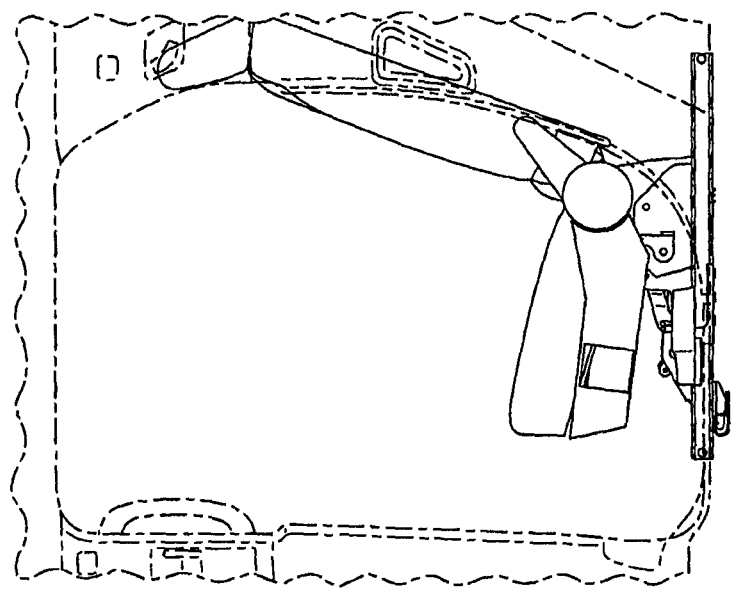

The movement of seat system 10 from the folded position to the design position is illustrated in FIGS. 24A-E. As seen in FIG. 24A, seat system 10 starts in the folded position. To initiate the movement of seat system 10 toward the design position, the occupant moves backrest 18 rearward until it locks in the reclined position. See FIG. 24B. The occupant then continues to move backrest 18 rearward, which causes rear carriage 68 to move rearward relative to front carriage 66. As rear carriage 68 moves away from front carriage 66, seat cushion 20 pivots rearwardly and approaches a substantially horizontal position. When rear carriage 68 has moved far enough relative to front carriage 66, seat cushion 20 assumes a generally horizontal position and seat cushion latch 23 locks. See FIG. 24C. Further movement of rear carriage 68 relative to front carriage 66 causes carriage interface 304 to engage carriage interface bracket 306, which re-links or re-couples rear carriage 68 and front carriage 66. See FIG. 24D. This movement also allows toggle lock 310 to return to the engaged position. Once seating system 10 is in this position, the occupant pushes down on seat cushion 20 to allow track latch 302 to again engage outer track 60 and lock the position of rear carriage 68 (and therefore seat 12) relative to outer track 60. See FIG. 24E. The occupant has then returned seating system 10 to the design position.

In general, a seating system or arrangement of the types described herein may include a track system coupled to the floor of the vehicle, a seat cushion assembly coupled to the track system, a backrest assembly coupled to the track system, and an actuation system that links and coordinates the movement of the various components of the track system, the seat cushion assembly, and the backrest assembly. The track system may include a set of tracks and a set of carriages that slide or move within the tracks. The seat cushion assembly and the backrest assembly of the seat are coupled to different carriages or sets of carriages, which allows the seat cushion assembly and the backrest assembly to slide along the tracks and to move relative to one another to achieve different configurations. The actuation system links the carriages and generally controls how the various components of the track system and the seat move relative to one another.

The manner in which the seat cushion assembly and the backrest assembly are coupled to the track system, to the actuation system, and to one another allows the seating system to move between a seating or design position, an access or folded position, and a storage or cargo position. In the design position, the seating system is configured to receive an occupant. In the access position, both the seat cushion and the backrest are moved to a generally vertical position and are pushed forward so that the seat cushion is proximate the back of the front seat, and the backrest is proximate the seat cushion. In the access position, the seating system is essentially folded and moved forward to provide a relatively unobstructed path or access point that allows an occupant to more easily access the third row of seats or the rear cargo area. In the storage position, the backrest is rotated forward so that the front of the backrest is generally adjacent the seat cushion while the back of the backrest provides a generally horizontal surface upon which cargo may be placed.

According to various alternative and exemplary embodiments, the seating system described herein may be used in different locations within the vehicle and may be used with one of a variety of different seating arrangements. For example, the seating system may be used as a second row of seats in a vehicle, as a third row of seats, or even as the front row of seats. The seating system may also be used with a bench seat, a 60/40 split seat, a 50/50 split seat, or a bucket seat. According to other various alternative and exemplary embodiments, the seating system may include various structures or devices that serve to releasably lock the seating system in one or more of its different positions so that the seating systems remains in a particular position or configuration until the occupant of the vehicle releases the seating system. According to still other various alternative and exemplary embodiments, the seating system may include various structures, devices, springs, etc. that serve to assist the occupant in the moving of the seating system between one or more of the different positions or configurations.

It is important to note that the term "seat" is intended to be a broad term and not a term of limitation. According to various alternative and exemplary embodiments, the seating system or arrangement may be used with any of a variety of vehicles, structures, assemblies, or arrangements and is not intended to be limited to use with automobiles, but may be used with any arrangement where an adjustable seat (e.g., selectively adjustable between a range of forward and rear positions, a range of recline positions, a design position, a folded position, and/or a storage position or configuration) is desirable. For example, the seating system may be used in aircraft, boats, ships, trains, buses, homes, offices, theaters, or anywhere a seated person may wish to adjust his or her seat or wish to move the seat between different positions or configurations. According to various other alternative and exemplary embodiments, the seating system may be coupled to the floor of a building, dwelling, or other type of structures, or one of a variety of other types of object or structures.

It is also important to note that the construction and arrangement of the elements of the seating system or arrangement as shown in the exemplary and alternative embodiments are illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. For example, a variety of configurations may be provided for the handles, the elements of the linkage system, the reclining mechanism, the front and rear carriages, and the inner and outer tracks. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present inventions as expressed in any appended claim.

What is claimed is:

1. A vehicle seating system for use within a vehicle having a vehicle floor comprising:
    a seat back;
    a seat bottom coupled to the seat back;
    a track arrangement configured to be coupled to the vehicle floor, wherein the track arrangement is disposed in a single plane that is parallel with the vehicle floor;
    a first carriage coupled to the seat bottom and moveable within the track arrangement, the first carriage having a slot;
    a second carriage coupled to the seat back and moveable within the track arrangement;
    a linkage coupling the first carriage and the second carriage, the linkage having a first pin slidable in the slot of the first carriage; and
    a first stopper configured to interact with the linkage via the first pin,
    wherein the seating system is configured to be in a design position such that an occupant may sit on the seat bottom and in a cargo position,
    wherein the second carriage and the first carriage are releasably coupled to one another so the second carriage is moveable relative to the first carriage when the coupling of the first carriage and the second carriage is released, the position of the second carriage relative to the first carriage being substantially fixed when the coupling of the first carriage and the second carriage is locked,
    wherein the seating system is configured to be moved from the design position into a folded position when the coupling of the first carriage and the second carriage is released,
    wherein the seat bottom is configured to move toward the vehicle floor and forward when the vehicle seating system is moved from the design position to the cargo position such that a rear portion of the seat cushion is moved toward the vehicle floor and forward immediately at initiation of movement from the design position to the cargo position, and
    wherein the first and second carriages are locked via the linkage until the first stopper ceases acting on the first pin when going into the folded position.

2. The vehicle seating system of claim 1, wherein the seating system is configured to be moved between the design position and the cargo position when the coupling of the first carriage and the second carriage is locked.

3. The vehicle seating system of claim 1 wherein the linkage is moveable between a locked state in which the coupling of the first carriage and the second carriage is locked and an unlocked state in which the coupling of the first carriage and the second carriage is released.

4. The vehicle seating system of claim 3, wherein the seat back is coupled to the second carriage at a pivotable joint.

5. The vehicle seating system of claim 4, wherein the joint comprises a latch member movable between a locked position in which the seat back is not permitted to pivot at the joint and an unlocked position in which the seat back is permitted to pivot at the joint.

6. The vehicle seating system of claim 5, wherein the latch member is operably coupled to the linkage.

7. The vehicle seating system of claim 6 further comprising a handle configured to be actuated by a user, the handle being operably coupled to the latch member and configured to move the latch member into the unlocked position when the handle is actuated by the user.

8. The vehicle seating system of claim 1, wherein the track arrangement comprises a first track member and a second track member located proximate the first track member, wherein the second track member is parallel to the first track member on a same side of the seat bottom, wherein the second track member is offset from the first track member in a first direction from the first track member and has a length extending in a second direction that is longer than a length of the first track member extending in the second direction, and wherein the first and second track member members each has a generally U-shaped body having an open side spanning between two generally vertical walls.

9. The vehicle seating system of claim 8, wherein the first carriage is coupled to the first track member and the second carriage is coupled to the second track member.

10. The vehicle seating system of claim 1, wherein the track arrangement is a first track arrangement, and wherein the system further comprises a third carriage, a fourth carriage, and a second track arrangement spaced from the first track arrangement, the third carriage being coupled to the seat bottom and moveable within the second track arrangement, the fourth carriage being coupled to the seat back and moveable within the second track arrangement.

11. The vehicle seating system of claim 10, wherein the first track arrangement comprises a first track member and a second track member located proximate the first track member, wherein the second track member is parallel to the first track member on a same side of the seat bottom, wherein the second track member is offset from the first track member in a first direction from the first track member and has a length extending in a second direction that is longer than a length of the first track member extending in the second direction, wherein the first and second track members each has a generally U-shaped body having an open side spanning between two generally vertical walls, wherein the second track arrangement comprises a third track member and a fourth track member, and wherein the third carriage is coupled to the third track member and the fourth carriage is coupled to the fourth track member.

12. The vehicle seating system of claim 1 further comprising a link coupling the seat bottom to the seat back.

13. The vehicle seating system of claim 12, wherein the link is coupled to the seat back at a first joint and to the seat bottom at a second joint and wherein the seat back is rotatable relative to the link about the first joint and the seat bottom is rotatable relative to the link about the second joint.

14. The vehicle seating system of claim 1 further comprising a latch member coupled to the second carriage, the latch member being movable between an engaged position in which the latch member engages the track arrangement and prevents the second carriage from moving within the track arrangement, and a disengaged position in which the second carriage is permitted to move within the track arrangement.

15. The vehicle seating system of claim 1, wherein the vehicle seating system is configured to move into the folded position as the second carriage is moved within the track arrangement toward the first carriage.

16. The vehicle seating system of claim 1 wherein a second stopper is configured to interact with the first stopper via a second pin, wherein the second stopper is configured to interact with the track arrangement such that the second stopper limits movement of one of the first and second carriages within the track arrangement except when going into the folded position.

17. A vehicle seating system for use within a vehicle comprising:
a seat back;
a seat bottom coupled to the seat back;
a track arrangement configured to be coupled to the vehicle;
a first carriage coupled to the seat bottom and moveable within the track arrangement;
a second carriage coupled to the seat back and moveable within the track arrangement; and
a link coupling the seat bottom to the seat back,
wherein the second carriage and the first carriage are releasably coupled to one another so the second carriage is moveable relative to the first carriage when the coupling of the first carriage and the second carriage is released, the position of the second carriage relative to the first carriage being substantially fixed when the coupling of the first carriage and the second carriage is locked,
wherein the seating system is configured to be moved from a design position into a folded position when the coupling of the first carriage and the second carriage is released, and
wherein the link is coupled to the seat back at a first joint and to the seat bottom at a second joint,
wherein the seat back is rotatable relative to the link about the first joint and the seat bottom is rotatable relative to the link about the second joint,
wherein the second joint comprises a latch member, and
wherein the latch member is movable between a locked position in which the seat bottom is not permitted to rotate about the second joint and an unlocked position in which the seat bottom is permitted to rotate about the second joint.

18. The vehicle seating system of claim 17, wherein the vehicle seating system is configured to move between the design position and a cargo position when the latch member is in the locked position, and wherein the vehicle seating system is configured to move between the design position and the folded position when the latch member is in the unlocked position.

19. The vehicle seating system of claim 17, wherein the seat bottom is configured to move downward and forward when the vehicle seating system is moved from the design position to a cargo position.

20. A track system for coupling a vehicle seat having a seat bottom and a seat back to a vehicle, the vehicle having a vehicle floor, the vehicle seat being movable between a design position such that an occupant may sit on the seat bottom, a folded position, and a storage position, the track system comprising:
a first track arrangement configured to be coupled to the vehicle floor, wherein the first track arrangement is disposed in a single plane that is parallel with the vehicle floor;
a first carriage coupled to the first track arrangement and configured to be coupled to the seat bottom, the first carriage being moveable within the first track arrangement in a longitudinal direction of the first track arrangement;
a second carriage coupled to the first track arrangement and configured to be coupled to the seat back, the second carriage being moveable within the first track arrangement in the longitudinal direction of the first track arrangement; and
a linkage releasably coupling the first carriage and the second carriage, the linkage being moveable between a locked state in which the position of the second carriage is locked relative to the position of the first carriage and an unlocked state in which the second carriage is moveable within the first track arrangement relative to the first carriage,
wherein the track system is configured to allow the vehicle seat to be moved from the design position into the folded position only when the linkage is in the unlocked state,
wherein the track system is configured such that the first and second carriages are placed alongside each other in the first track arrangement such that the first and second carriages overlap each other in a direction that is perpendicular to the longitudinal direction when in the folded position, and
wherein the track system is configured such that a rear portion of the seat bottom moves toward the vehicle floor and forward immediately at initiation of movement of the vehicle seat moving from the design position to the storage position.

21. The track system of claim 20, wherein the track system is configured to allow the vehicle seat to be moved between the design position and the storage position when the linkage is in the locked state.

22. The track system of claim 20, wherein the first track arrangement includes a first track and a second track, wherein the second track is parallel to the first track on a same side of the seat bottom, wherein the second track is offset from the first track in the direction that is perpendicular to the longitudinal direction and wherein the second track has a length extending in the longitudinal direction that is longer than a length of the first track extending in the longitudinal direction, and wherein the first and second tracks each has a generally U-shaped body having an open side spanning between two generally vertical walls.

23. The track system of claim 22, wherein the first carriage is coupled to the first track and the second carriage is coupled to the second track.

24. The track system of claim 20 further comprising a second track arrangement configured to be coupled to the vehicle floor.

25. The track system of claim 24, wherein the first track arrangement includes a first track and a second track, wherein the second track is parallel to the first track on a same side of the seat bottom, wherein the second track is offset from the first track in the direction that is perpendicular to the longitudinal direction and wherein the second track has a length extending in the longitudinal direction that is longer than a length of the first track extending in the longitudinal direction, wherein the first and second tracks each has a generally U-shaped body having an open side spanning between two generally vertical walls, and wherein the second track arrangement includes a third track and a fourth track.

26. The track system of claim 25 further comprising:
a third carriage coupled to the third track and configured to be coupled to the seat bottom, the third carriage being moveable within the third track; and
a fourth carriage coupled to the fourth track and configured to be coupled to the seat back, the fourth carriage being moveable within the fourth track.

27. The track system of claim 20, wherein the track system is configured so that the second carriage moves within the first track arrangement toward the first carriage when the vehicle seat is moved into the folded position.

28. A vehicle seating system for use within a vehicle and selectively adjustable between at least a first configuration, a second configuration, and a third configuration, the vehicle having a vehicle floor, the vehicle seating system comprising:
 a seat back;
 a seat bottom coupled to the seat back;
 a first track member and a second track member, wherein each of the first and second track members are configured to be coupled to the vehicle floor, wherein the second track member is parallel to the first track member on a same side of the seat bottom;
 a first carriage coupled to the seat bottom and moveable within the first track member in a longitudinal direction; and
 a second carriage coupled to the seat back and moveable within the second track member in the longitudinal direction;
 wherein the second track member is offset from the first track member in a direction perpendicular to the longitudinal direction and has a length extending in the longitudinal direction that is longer than a length of the first track member extending in the longitudinal direction;
 wherein the second carriage and the first carriage are releasably coupled to one another to allow the second carriage to move relative to the first carriage, the position of the second carriage relative to the first carriage being substantially fixed when the coupling of the first carriage and the second carriage is locked,
 wherein the seating system is adjustable between the first configuration and the second configuration when the coupling of the first carriage and the second carriage is released,
 wherein when the seating system is in the second configuration, each of the seat hack and the seat bottom are oriented substantially vertically and are located adjacent one another, and
 wherein the seat bottom is configured to move in a downward and forward path spanning from the seat bottom's location in the first configuration to the seat bottom's location in the third configuration toward the vehicle floor immediately at initiation of moving the vehicle seating system from the first configuration to the third configuration.

29. The vehicle seating system of claim 28, wherein when the seating system is moved into the second configuration from the first configuration, each of the seat hack and the seat bottom are moved forward.

30. The vehicle seating system of claim 29, wherein when the seating system is moved into the second configuration, the seat back is moved a greater distance than the seat bottom.

* * * * *